United States Patent
Sakita

(10) Patent No.: US 6,940,608 B2
(45) Date of Patent: Sep. 6, 2005

(54) METHOD AND APPARATUS FOR SURFACE CONFIGURATION MEASUREMENT

(75) Inventor: Ryuuji Sakita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 483 days.

(21) Appl. No.: 10/092,599

(22) Filed: Mar. 8, 2002

(65) Prior Publication Data

US 2002/0159075 A1 Oct. 31, 2002

(30) Foreign Application Priority Data

| Mar. 8, 2001 | (JP) | ........................................ 2001-064402 |
| Sep. 25, 2001 | (JP) | ........................................ 2001-290640 |

(51) Int. Cl.⁷ ............................................... G01B 11/24
(52) U.S. Cl. .................... 356/605; 356/618; 250/237 G
(58) Field of Search ................................ 356/605, 618, 356/619, 401, 499; 350/237 G, 559.19–559.28, 208.1–208.6

(56) References Cited

U.S. PATENT DOCUMENTS 6,690,474 B1 * 2/2004 Shirley ...................... 356/603

FOREIGN PATENT DOCUMENTS

| JP | 2-201142 | * | 8/1990 | .......... G01N/21/88 |
| JP | 4-147001 | * | 5/1992 | ........... G01B/11/24 |
| JP | 4-169840 | * | 6/1992 | .......... G01N/21/88 |
| JP | 7-332956 | * | 6/1994 | ........... G01B/11/30 |
| JP | 7-332956 | | 12/1995 | |
| JP | 10-54711 | * | 8/1996 | ........... G01B/11/24 |
| JP | 10-54711 | | 2/1998 | |

* cited by examiner

*Primary Examiner*—Richard A. Rosenberger
*Assistant Examiner*—Vincent P. Barth
(74) *Attorney, Agent, or Firm*—Oblon, Spivak, McClelland, Maier & Neustadt, P.C.

(57) ABSTRACT

A method and an apparatus for surface configuration measurement of the present invention use stereoscopic lattice type of moiré optics as testing optics. The moiré optics accurately shifts moiré fringes of particular fringe order by a preselected phase without any shift error. A line sensor camera, which is a specific form of a camera, limits a measurement range to the vicinity of the particular fringe order. The camera outputs at least three moiré image data shifted in phase. A phase shifting method can therefore be easily applied to the stereoscopic lattice type of moiré optics without giving any consideration to the accurate phase shift of the entire fringe orders. The apparatus can measure the surface configuration of a work with high accuracy.

190 Claims, 61 Drawing Sheets

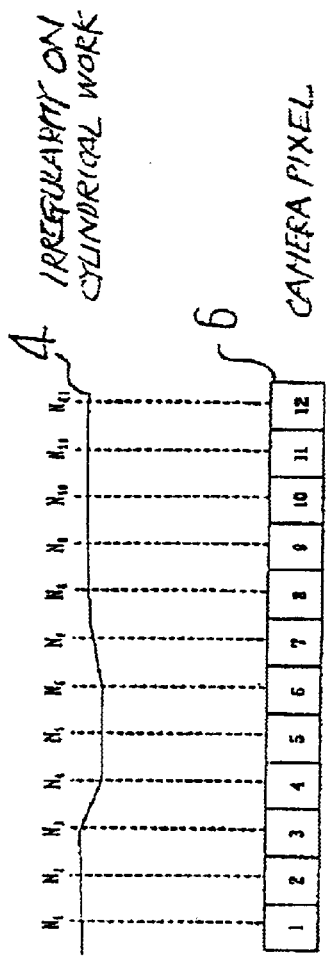
FIG. 12A 1ST
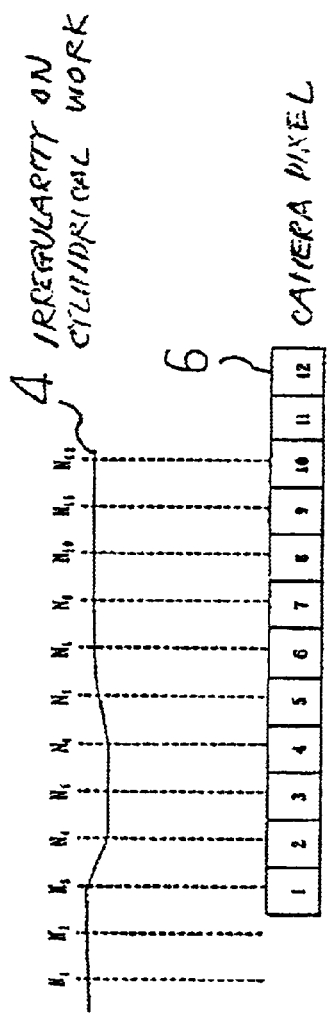
FIG. 12B 2ND
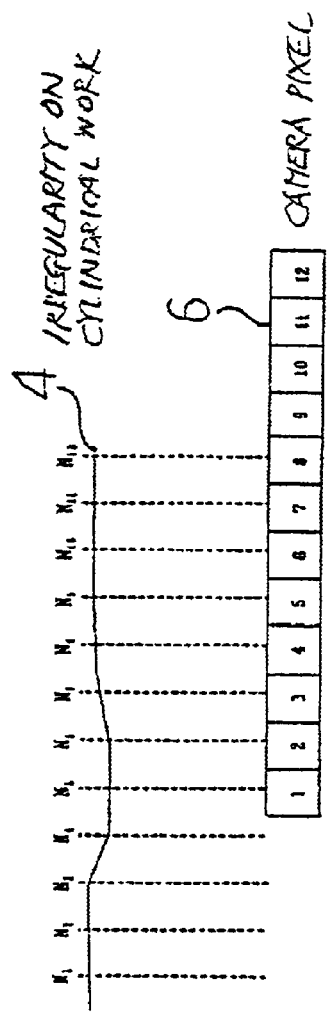
FIG. 12C 3RD

FIG. 16A  FIG. 16B  FIG. 16C
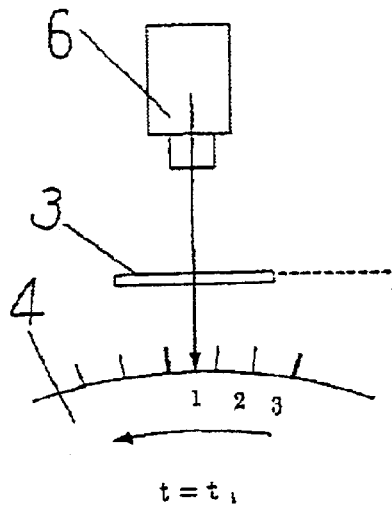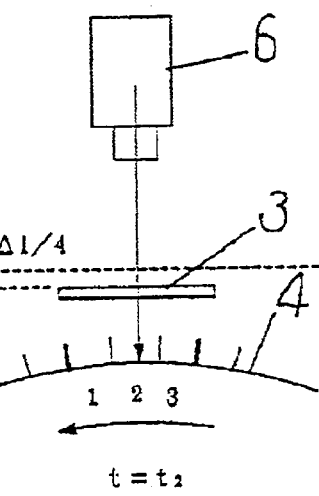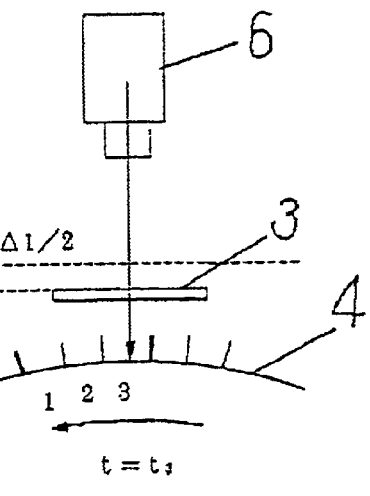
FIG. 16D  FIG. 16E
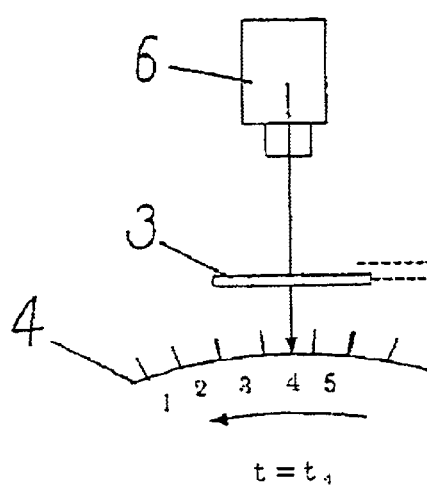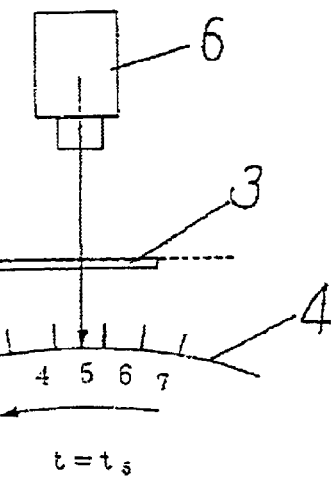

LATTICE MOVEMENT

LINE SENSOR PICKUP TIMING

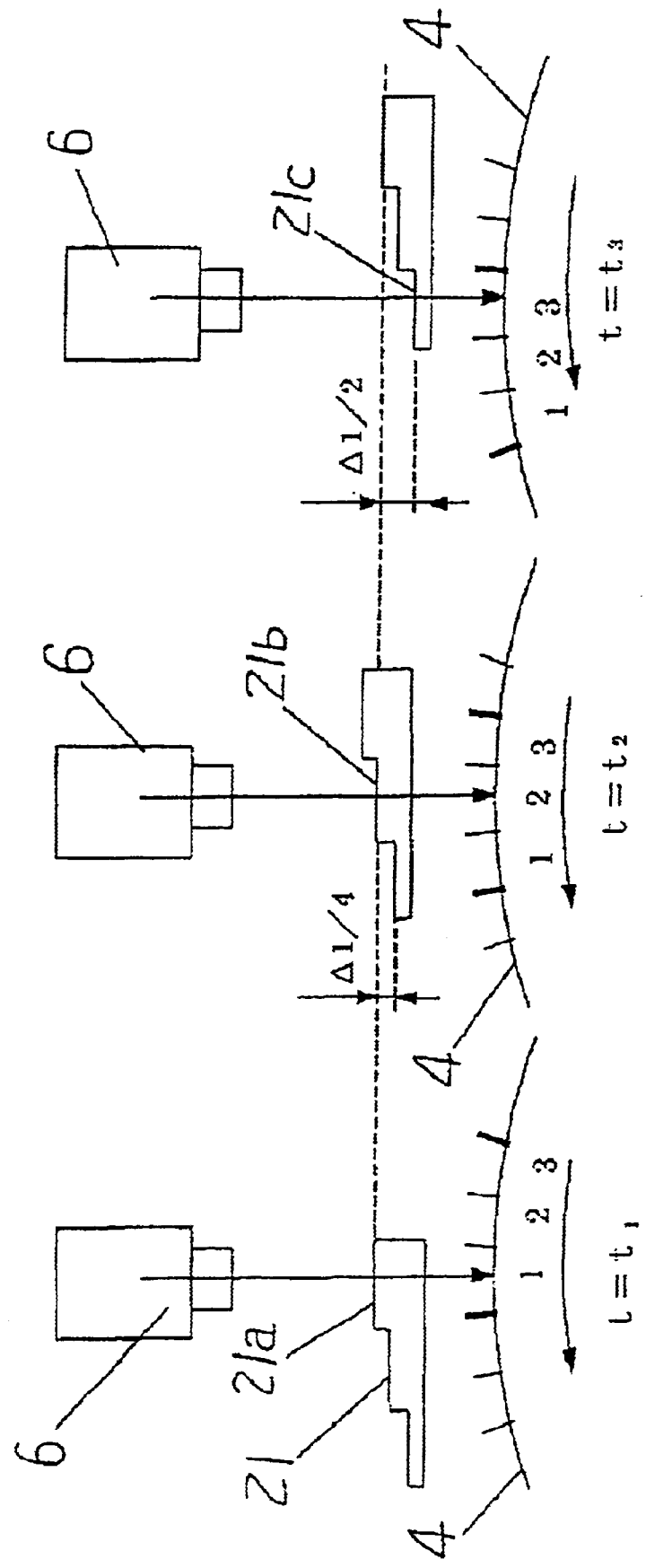

LATTICE MOVEMENT

LINE SENSOR PICKUP TIMING

LINE SENSOR PICKUP TIMING

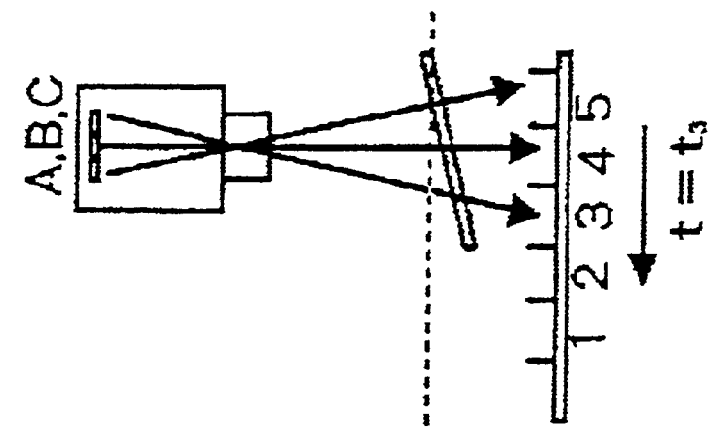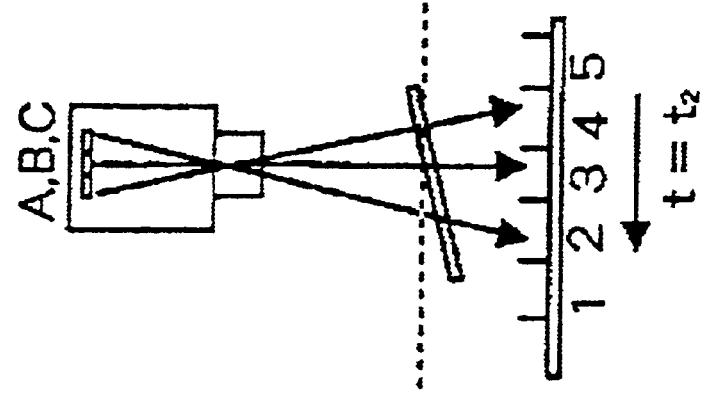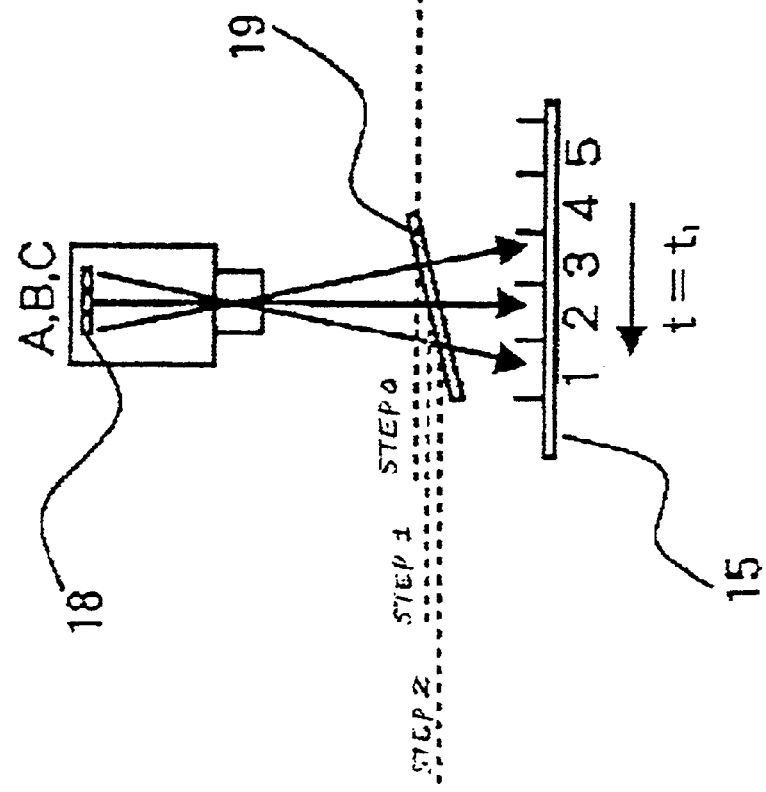

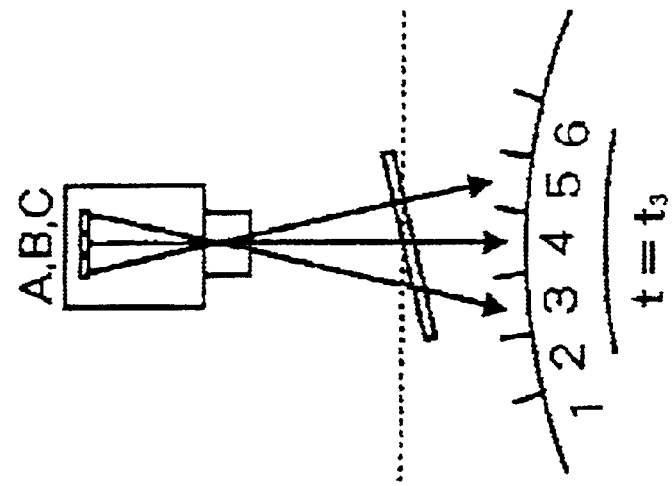
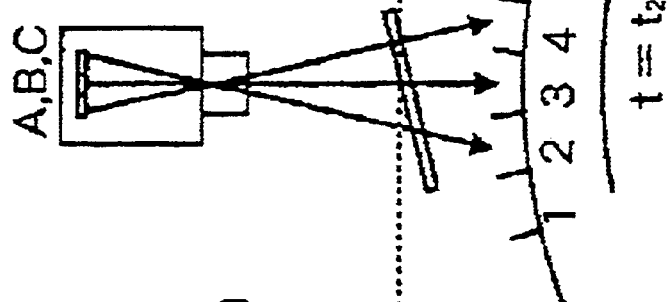
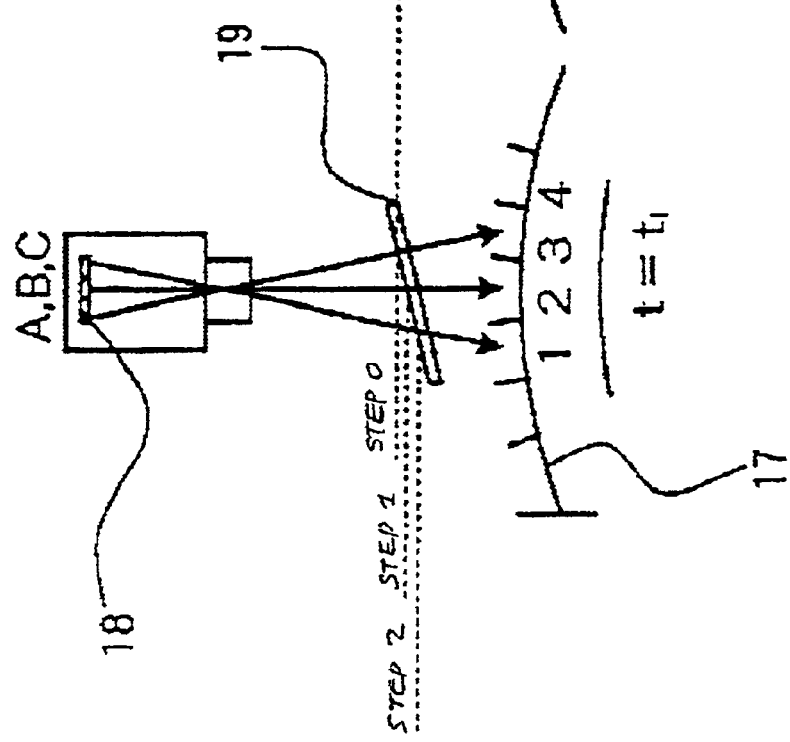

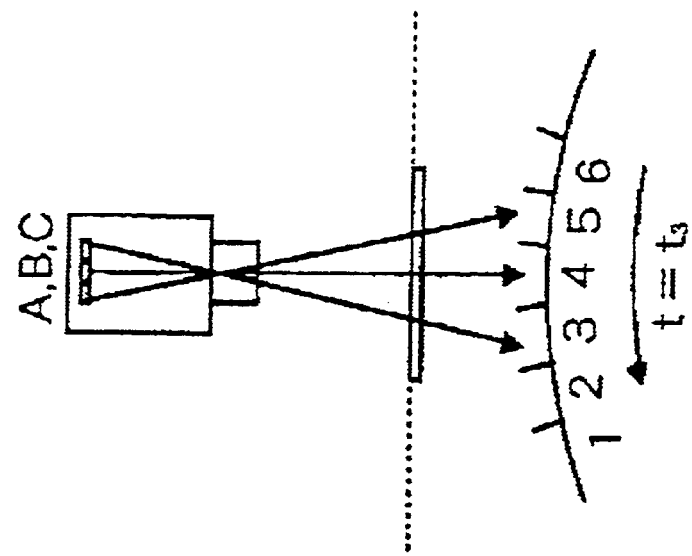
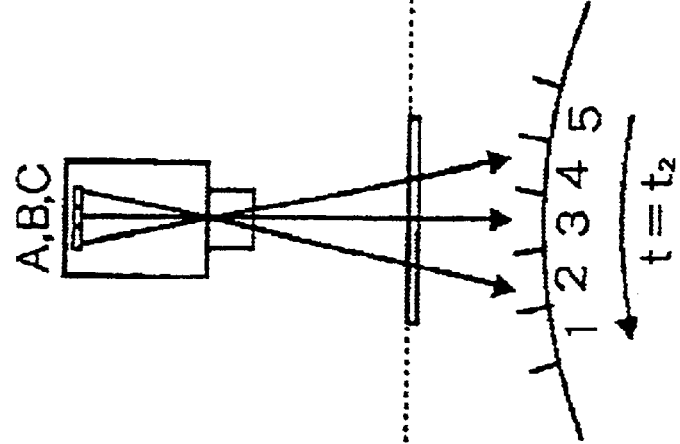
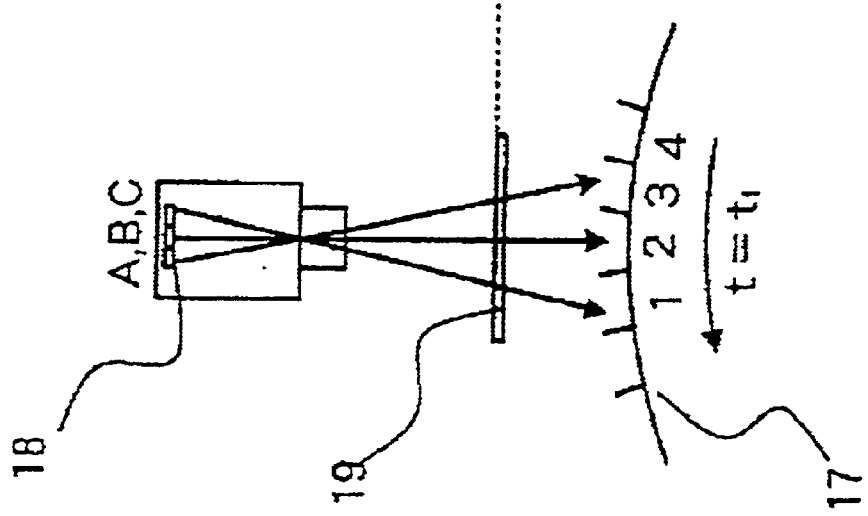

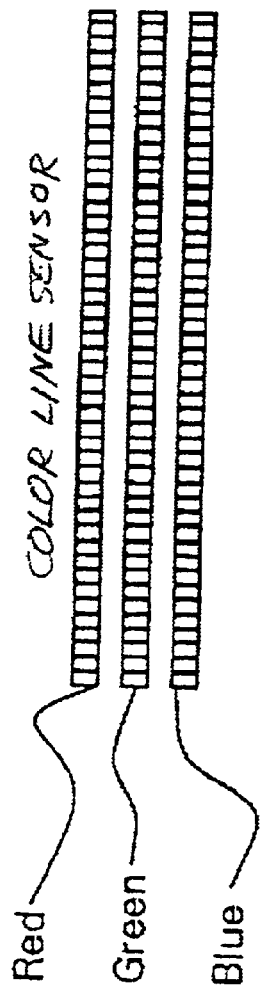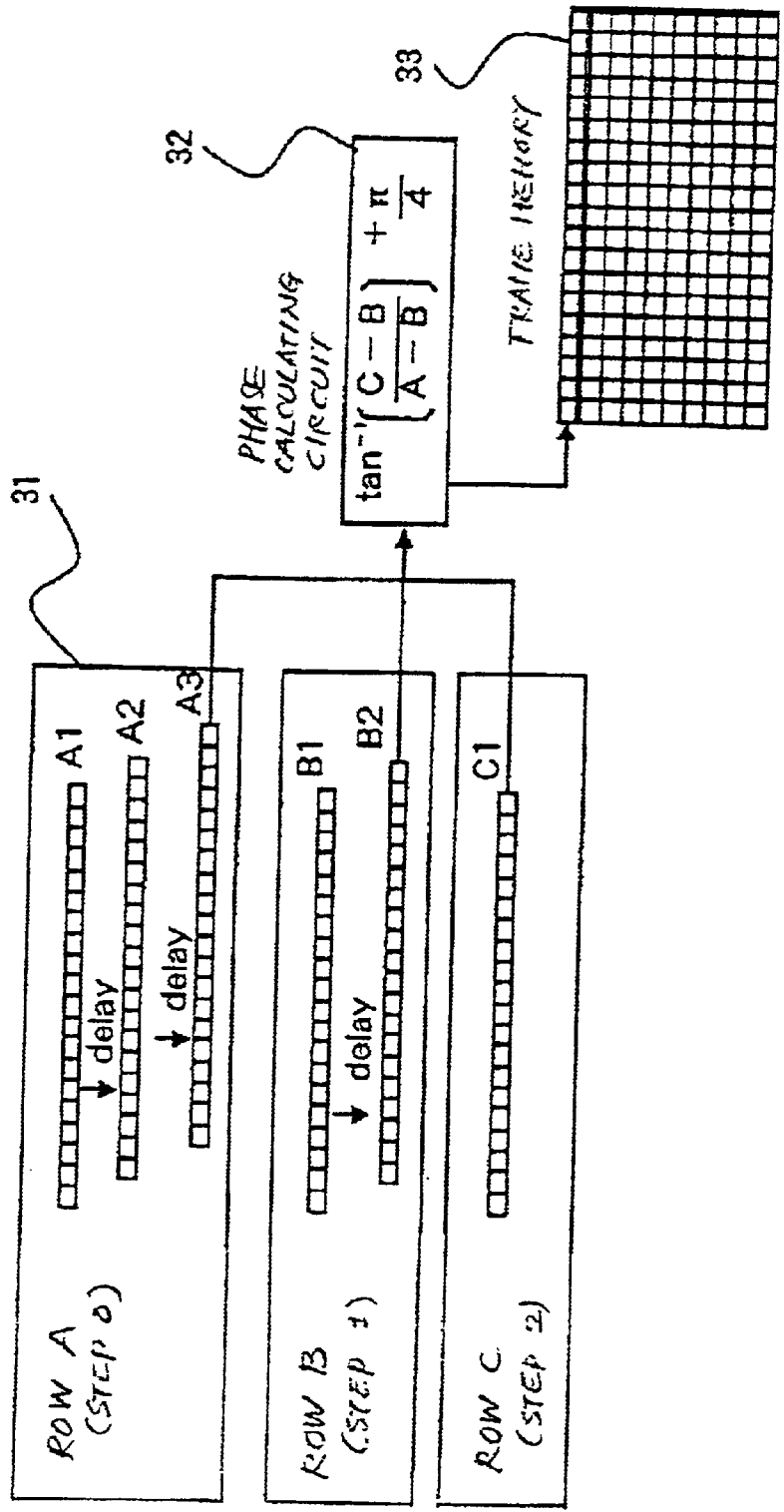

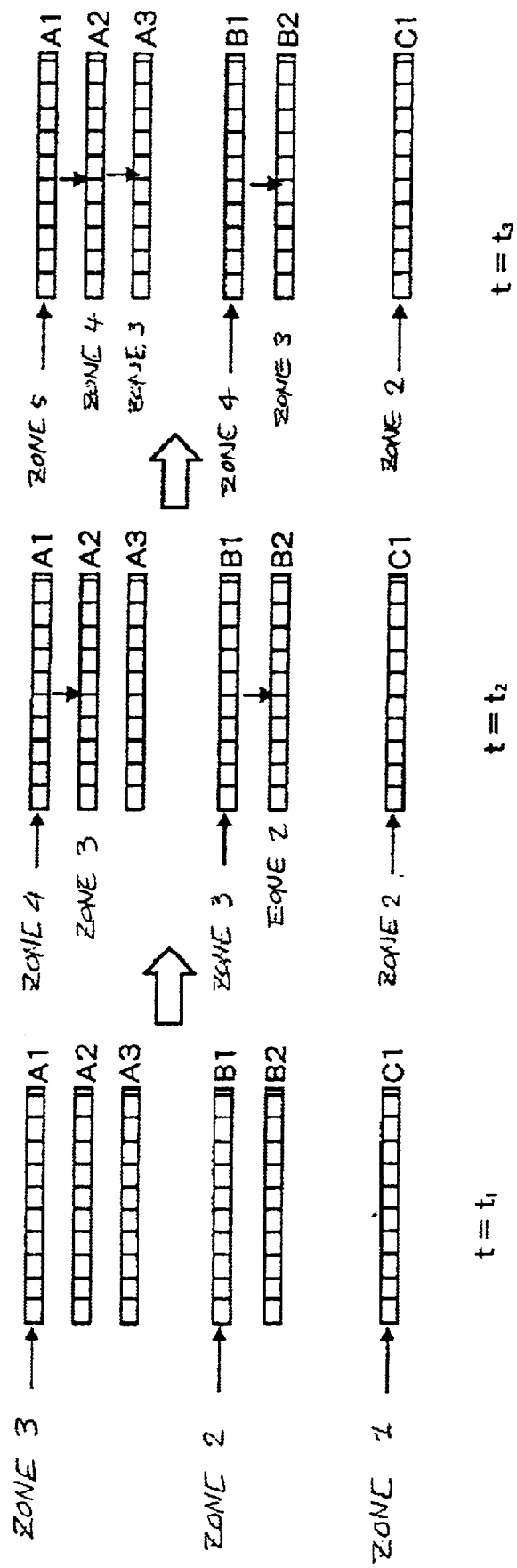

METHOD AND APPARATUS FOR SURFACE CONFIGURATION MEASUREMENT

BACKGROUND OF THE INVENTION

1. Field of the Invention

The present invention relates to a method and an apparatus for surface configuration measurement using a moiré method for detecting the surface defects of a work, the bulging or waving of a ridge, dints or similar irregularity of the kind varying little in tridimensional configuration.

2. Description of the Background Art

Japanese Patent Laid-Open Publication Nos. 2-201142 and 4-169840, for example, each disclose a defect testing method relating to a photoconductive drum or similar cylindrical work. In Laid-Open Publication No. 2-201142, a laser beam issuing from a light source scans the surface of a photoconductive drum via a polygonal mirror in the axial direction of the drum. A photoconductive layer forming the surface of the drum reflects the laser beam. The reflection from the normal surface of the drum is substantially incident to a sensor. The sensor determines the intensity of the incident reflection and feeds its output to a data processing section. The method determines that the surface configuration of the drum is defective when the output of the sensor is unusually low.

On the other hand, in Laid-Open Publication No. 4-169840, a projector includes a halogen lamp or similar light source for issuing light toward a photoconductive drum via a slit. Reflection from the drum and diffused by the defects of the drum is focused by a lens on a line sensor. This method detects unusual reflection ascribable to defects.

A photoconductive drum is likely to have a first kind of defects including pin holes, dents, scratches, bubbles, cracks, and the deposition of dust, which noticeably vary in height. Further, the drum is likely to have a second kind defects including irregularity in the thickness of a photoconductive layer and the drop of a liquid, which vary little in height, as well as the scratches of a support, which do not appear on the surface of the drum. Laid-Open Publications described above can effectively deal with the first kind of defects, but lack accuracy when it comes to the second kind of defects.

A moiré method using moiré topography belongs to a family of tridimensional measuring methods. The moiré method is available in two different types, i.e., a stereoscopic lattice type and a lattice projection type, as will be described specifically later. The moiré method allows a work to be intuitively grasped. However, it is difficult to determine a projection or a recess with the moiré method. Also, the moiré method is not feasible for high-sensitivity tridimensional measurement; the state-of-the-art distance between moiré fringe contour lines is about 10 $\mu$m. Further, visibility differs from one moiré fringe to another moiré fringe, so that a moiré image cannot be easily processed.

More specifically, the lattice projection type of moiré method uses two lattices. One of the two lattices is moved to shift the phase of moiré fringes for thereby finely dividing the interval between contour lines in the equivalent sense. Also, this type of moiré method can promote the accurate detection of a projection or a recess as well as sensitivity. By contrast, the stereoscopic lattice type of moiré method, which uses a single lattice, cannot shift the phase while matching the phases of the contour lines of all orders even if the phase shift of the lattice projection type of moiré method is executed.

In light of the above, Japanese Patent Laid-Open No. 4-147001 (Japanese Patent No. 2,887,517), for example, proposes a measuring method that is the combination of the above two different types of moiré methods. In the proposed method, a lattice surface is moved vertically while, at the same time, a light source or a point of observation is moved horizontally. This allows the fringe phase to be shifted relative to a work with fringes of all orders being substantially matched in phase. Therefore, a plurality of moiré fringe images can be processed by the principle of a high-speed scanning method (phase shifting method). This increases the density of points of measurement and allows one period of moiré fringes to be physically divided by about $\frac{1}{40}$ to $\frac{1}{100}$. The method can therefore implement the detection of a projection or a recess and high sensitivity, which have been difficult to achieve with the stereoscopic lattice type of moiré method.

The method of Laid-Open Publication No. 4-147001, however, contemplates to substantially accurately shift all fringe orders in relation to the application of the phase shifting method to the stereoscopic lattice type of moiré method. As a result, sophisticated mechanisms are essential for the vertical movement of the lattice surface and the horizontal movement of the light source of the point of observation. Moreover, the method must repeatedly shoot a work three times or more, resulting in a long measuring time.

On the other hand, Japanese Patent Laid-Open Publication No. 7-332956 proposes to obviate differences between fringe intervals dependent on fringe order by matching the phases of all fringes at the time of shift. Also, this document implements phase shift based only on lattice movement. However, when a cylindrical work, for example, should have its entire surface measured, this kind of scheme must repeat lattice movement and image pickup while causing the work to make three or more rotations, also resulting in a long measuring time.

Japanese Patent Laid-Open Publication No. 10-54711 teaches a method that shifts the phase by varying the height of a work. This, however, also needs the movement of the work and repeated image pickup, increasing the measuring time. In addition, the above document does not describe any specific procedure for the quantization of the configuration of a projection or that of a recess.

SUMMARY OF THE INVENTION

It is an object of the present invention to provide a method and an apparatus that allow the phase shifting method to be easily applied to the stereoscopic lattice type of moiré method, thereby implementing rapid, accurate tridimensional measurement of the surface of a drum or similar cylindrical work or a liquid crystal device or similar flat work.

It is another object of the present invention to provide a method and an apparatus capable of outputting at least three moiré fringe images shifted in phase by shooting a single measurement range only one time, thereby reducing the measuring time.

A surface configuration measuring method of the present invention uses, as testing optics, stereoscopic lattice type of moiré optics including a light source and a lattice pattern for producing moiré fringes and a light-sensitive device including a lens and a camera for picking up the moiré fringes. Moiré fringes of particular fringe order are shifted by a preselected phase while the measurement range of the testing optics is limited to the vicinity of the particular fringe order, thereby generating at least three moiré image data shifted in phase. The moiré image data are arithmetically processed to thereby tridimensionally measure the surface configuration of a work.

An apparatus for practicing the above method is also disclosed.

BRIEF DESCRIPTION OF THE DRAWINGS

The above and other objects, features and advantages of the present invention will become more apparent from the following detailed description taken with the accompanying drawings in which:

FIGS. 12A through 12C demonstrate correction executed to cope with the shift of a pickup position;

FIGS. 16A through 16E show the principle of measurement particular to a fifth embodiment of the present invention;

FIGS. 21A through 21C show the principle of measurement unique to the sixth embodiment;

FIGS. 46A through 46C show a procedure unique to the thirteenth embodiment;

FIGS. 48A through 48C show a procedure particular to the illustrative embodiment;

FIGS. 52A through 52C show a procedure particular to the fourteenth embodiment;

FIG. 60 shows a light-sensitive device included in a sixteenth embodiment of the present invention;

FIG. 61 is a block diagram schematically showing a signal processing device included in an eighteenth embodiment of the present invention; and FIGS. 62A through 62C demonstrate the operation of the signal processing device.

DESCRIPTION OF THE PREFERRED EMBODIMENTS

Figure 1:
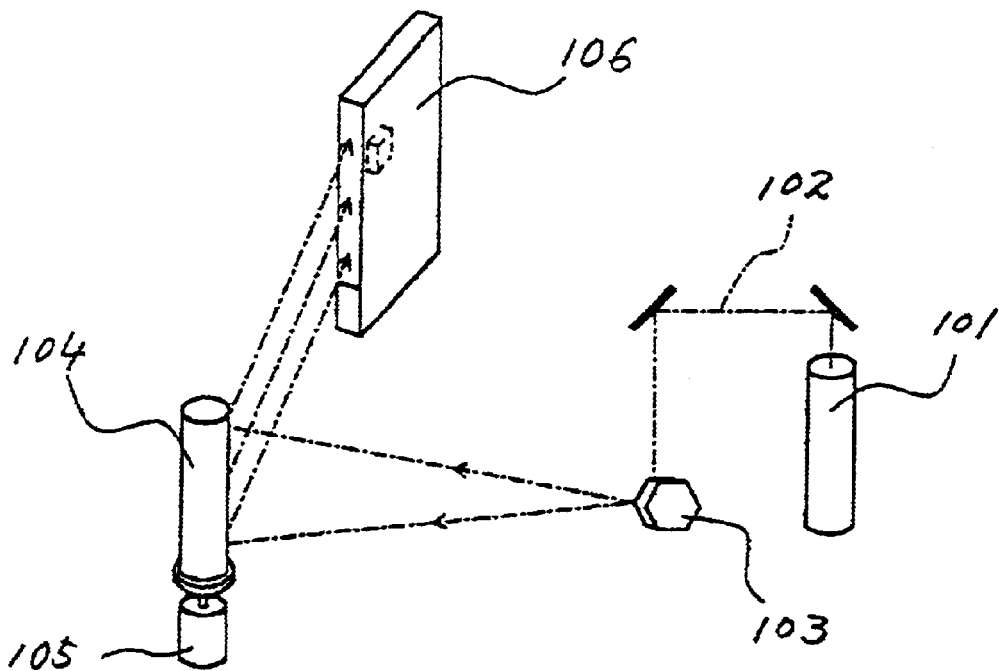
FIG. 1 is an isometric view showing a conventional surface configuration measuring apparatus.

To better understand the present invention, reference will be made to the defect testing method taught in the previously mentioned Laid-Open Publication No. 2-201142, shown in FIG. 1. As shown, a laser beam 102 issuing from a light source 101 scans the surface of a photoconductive drum or similar cylindrical work 104 via a polygonal mirror 103 in the axial direction of the drum 104. A motor 105 rotates the drum 104. A photoconductive layer forming the surface of the drum 104 reflects the laser beam 102. The reflection from the normal surface of the drum 104 is substantially incident to a sensor 106. The sensor determines the intensity of the incident reflection and feeds its output to, e.g., a preselected data processing section not shown. Such a procedure determines that the surface configuration of the drum 104 is defective when the output of the sensor 106 is unusually low.

Figure 2:
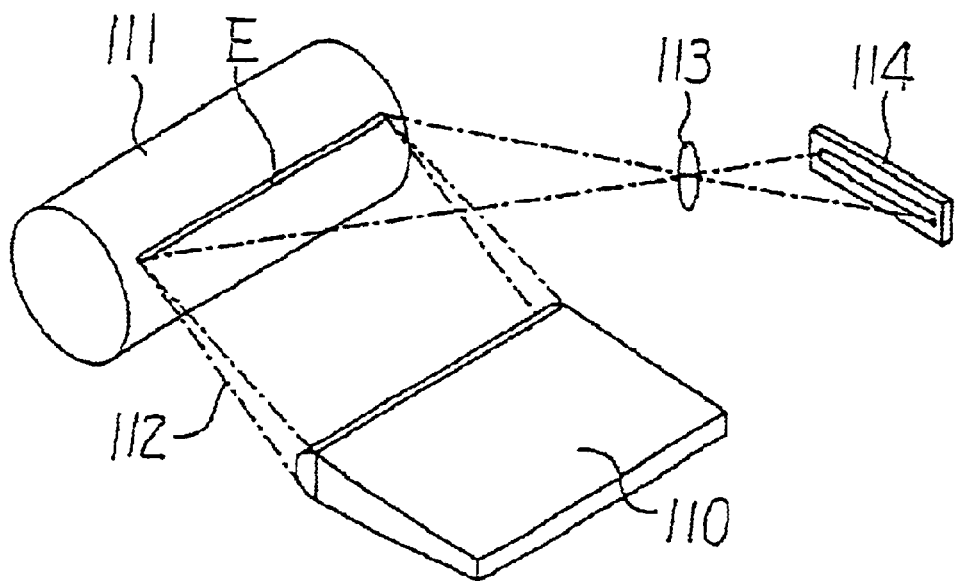
FIG. 2 is an isometric view showing another conventional surface configuration measuring apparatus.

FIG. 2 shows the method proposed in the Laid-Open Publication No. 4-169840 also mentioned earlier. As shown, a projector 110 includes a halogen lamp or similar light source, not shown, for issuing light 112 toward a photoconductive drum 111 via a slit not shown. Reflection from the drum 111 diffused by the defects of the drum 111 is focused by a lens 113 on a line sensor 114. The line sensor 114 has an array of pixels and receives the reflection over a range E shown on the surface of the drum 111. This method detects unusual reflection ascribable to defects.

The conventional methods described above successfully detect pin holes, marks ascribable to hitting or scratching, defects ascribable to dust and other defects that cause the surface of the cylindrical body to noticeably vary. However, sensing accuracy is limited when it comes to irregularity in the thickness of the photoconductive layer, scratches on a support member and other defects that cause the surface to vary in height little.

Figure 3:
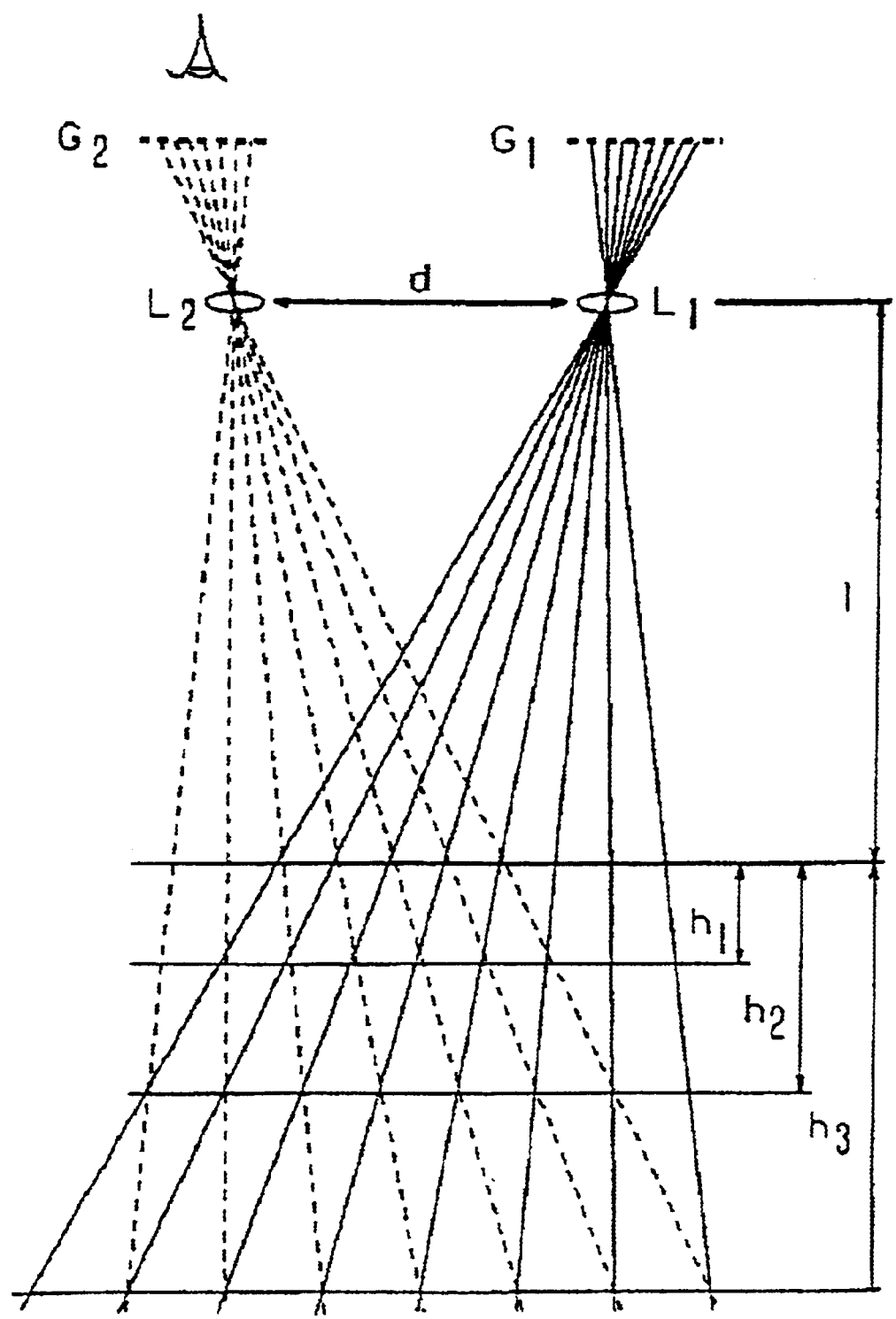
FIG. 3 demonstrates the lattice projection type of moiré method.
Figure 4:
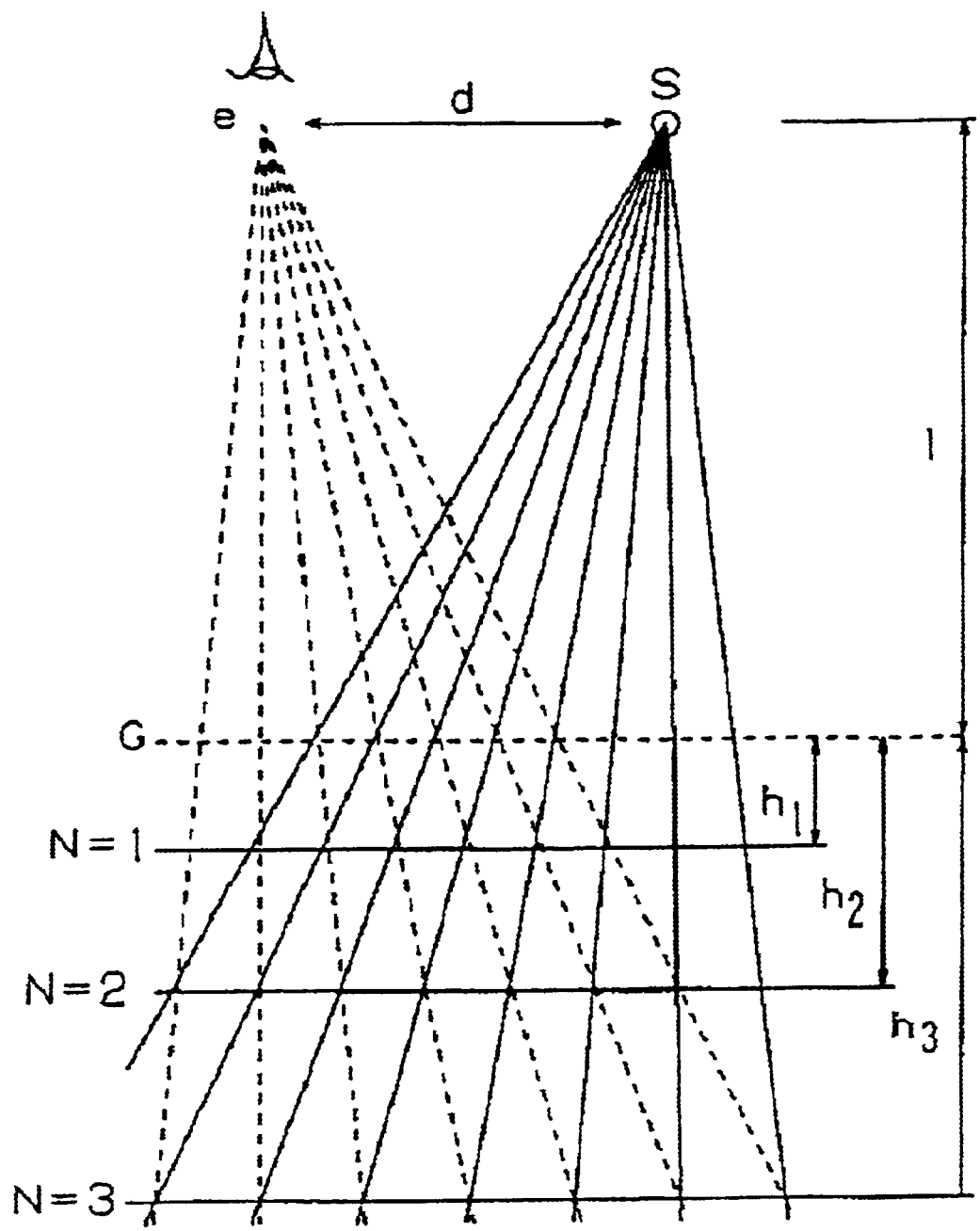
FIG. 4 demonstrates the stereoscopic lattice type of moiré method.

The moiré method belonging to a family of tridimensional measuring methods will be described hereinafter. As shown in FIG. 3, the lattice projection type of moiré method uses two small lattices G1 and G2 assigned to projection and observation, respectively. The lattice G1 is protected on a work via a lens L1 while the resulting lattice lines deformed in accordance with the configuration of the work are focused on the other lattice G2 via the lens L2. The contour lines appear at a plurality of distances, e.g., h1, h2 and h3 from a reference plane. As shown in FIG. 4, the stereoscopic lattice type of moiré method uses a single lattice G positioned in a reference plane and a point source S positioned in place of the lens L1, FIG. 3. Eye e is positioned in place of the lens L2, FIG. 3, for observation. The shadow of the lattice G formed by the point source S is incident on a work. Eye e observes the shadow deformed in accordance with the surface configuration of the work via the lattice G, i.e., moiré fringes formed by the lattice G and the deformed shadow of the lattice G.

The moiré methods described above have the previously stated problems left unsolved.

Figure 5:
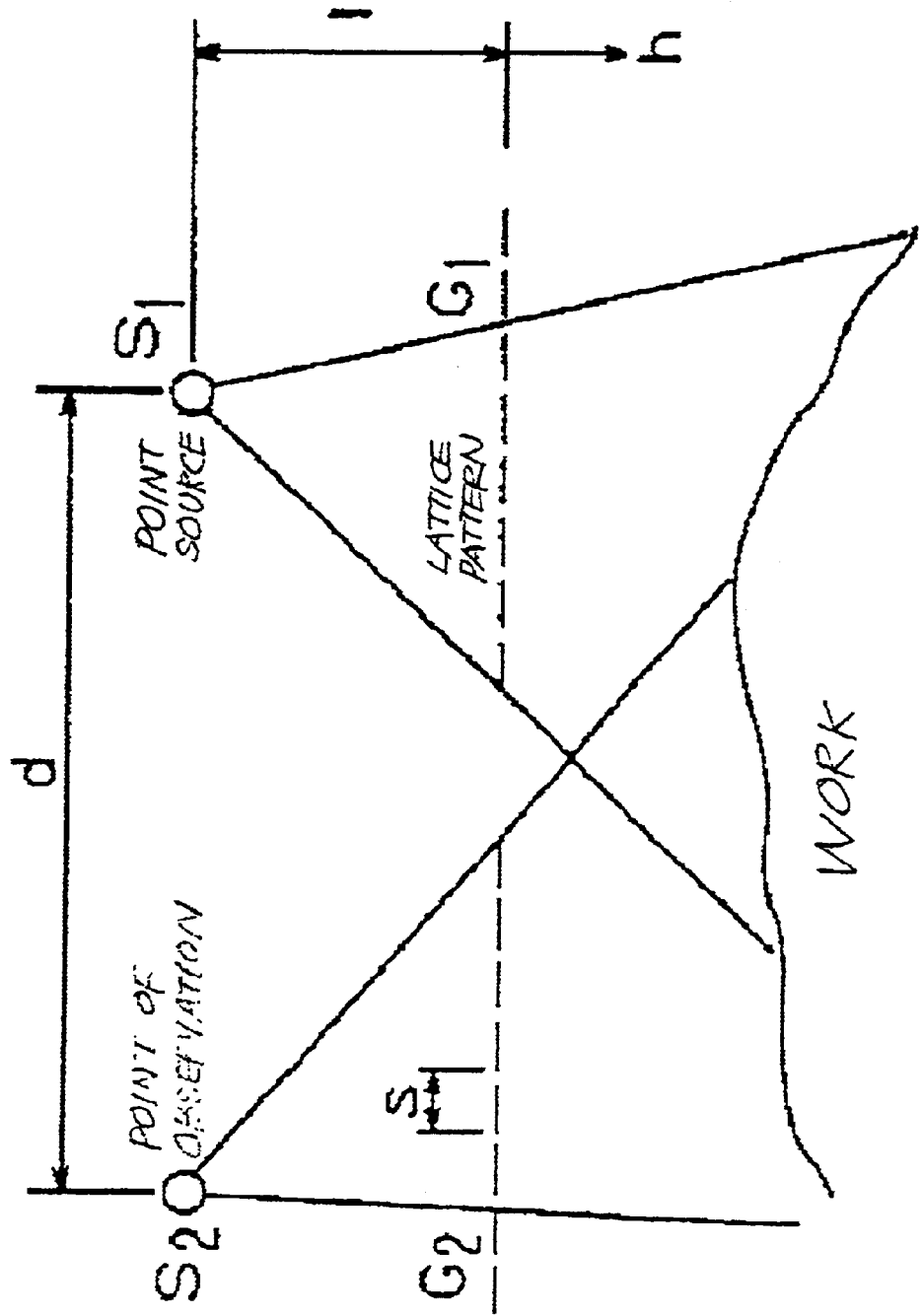
FIG. 5 shows the principle of tridimensional measurement using the moiré method with which the present invention is practicable.

The principle of tridimensional measurement using the moiré method and the phase shifting method on which the present invention is based will be described hereinafter. First, the principle of tridimensional measurement will be described. As shown in FIG. 5, assume that two lattices G1 and G2 have a pitch of s each, that a light source S1 and a point of observation S2 are spaced by a distance of d, and that a distance between the light source S1 and point of observation S2 and a lattice plane is l. Also, assume that the lattices G1 and G2 lying in the same plane both have the pitch s, but are deviated from each other by $\epsilon$ in the plane, i.e., by $2\pi\epsilon/s$ in terms of the phase of the lattice pitch. Then, the resulting moiré fringes may be expressed:

$$\cos\frac{2\pi}{s}\left\{\frac{dh-\varepsilon(h+1)}{(h+1)}\right\} \qquad \text{Eq. (1)}$$

Assuming that the lattice plane is the reference (zeroth order), then moiré fringes (contour lines) have fringe orders that are sequentially counted as first order, second order and so forth as the distance from the lattice plane increases. Assume the N-th order moiré fringes are $\cos 2\pi N$. Then, the contour lines of the N-th order moiré fringes are formed at a distance of hN from the reference plane:

$$hN = \frac{(Ns+\varepsilon)l}{d-Ns-\varepsilon} \qquad \text{Eq. (2)}$$

The distance nH does not include the ordinate x in a measurement plane and is therefore a unique value determined by the fringe order N (without regard to the ordinate x). That is, the distance hN shows that contour lines are formed.

Figure 6:
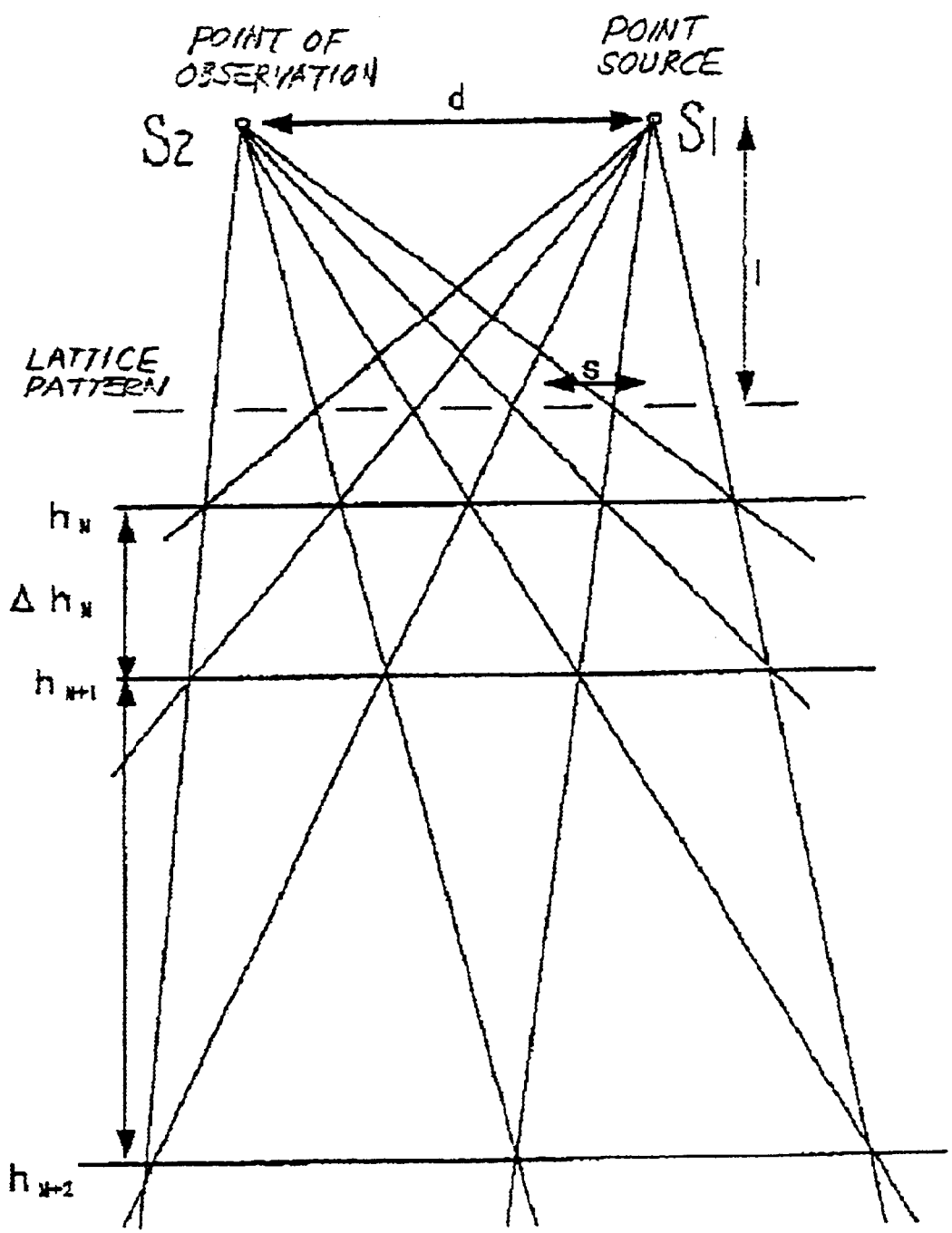
FIG. 6 shows the stereoscopic lattice type of moiré method in relation to the principle of the present invention.

FIG. 6 shows a stereoscopic lattice type of arrangement including a point source S1, a point of observation S2, and a single continuous lattice pattern G ($\epsilon$=0). Because $\epsilon$ is zero, the Eq. (2) derives:

$$hN = \frac{Nsl}{d-Ns} \qquad \text{Eq. (3)}$$

In this case, the distance $\Delta hN = hN+1 - hN$ is not constant, but is dependent on the fringe order N.

Figure 7:
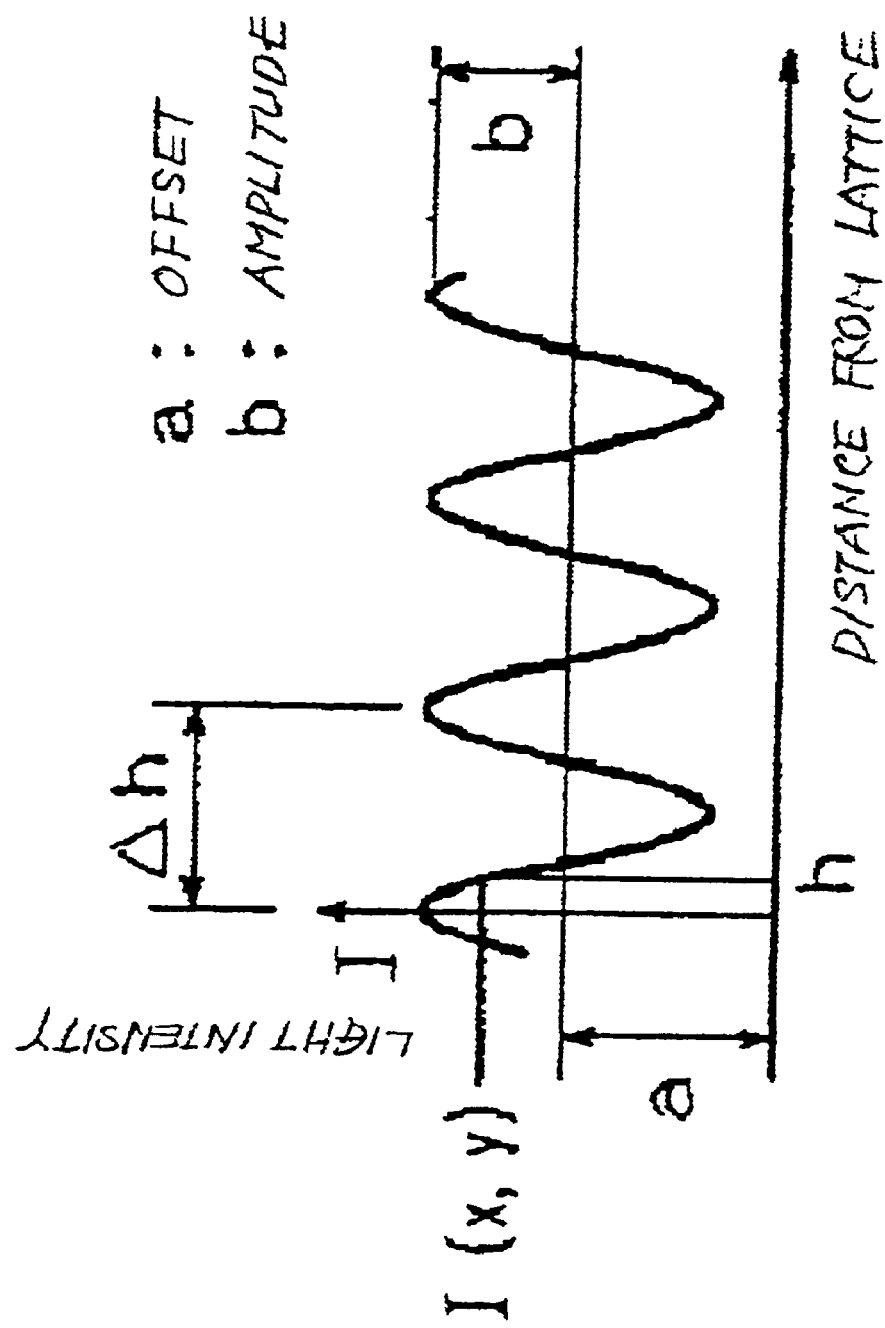
FIG. 7 demonstrates a phase shifting method.

Now, the phase shifting method will be described hereinafter. A fringe image modulated in phase can be represented by light intensity I expressed as:

$$I = I(\theta) = a(x,y) + b(x,y)\cos(\Phi)(x,y) + \theta$$

where a denotes an offset bias, b denotes an amplitude, $\theta$ denotes a phase capable of being manipulated, and $\Phi$ denotes a phase value corresponding to height (see FIG. 7).

What should be determined here is the phase $\Phi(x,y)$ of each point (x,y) in the measurement plane. Because the bias and amplitude are unknown and dependent on the surface reflectance and smear, three fringe images having phases $\theta$ of zero, $\pi/2$ and $\pi$, respectively are produced:

$$I1 = I(0) = a(x,y) + b(x,y)\cos(\theta(x,y) + \theta)$$

$$I2 = I(\pi/2) = a(x,y) - b(x,y)\sin(\Phi(x,y) + \theta)$$

$$I3 = I(\pi) = a(x,y) - b(x,y)\cos(\Phi(x,y) + \theta)$$

It follows that if the phase $\Phi(x, y)$ included in the following Eq. (4) is calculated, then it is possible to obtain the phase Φ(x, y) of each point (x, y) free from the reflectance and smear:

$$\Phi(x, y) = \tan^{-1}\frac{I3 - I2}{I1 - I2} + \pi/4 \qquad \text{Eq. (4)}$$

By calculating the phase Φ(x, y) with the Eq. (4), it is possible to determine the phase Φ(x, y) at each point (x, y).

As the Eq. (3) and FIG. 6 indicate, when the phase shifting method is applied to stereoscopic lattice type of moiré optics, the fringe interval Δhn is dependent on the fringe order N. As a result, moiré fringes can be accurately shifted in phase at a certain fringe order N, but cannot be done so at the other fringe orders.

Figure 8:
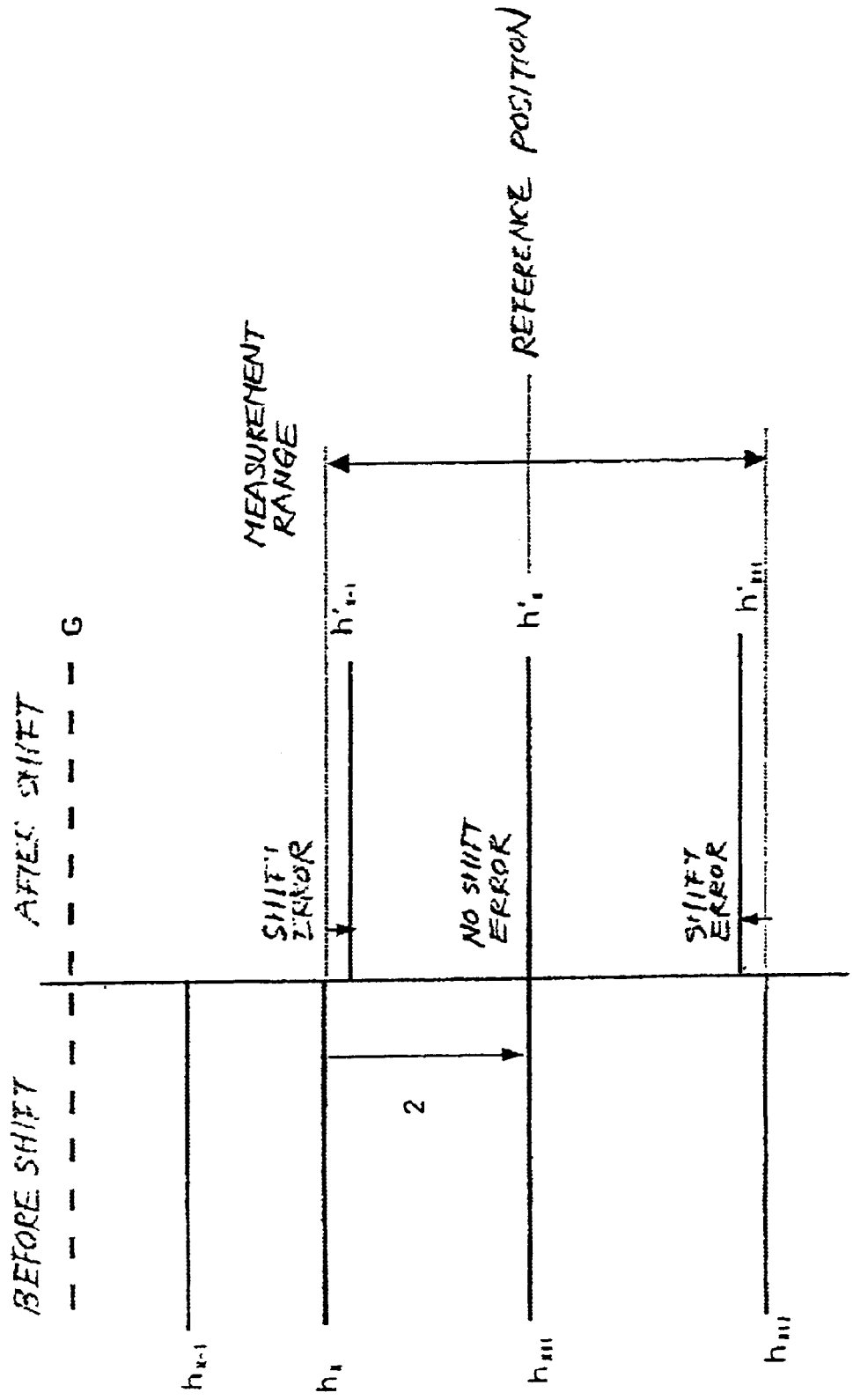
FIG. 8 shows the principle of measurement unique to a first embodiment of the present invention.

In light of the above, the present invention first accurately shifts the phase of moiré fringes of particular fringe order by a preselected phase instead of dealing with all fringe orders. As shown in FIG. 8, the present invention causes stereoscopic lattice type of moiré optics to effect measurement at only several fringe orders (e.g. ±1 orders) on the basis of the height of a particular fringe order accurately shifted in phase (no shift error). In this case, the shift error is maximum at the end of the measurement range, the range of measurement is selected such that a measurement error ascribable to the shift error is sufficiently small (see FIG. 8). This allows the phase shifting method to be simply applied to the stereoscopic lattice type of moiré optics without any trouble.

First Embodiment

Figure 9:
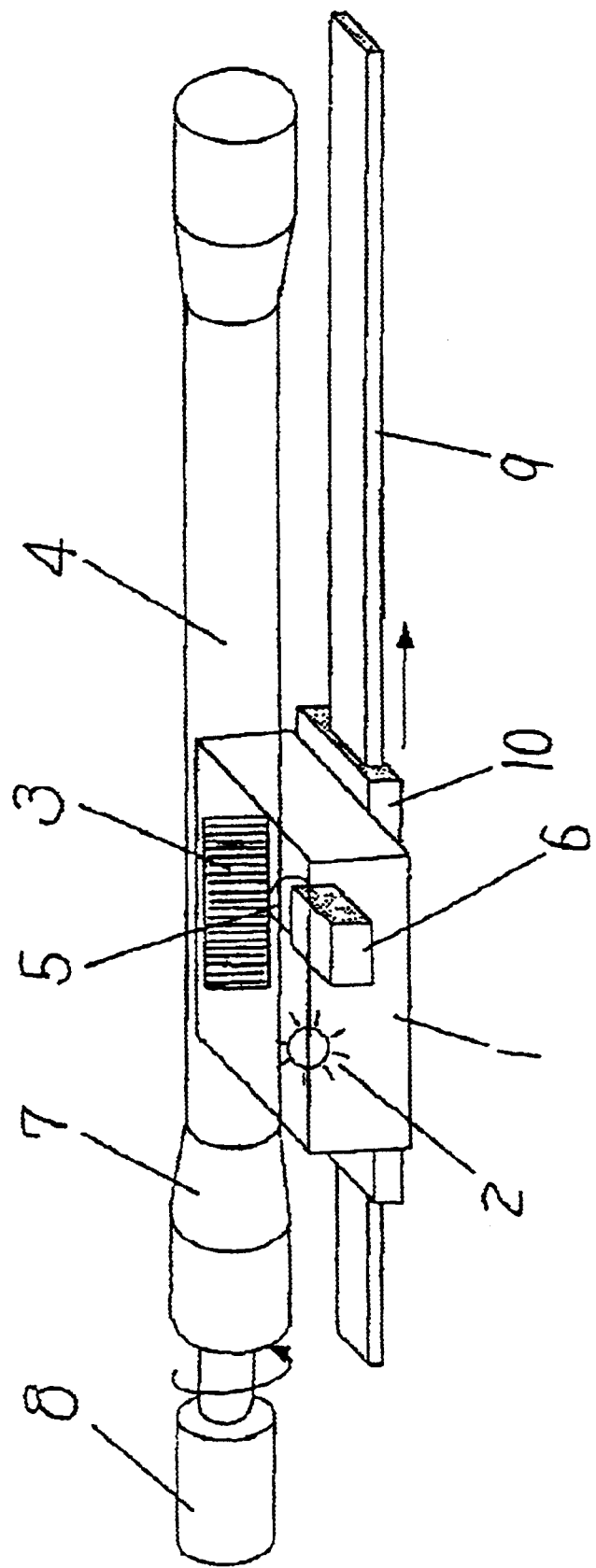
FIG. 9 is an isometric view showing a measuring apparatus of the first embodiment.

Reference will be made to FIGS. 5 through 9 for describing a first embodiment of the present invention. FIG. 9 shows a specific surface configuration measuring device based on the principle described above. As shown, the measuring device includes testing optics 1 accommodating a light source, 2, a lattice pattern 3, a lens 5, and a line sensor camera 6. The lens 5 and line sensor camera 6 constitute optics for picking up moiré fringes representative of the surface configuration of a photoconductive drum or similar cylindrical work 4 to be tested. The optics is of the stereoscope type of moiré optics operable with the principle shown in FIG. 6.

The testing optics 1 is located to face the surface of the drum 4 at a certain position. While a motor 8 causes the drum 4 to rotate via a chuck 7, the line sensor camera 6 picks up moiré fringes. In this condition, the drum 4 is constantly located at substantially the same height, so that the line sensor camera 6 picks up only a narrow, limited range in the circumferential direction of the drum 4. It follows that the measurement range can be limited to several fringe orders on the basis of a particular reference fringe order.

After the first shot, a phase shifting mechanism, not shown, accurately shifts the phase of the moiré fringes by π/2, which is a desired phase. After the second shot, the phase shift mechanism again accurately shifts the phase by π/2. This is followed by the third shot. Data processing means, not shown, calculates the tridimensional surface configuration of the drum 4 on the basis of the resulting thee image data by using the Eq. (4). More specifically, the image data output from the line sensor camera 6 is digitized and then input to a personal computer or similar data processing device. The personal computer calculates phases with the three shifted image data for thereby producing tridimensional coordinates, i.e., a surface configuration based on the Eq. (4). Such a data processing procedure also applies to other embodiments to be described later.

While the illustrative embodiment has concentrated on three steps, i.e., zero, π/2 and π/3, these three steps are the minimum number of steps essential with the phase shifting method. If desired, four or more different steps may be applied to the phase shifting method.

Generally, the waving or dints on the surface of the drum 4 each have a difference in height of several micrometers and cannot be easily detected by eye. To detect such a defect, the testing optics 1 must include a light receiving system having a great magnification. This, however, narrows a field of view to be picked up and therefore makes it necessary to test consecutive zones of the drum 4 one by one. Therefore, as shown in FIG. 9, it is more workable to implement the testing optics 1 as a division-direction moving mechanism including a guide mechanism 9 and mounted on an automatic single axis, automatic stage 10. In this configuration, after the testing optics 1 has tested the entire circumference of the drum 4 at one zone, the automatic stage 10 moves the testing optics 1 to the next zone for testing the drum 4. By repeating such a shot and axial movement, it is possible to pickup the entire drum 4.

If desired, the drum 4 may be moved in the axial direction in place of the testing optics 1. The crux is that the moving mechanism repeatedly moves one of the testing optics 1 and drum 4 relative to the other by each preselected distance. This also applies to other embodiments to be described later.

Second Embodiment

A second embodiment of the present invention will be described hereinafter. Briefly, the illustrative embodiment varies a distance between the light source and the point of observation (image pickup point) for thereby shifting moiré fringes of particular fringe order by the preselected phase.

Figure 10:
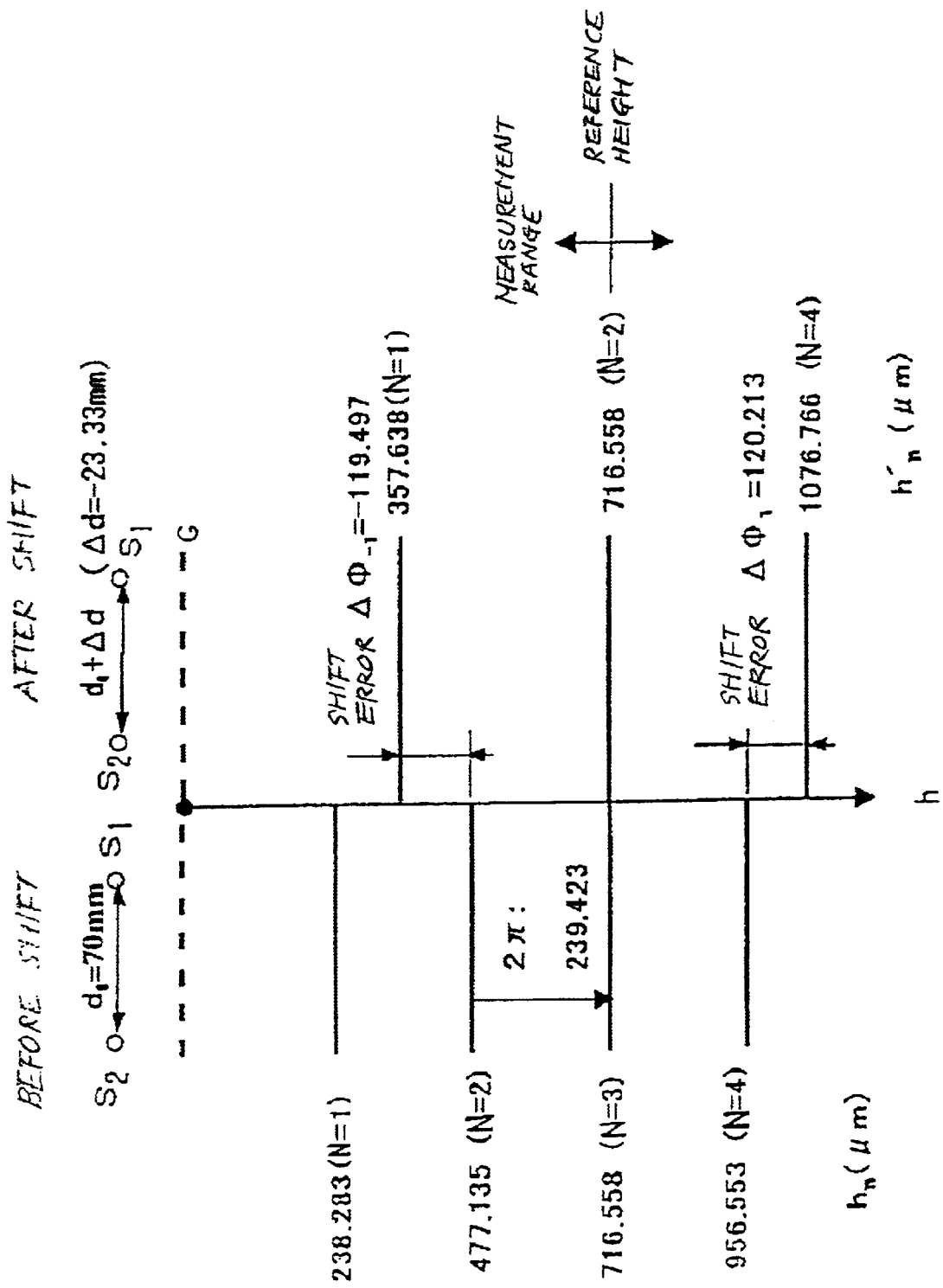
FIGS. 10 and 11 show the principle of measurement particular to a second embodiment of the present invention.

First, assume that the distance d=d0 between the light source S1 and the point of observation S2 is varied in order to shift the phase of the moiré fringes (see FIG. 10). As shown at the left side of FIG. 10, when the distance d is d0, the (N+1)-th order moiré fringes have the following contour lines produced from the Eq. (3):

$$hN + 1 = \frac{(N + 1)sl}{d0 - (N + 1)s} \qquad \text{Eq. (5)}$$

Next, as shown at the right side of FIG. 10, when the distance d is varied from d0 to d0+Δd, h'N to the N-th order moiré fringes after the shift is produced by:

$$h'N = \frac{Nsl}{d0 + \Delta d - Ns} \qquad \text{Eq. (6)}$$

Figure 11:
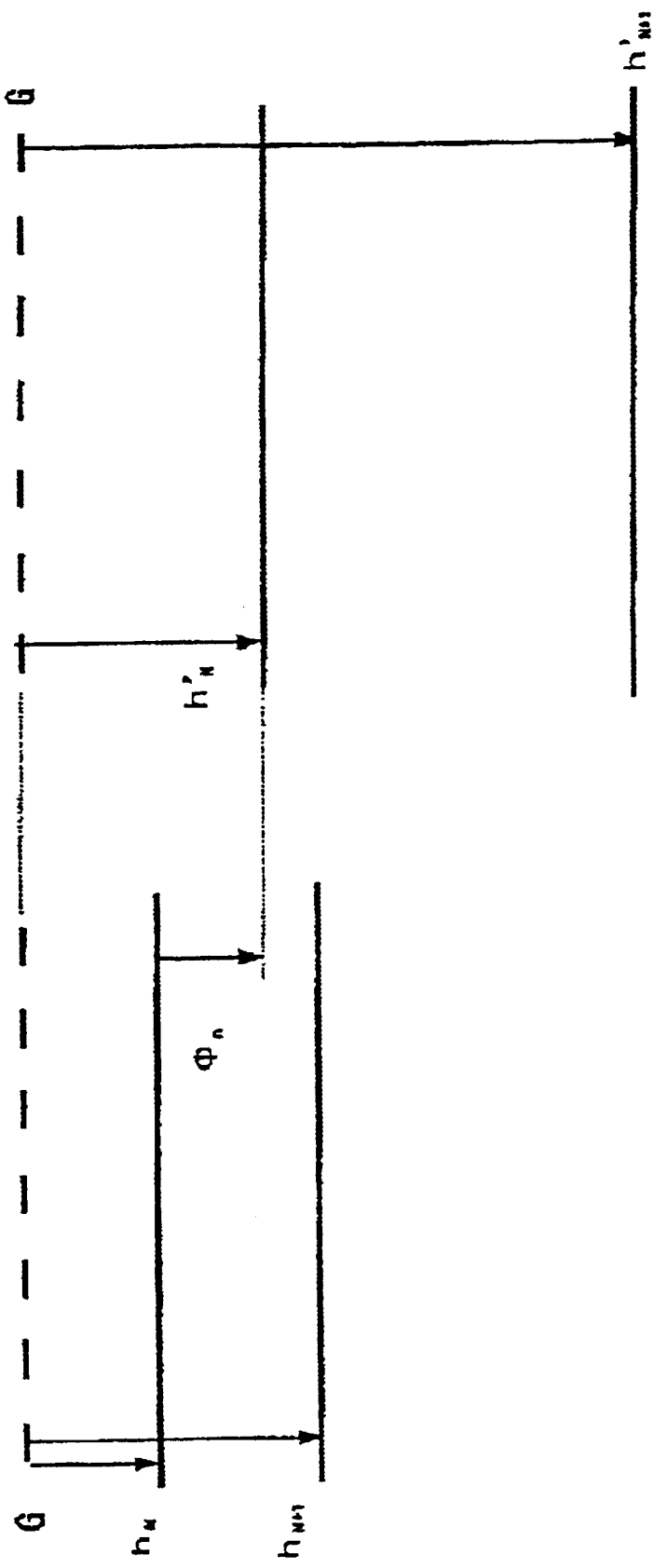

As shown in FIG. 11, assume that the N-th order moiré fringes after the movement of the lattice are positioned at the phase Φn between the N-th order moiré fringes before the movement of the lattice and the (N+1)-th order moiré fringes. Then, there holds:

$$hN+(hN+1-hN)(\Phi n/2\pi)=hN \qquad \text{Eq. (7)}$$

By substituting the Eqs. (5) and (6) for the Eq. (7), there holds:

$$\Delta d = \frac{-d0(d0 - Ns)\Phi n}{2\pi N\{0 - (N + l)s\}d0\Phi n} \qquad \text{Eq. (8)}$$

The above Eq. (8) clarifies the relation between Δd and the amount of phase shift Φn.

Assume that fringes with a=83.3 μm, l=200 mm, d0=70 mm and fringe order N=2 before the movement of the lattice are to be accurately shifted by 2π. When the above parameters are substituted for the Eq. (8), there is produced Δd=−d0/3=−233 mm. FIG. 10 shows fringe contour lines before and after the movement of the lattice effected by Δd. Consequently, a height h2π corresponding to the phase 2 is 239.423 μm. As FIG. 10 indicates, while the phase is accurately shifted by 2π at the height of the order N of 3 before movement, shift errors of ΔΦ±1 occur at the heights of the orders N of 2 and 4 before movement. The measurement range is confined in the range in which such shift errors do not influence the accuracy of measurement. With the configuration of FIG. 5 including the line sensor camera 6, it is possible to limit the measurement range to several fringe orders because the position of the drum 4 remains substantially at the same height.

A procedure for measurement will be described hereinafter. Assume that the initial value of d is d0, and that the amounts of variation Δd are Δd0 (=0), Δd1 and Δd2 when Φn of the Eq. (8) is 0, π/2 and π, respectively. Then, first, moiré fringes are picked up over one rotation of the drum 4 at d=d0 (step 0). Subsequently, the second moiré fringes are picked up at d=d0+Δd1 (step 1). Further, the third moiré fringes are picked up at d=d0+Δd2 (step S2). The resulting three images and the Eq. (4) are used to calculate the configuration of the drum 4.

When the point of observation (line sensor camera 6) is moved to vary the distance d, it is important to note that the pickup position is also shifted for each image shifted in phase. A method of correcting the shift of the pickup position will be described hereinafter. First, moiré fringes are picked up at a position shown in FIG. 12A. As shown, the line sensor camera 6 picks up points N1 through N12 on the drum 4 with pixels #1 through #12, respectively. For example, the line sensor camera 6 picks up the point N5 with the pixel #5.

Subsequently, as shown in FIG. 12B, the line sensor camera 6 is shifted to vary the distance d by Δd/4=π/2 and picks up the points N3 through N12 with the pixels #1 through #10, respectively. The pixel #3 therefore picks up the point N5. Thereafter, the line sensor camera 6 is further shifted to vary the distance d by another Δ/4, i.e., by Δd/2=π in total. In this condition, the line sensor camera 6 picks up the points N5 through N12 on the drum 4 with the pixels Nos. 1 through N8, respectively. The pixel #1 therefore picks up the point N5.

As stated above, the point N5 on the drum 4 is picked sequentially picked up by the pixels #5, #3 and #1 in this order, so that the resulting images are shifted from each other by a constant interval. Therefore, by using the image shifted by two pixels in the horizontal direction from the second shot and the image shifted by four pixels in the same direction from the third shot, it is possible to determine the phases of the points N5 through N12 on the basis of the Eq. (4).

Third Embodiment

In the illustrative embodiment, a drum moving mechanism or phase shifting mechanism, not shown, varies the position of the drum 4 in the direction of optical axis of the line sensor camera 6. This is also successful to shift moiré fringes of particular order by the desired phase.

For example, in FIG. 6, the drum 4 is first held at the height hN and picked up. Subsequently, the drum moving mechanism sequentially moves the drum 4 by hN/4 and hN/2 away from the lattice pattern G; the drum 4 is picked up at each of the positions hN/4 and hN/2. A rotary encoder, not shown, is mounted on the output shaft of the motor 8 in order to match the third pickup start position. Image data relating to the resulting three moiré fringes are processed on the basis of the Eq. (4), thereby calculating the configuration of the drum 4.

Fourth Embodiment

Figure 13:
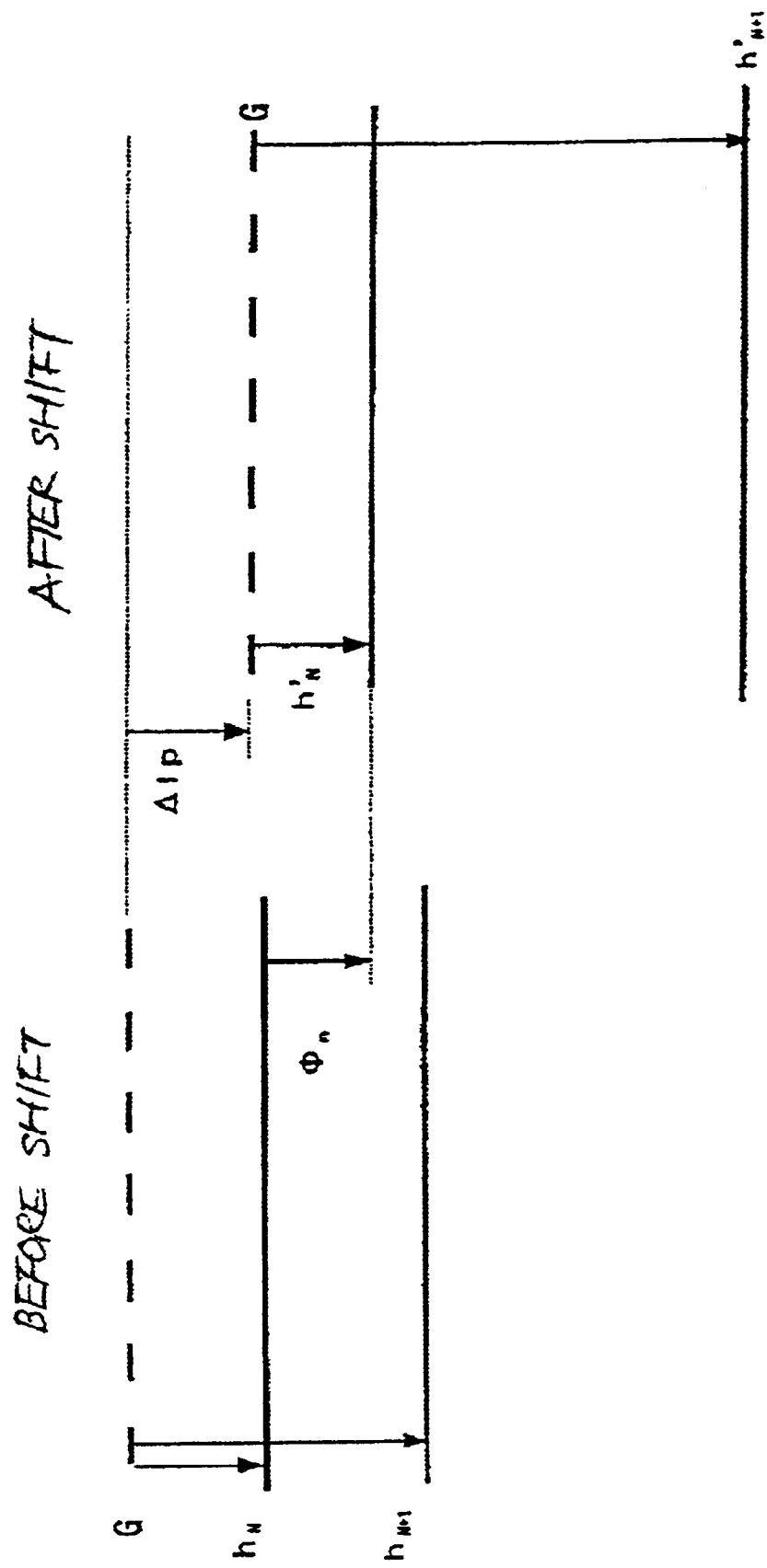
FIG. 13 shows the principle of measurement particular to a fourth embodiment of the present invention.
Figure 14:
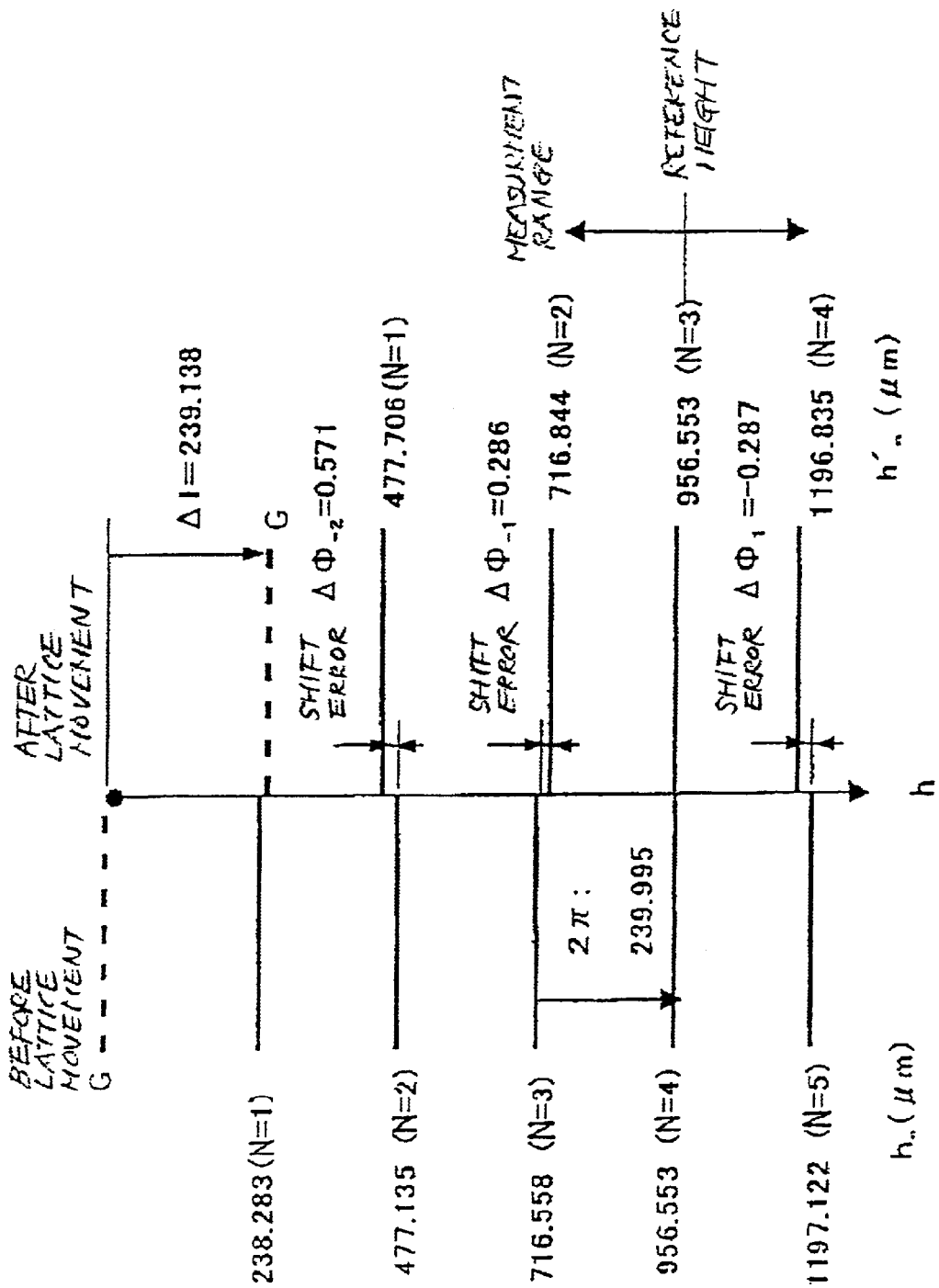
FIG. 14 shows the fourth embodiment more specifically.
Figure 15:
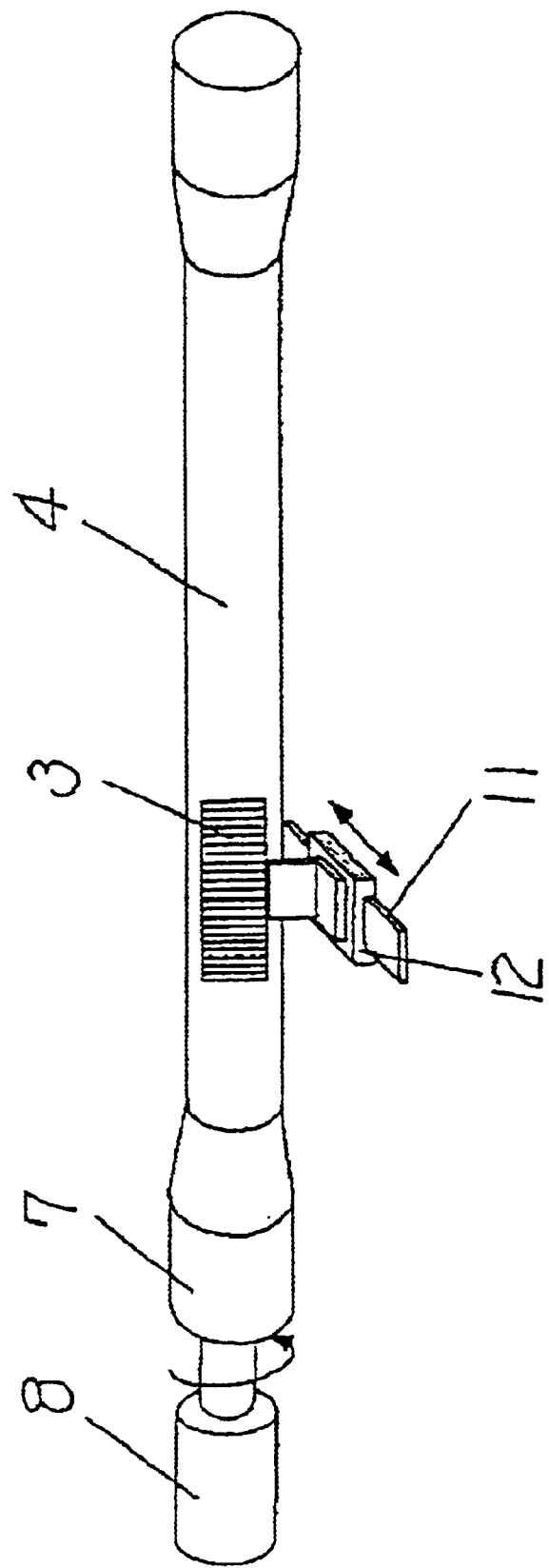
FIG. 15 is an isometric view showing a lattice moving mechanism included in the fourth embodiment.

FIGS. 13 through 15 show a fourth embodiment of the present invention. In the illustrative embodiment, a lattice pattern moving mechanism or phase shifting mechanism shown in FIG. 15 varies the position of the lattice pattern 3 on the optical axis of the line sensor camera 6, thereby shifting moiré fringes of particular order by a desired phase.

Assume that the position of the lattice pattern 3 is varied from l by Δlp, as shown in FIG. 13. Then, the moiré contour line of the (N+1)-th order before movement is derived from the Eq. (3):

$$hN+1 = \frac{(N+1)sl}{d-(N+1)s} \qquad \text{Eq. (5)}'$$

Next assume that the lattice pattern 3 is moved to shift the moiré fringes. Then, a distance h'N to the N-th order fringes after the shift is produced by:

$$h'N = \frac{Ns(l+\Delta lp)}{d-Ns} \qquad \text{Eq. (9)}$$

As shown in FIG. 13, assume that the N-th order moiré fringes after the movement exist at a position with a phase Φn between the N-th order moiré fringes and the (N+1)-th order moiré fringes. Then, there holds:

$$hN+(hN+l-hN)(\Phi n/2\pi)=h'N+\Delta lp \qquad \text{Eq. (10)}$$

By substituting the Eqs. (5) and (9) for the Eq. (10), there is produced:

$$\Delta lp = \frac{ls\Phi n}{2\pi\{d-(N+l)s\}} \qquad \text{Eq. (11)}$$

The above Eq. (11) clarifies the relation between the displacement lp of the lattice pattern G and the amount of phase shift Φn.

Now, assume that fringes with s=83.3 μm, l=200 mm, d=70 mm and order N of 3 before the displacement of the lattice pattern 3 should be accurately shifted by 2π. That is, assume that N is 3 and that Φ3 is 2π. When such parameters are substituted from the Eq. (11), lp is 239.138 μm. Assuming that Δlp is Δl when N=3 and that Φ3 is 2, FIG. 14 shows the positions of moiré contour lines before and after the movement of the lattice pattern 3. Consequently, the height h2π corresponding to the phase 2π is 249.995 μm. Also, as FIG. 10 indicates, although the phase is accurately shifted by 2π at the height N of 4 before movement, shift errors of ΔΦ±1 occur at the heights N of 3 and 5 before movement. The shift errors are equal in absolute value, i.e., |Δ±1|=0.286 (μm). Because the height h2π of 239.995 (μm) corresponds to 2π, ΔΦ±1 may be translated into a phase (rad):

$$|\Delta\Phi\pm 1|=2\pi\times 0.286/239.995=7.48\times 10^{-3} \text{ (rad)}$$

Assume that the height N of 4 before the movement of the lattice pattern 3 is the reference height, and that the measurement range is limited to ±240 μm above and below the reference height. Then, in the case of measurement with a height resolution level of 1 μm (2.61×10⁻² rad) by way of example, the absolute value of the shift errors mentioned above is sufficiently small. When the line sensor camera 6 sequentially picks up the moiré fringes of the drum 4 in the above configuration, only several fringe orders should be picked up.

A procedure for measurement will be described hereinafter. As the Eq. (11) indicates, because Δlp and Φn are linear, the displacements Δ1 is zero, Δ¼ and Δ½ when Φ3 is zero, π/2 and π, respectively. FIG. 15 shows an automatic stage 11 playing the role of the lattice pattern moving mechanism and added to the configuration shown in FIG. 9. First, the line sensor camera 6 picks up moiré fringes over one rotation of the drum 4 with the lattice pattern 3 being located at the position 1. The automatic stage 11 may be implemented as a single-axis stage including a guide mechanism 12 for guiding the stage 11 in the direction of optical axis. More specifically, the stage 11 may use a rotary motor, a linear motor, a piezoelectric element or the like.

Subsequently, the stage 11 sequentially moves the lattice pattern 3 from the initial position by Δ¼ and Δ½ while the line sensor camera 6 shoots the lattice pattern 3 at such consecutive positions over one rotation each. A rotary encoder, not shown, is mounted on the output shaft of the rotary motor 8 in order to match the third pickup start position. Data processing device processes image data relating to the resulting three moiré images and calculates the configuration of the drum 4 by using the Eq. (4).

Fifth Embodiment

FIGS. 16A through 16E, 17A, 17B, 18 and 19 show a fifth embodiment of the present invention. In the previous embodiments, the same measurement range is picked up three or more consecutive times in order to produce moiré images shifted in phase. By contrast, with the stereoscopic lattice type of moiré optics, the fifth embodiment is configured to produce at least three moiré images shifted in phase by a single shot.

A measuring method unique to the illustrative embodiment will be described with reference to FIGS. 16A through 16E. First, at a time t1 shown in FIG. 16A, the lattice pattern 3 is located at the initial position while the line sensor camera 6 picks up a zone 1 of the drum 4.

Subsequently, at a time t2 shown in FIG. 16B, the lattice pattern 3 is displaced by Δ¼ in the direction of optical axis. In this condition, the line sensor camera 6 picks up a zone 2 of the drum 4. At a time t3 shown in FIG. 16C, the lattice pattern 3 is further moved by Δ¼, i.e., by Δ½ in total in the direction of optical axis while the line sensor camera 6 picks up a zone 3 of the drum 4.

At a time t4 shown in FIG. 16D, the lattice pattern 3 is returned by Δ¼ in the direction of optical axis while the line sensor camera 6 picks up a zone 4 of the drum 4. Further, at a time t5 shown in FIG. 16E, the lattice pattern 3 is further moved by Δ¼ in the direction of optical axis, i.e., returned to the initial position while the line sensor camera 6 picks up a zone 5 of the drum 4. Such a procedure is repeated thereafter.

Figure 17A:
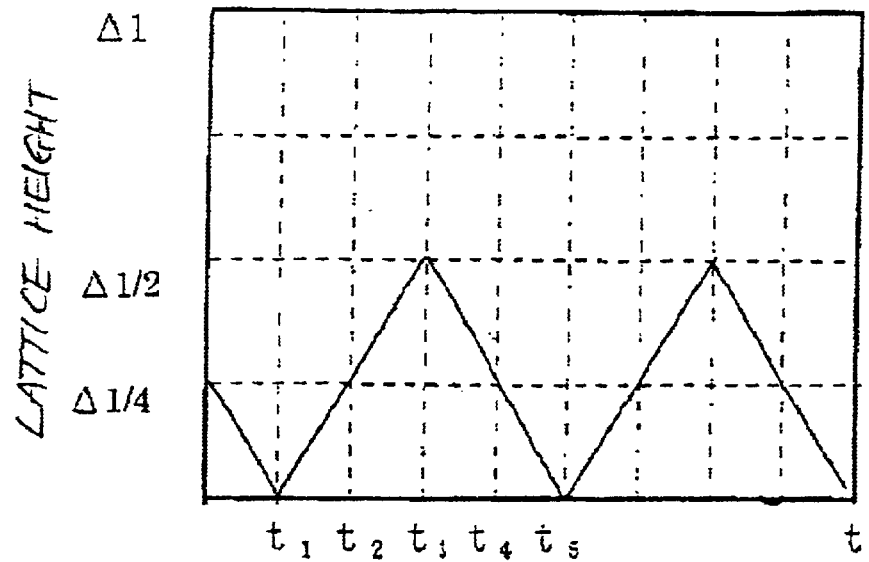
FIGS. 17A and 17B are timing charts representative of synchronization.
Figure 17B:
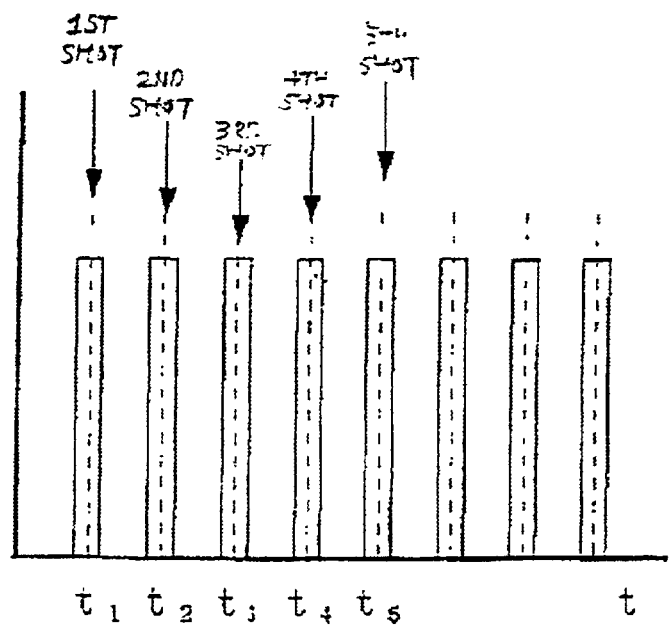

FIGS. 17A and 17B show a relation between the movement of the lattice pattern 3 and the pickup timing of the line sensor camera 6. For synchronization based on such timing control, use may be made of personal computer or similar data processing unit as synchronizing means.

Figure 18:
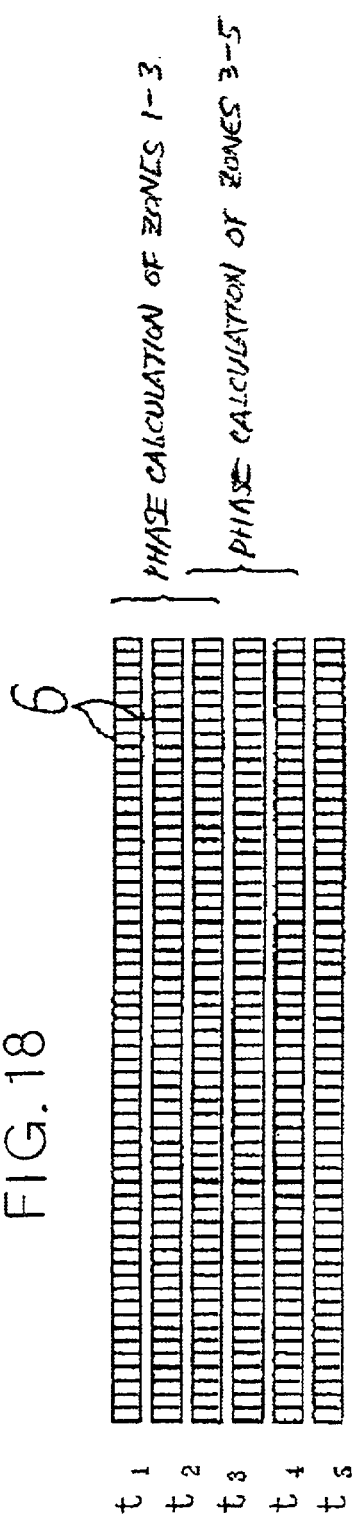
FIG. 18 shows image pickup time-serially.

FIG. 18 shows images produced by the procedure described above; the outputs of the line sensor camera 6 are arranged time-serially. The phase-by-phase moiré fringe data shown on the first to third rows in FIG. 18 and the Eq. (4) are used to measure the configurations of the zones 1 through 3 of the drum 4. Likewise, the phase-by-phase moiré fringe data shown on the third to fifth rows shown in FIG. 18 and the Eq. (4) are used to measure the configurations of the zones 3 through 5. In this manner, the contour of the entire drum 4 is measured.

It should be noted that the above-described three steps by which the phase is shifted is the minimum number of steps essential with the phase shifting method. Therefore, four or more steps maybe used to further promote accurate measurement.

The automatic stage 11 with the guide mechanism 21 shown in FIG. 15 is also applicable to the illustrative embodiment as a phase shifting mechanism for moving the lattice pattern 3 in the direction of optical axis.

Originally, each zone of the drum 4 should be picked up three or more times with the phase being sequentially shifted, so that phases are calculated on the basis of the Eq. (4). In practice, a position shown in FIG. 19 holds. As shown, assume that a width m between the zones 1 and 3 is 30 μm, that each zone is 10 μm wide, and that the drum 4 has a radius r of 15 mm. Then, a difference x in height over the width m is 7.5×10−3 μm, as determined by:

$$r2=(r-x)^2+m^2 \qquad \text{Eq. (12)}$$

The above difference x is negligible, compared to a difference in the height (several micrometers) of waving or dints to be measured. Further, waving or dint is elongate in the circumferential direction and is therefore not expected to sharply vary between the zones 1 and 3. Therefore, when the surface of the drum 4 is free from defects, the phase shifting method described above can be used on the assumption that the zones 1 through 3 are a single flat surface. It follows that the drum 4 should only make one rotation and that the lattice pattern 3 should only be moved in the direction of optical axis.

In the illustrative embodiment, the automatic stage or division-direction moving mechanism 10 moves the testing optics 1 in the axial direction of the drum 4. Also, the rotary motor or in-zone moving mechanism 8 rotates the drum 4 within each zone. It is therefore possible to measure the entire surface configuration of the drum 4 by picking it up. This is also true with the other embodiments.

Sixth Embodiment

Figure 20:
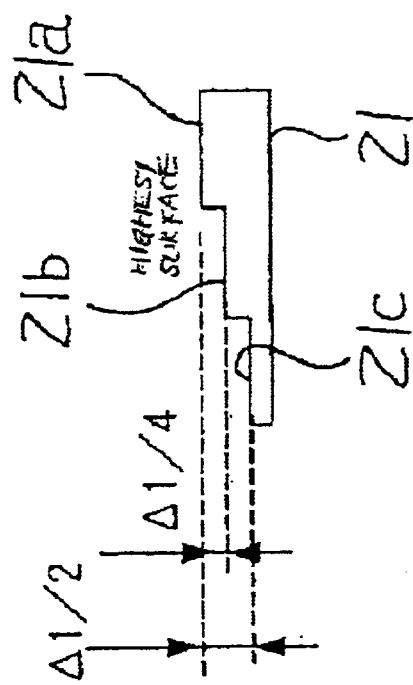
FIG. 20 is a side elevation of a stepped lattice pattern for use in a sixth embodiment of the present invention.
Figure 19:
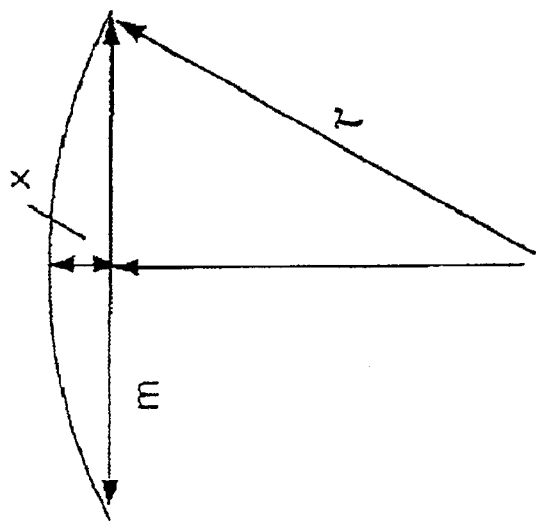
FIG. 19 shows zones included in a measurement area.

FIGS. 20 through 23 show a sixth embodiment of the present invention. FIG. 20 shows a stepped lattice pattern 21 used in the illustrative embodiment in place of the lattice pattern 3. As shown, the stepped lattice pattern 21 has three lattice surfaces 21a, 21b and 21c accurately formed with a difference in height of Δ¼ from each other. The stepped lattice pattern 21 is positioned on the optical axis of the line sensor camera 6. A moving mechanism, which will be described later, moves the stepped lattice pattern 21 back and forth in the direction perpendicular to the optical axis of the line sensor camera 6.

More specifically, at a time t1 shown in FIG. 21A, the highest lattice surface 21a of the lattice pattern 21 is positioned on the optical axis of the line sensor camera 6. The line sensor camera 6 picks up the zone 1 of the drum 4 via the lattice pattern of the lattice surface 21a. At a time t2 shown in FIG. 21B, the lattice pattern 21 is moved to bring the medium lattice surface 21b to the optical axis of the line sensor camera 6. The line sensor camera 6 picks up the zone 2 of the drum 4 via the lattice pattern of the lattice surface 21b. Further, at a time t3 shown in FIG. 21C, the lattice pattern 21 is moved to bring the lowest lattice surface 21c to the optical axis. The line sensor camera 6 picks up the zone 3 of the drum 4 via the lattice pattern of the lattice surface 21c.

Figure 22A:
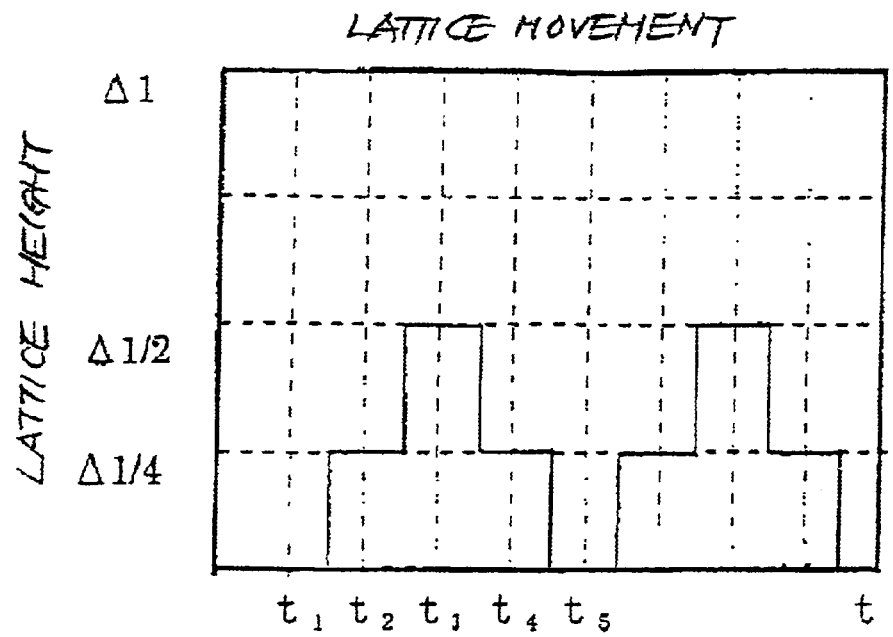
FIGS. 22A and 22B are timing charts representative of synchronization.
Figure 22B:
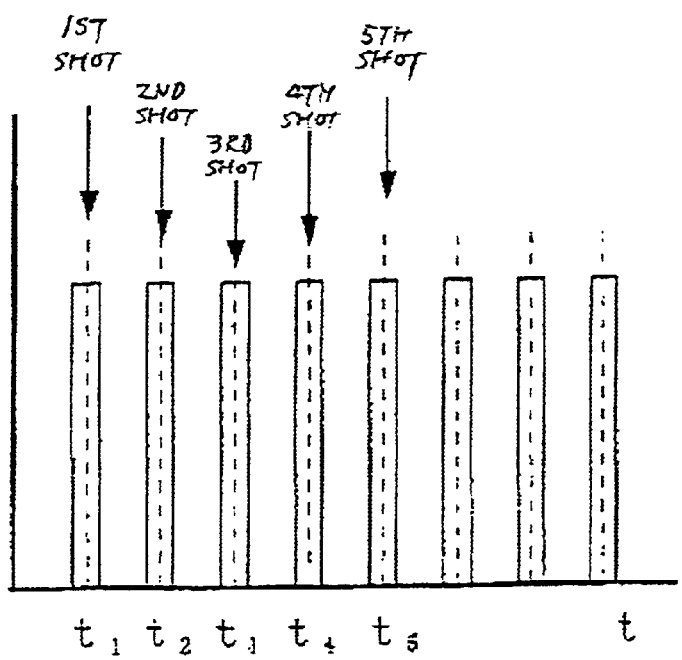

FIGS. 22A and 22B show a relation between the time-serial movement of the stepped lattice pattern 21 and the pickup timing of the line sensor camera 6. For synchronization based on such timing control, use may be made of personal computer or similar data processing unit as synchronizing means.

The line sensor camera 6 outputs moiré image data in the same manner as described with reference to FIG. 18. Therefore, measured is effected in the same manner as in the fifth embodiment.

Figure 23:
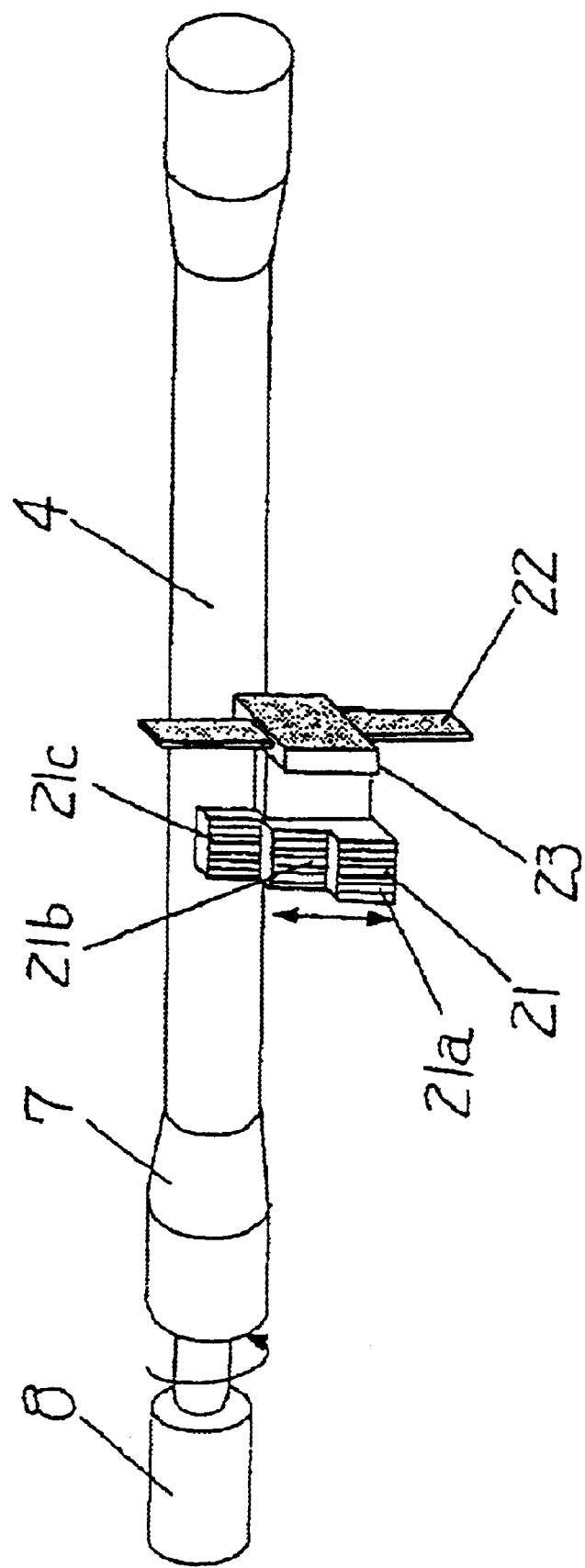
FIG. 23 is an isometric view showing a lattice moving mechanism included in the sixth embodiment.

FIG. 23 shows a specific moving mechanism for moving the stepped lattice pattern 21 back and forth in the direction parallel to the array of the steps 21a through 21c. As shown, the moving mechanism is implemented as a single axis, automatic stage 23 including a guide mechanism 22. In practice, the automatic stage 23 may include a rotary motor, a linear motor, a piezoelectric element or the like.

Seventh Embodiment

Figure 24A:
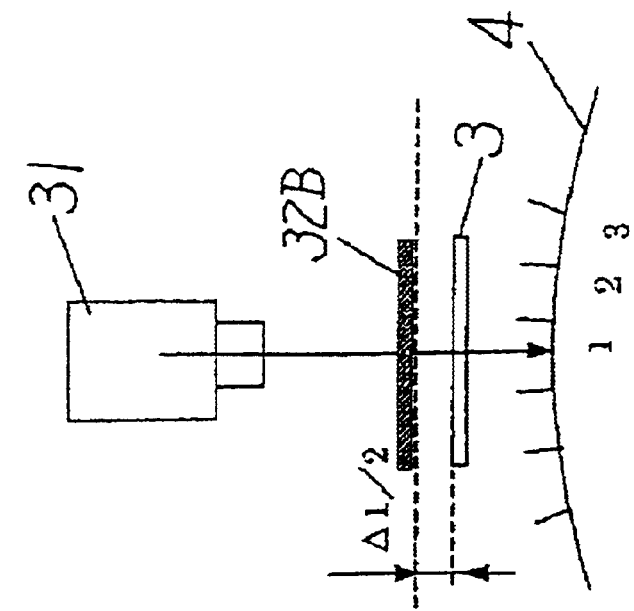
FIGS. 24A through 24C show the principle of measurement particular to a seventh embodiment of the present invention.
Figure 24B:
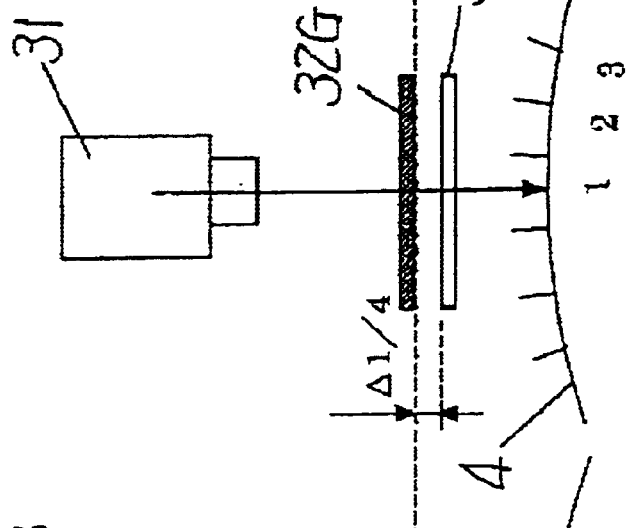
Figure 24C:
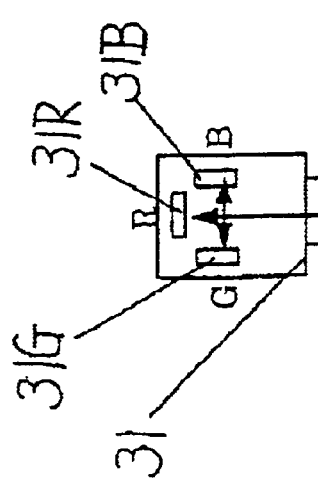
Figure 25A:
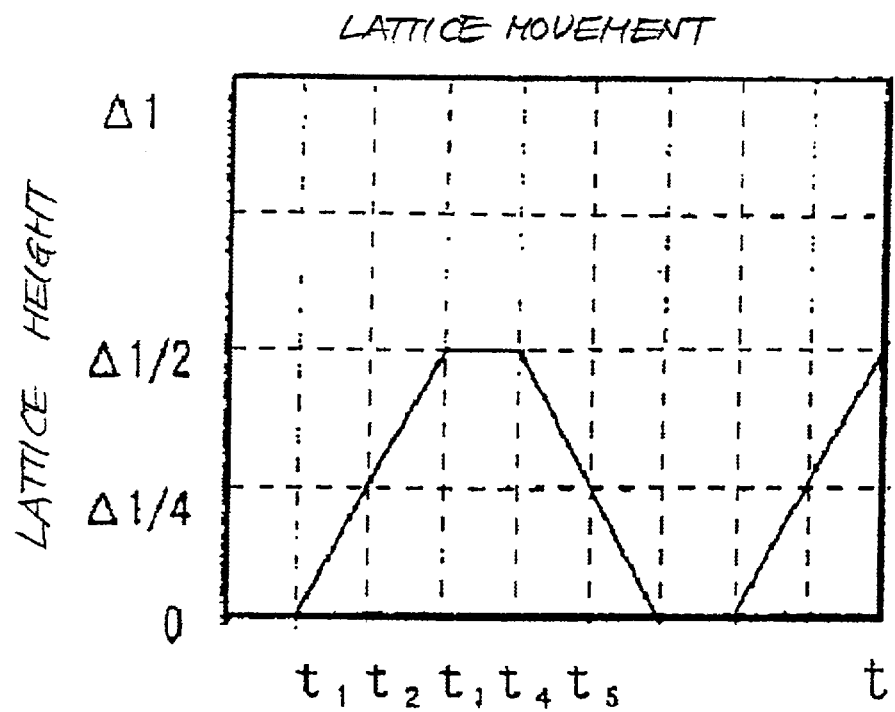
FIGS. 25A through 25E are timing charts representative of synchronization.
Figure 25B:
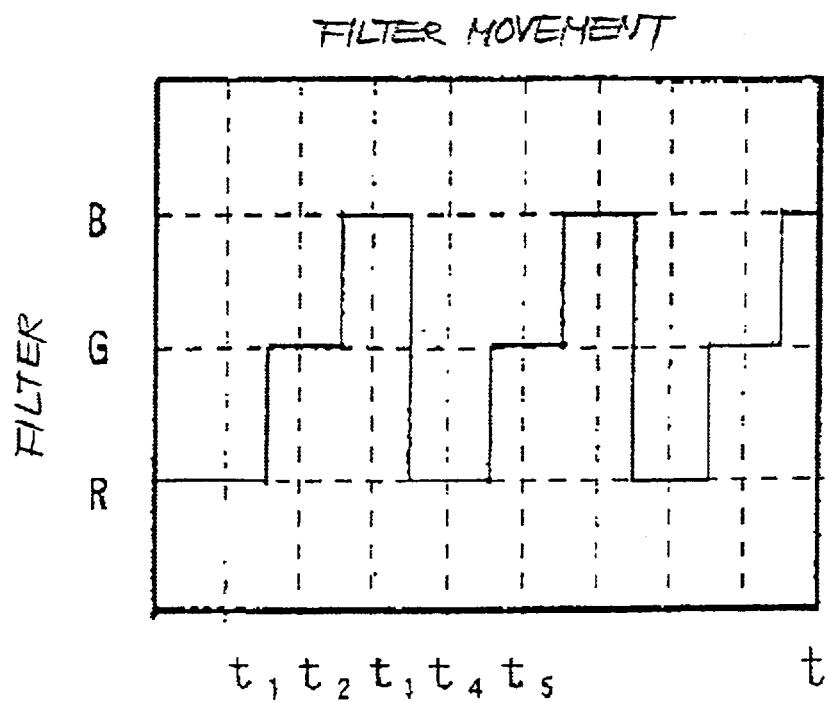
Figure 25C:
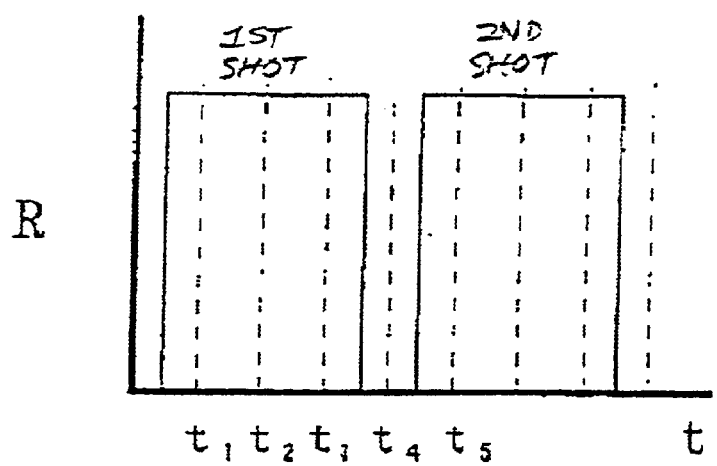
Figure 25D:
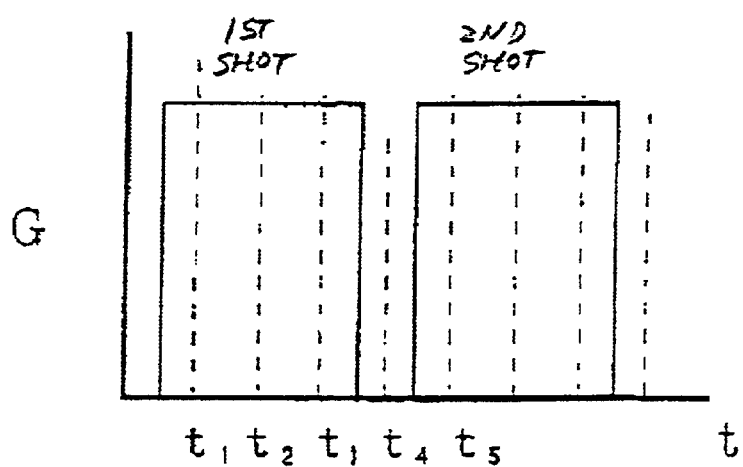
Figure 25E:
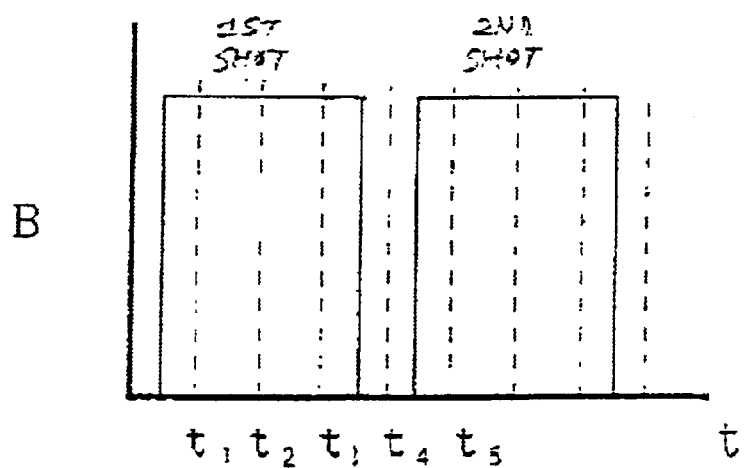

FIGS. 24A through 24C, 25A through 25C, 26, 27A and 27B show a seventh embodiment of the present invention. FIGS. 24A through 24C show an RGB (Red, Green and Blue) color line sensor camera 31 used in the illustrative embodiment in place of the line sensor camera 6. As shown, the color line sensor camera 31 is made up of color line sensors 31R, 31G and 31B. An R filter 32R, a G filter 32G and a B filter 32B each are movable into and out of the optical path between the color line sensor camera 31 and the lattice pattern 3.

A measuring method unique to the illustrative embodiment will be described hereinafter. First, at a time t1 shown in FIG. 24A and included in the one-line scanning time of the color line sensor camera 31, the lattice pattern 3 is positioned at the initial height while the R filter 31R is positioned on the above optical path. In this condition, the color line sensor 31R picks up the zone 1 of the drum 4 via the R filter 32R. At a time t2 shown in FIG. 24B, the lattice pattern 3 is shifted by $\Delta\frac{1}{4}$ while the color line sensor 31B picks up the zone 1 of the drum 4 via the G filter 32G. At a time t3 shown in FIG. 24C, the lattice pattern 3 is shifted by $\Delta\frac{1}{2}$ from the initial height while the color line sensor 31B picks up the zone 1 of the drum 4 via the B filter 32B. Such a procedure is repeated with the consecutive zones 2, 3, 4 and so forth.

FIGS. 25A through 25E show a relation between the time-serial movement of the lattice pattern 3 and that of the filters 32R, 32G and 32B and the pickup timing of the color line sensors 31R, 31G and 31B. For synchronization based on such timing control, use may be made of personal computer or similar data processing unit as synchronizing means.

Figure 26:
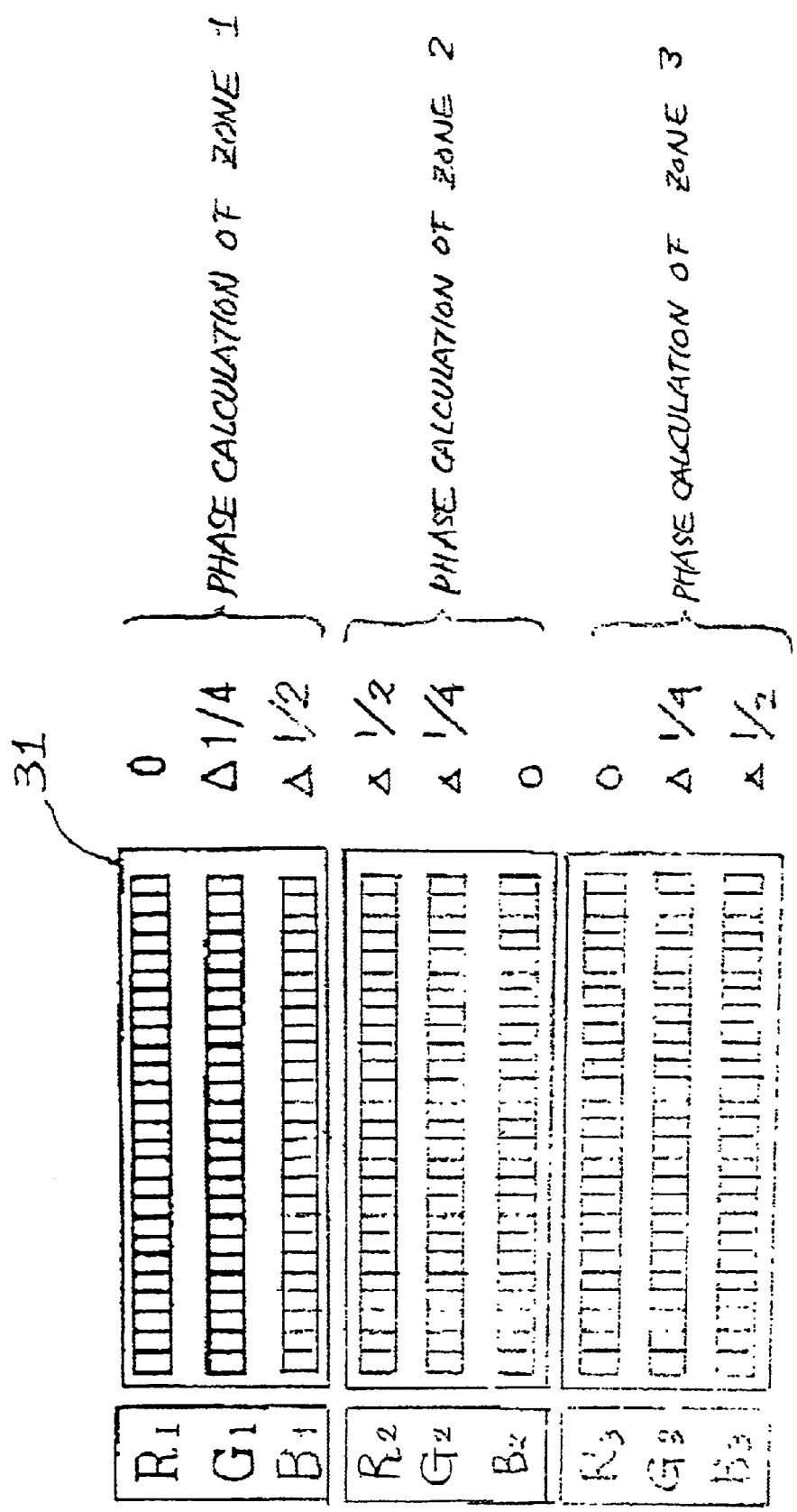
FIG. 26 shows image pickup time-serially.

As shown in FIG. 26, the procedure described above stores moiré image data picked up at the initial height of the lattice pattern 3 as R1 line data relating to the zone 1. Also, the procedure stores moiré image data picked up at the height $\Delta\frac{1}{4}$ of the lattice pattern 3 as G1 line data. Further, the procedure store moiré image data picked up at the height of $\Delta\frac{1}{2}$ of the lattice pattern 3 as B1 line data. Such three image data and Eq. (4) are used to measure the surface configuration of the drum 4.

Figure 27B:
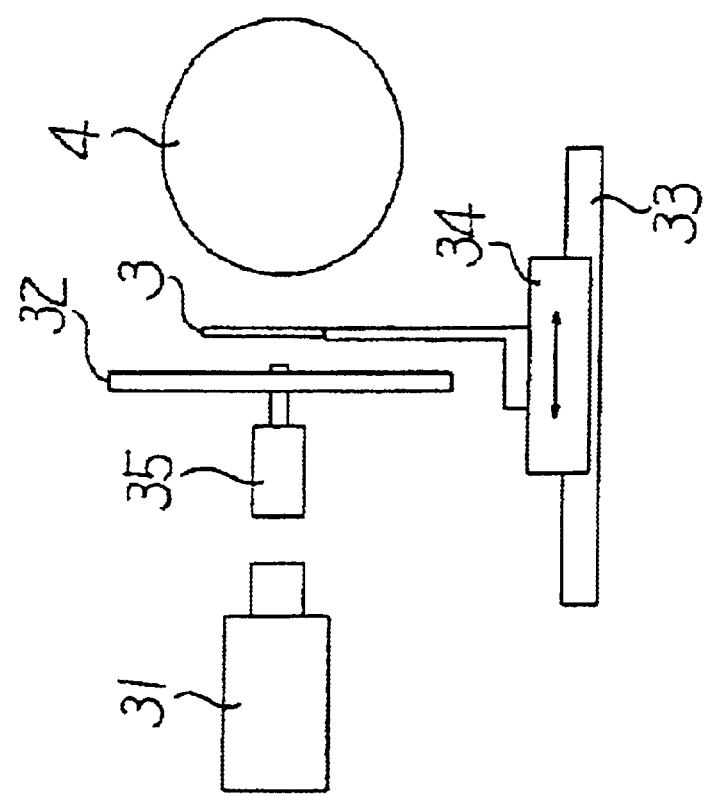
FIGS. 27A and 27B show a moving mechanism and a filter switching mechanism.
Figure 27A:
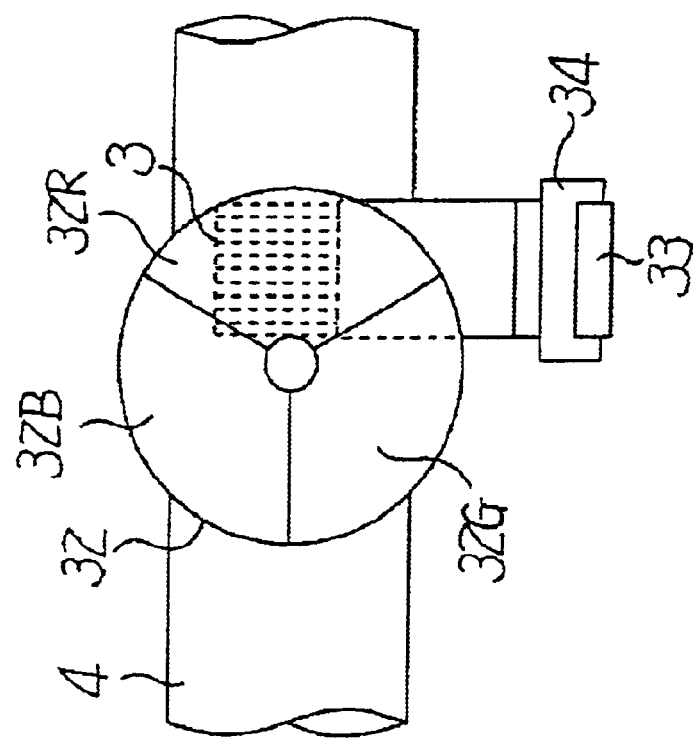
Figure 28A:
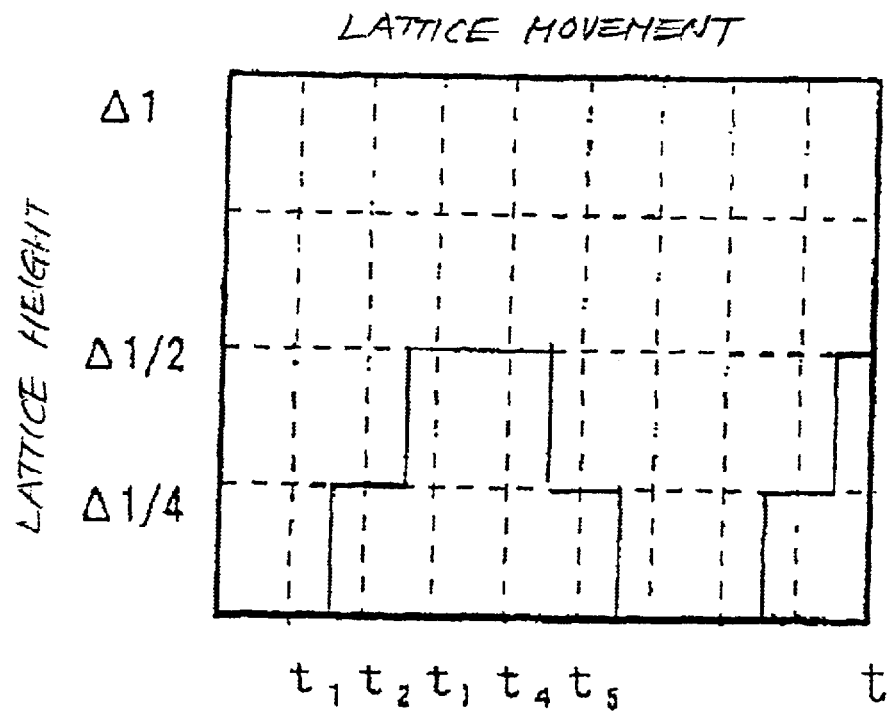
FIGS. 28A through 28E are timing charts showing synchronization representative of an eighth embodiment of the present invention.
Figure 28B:
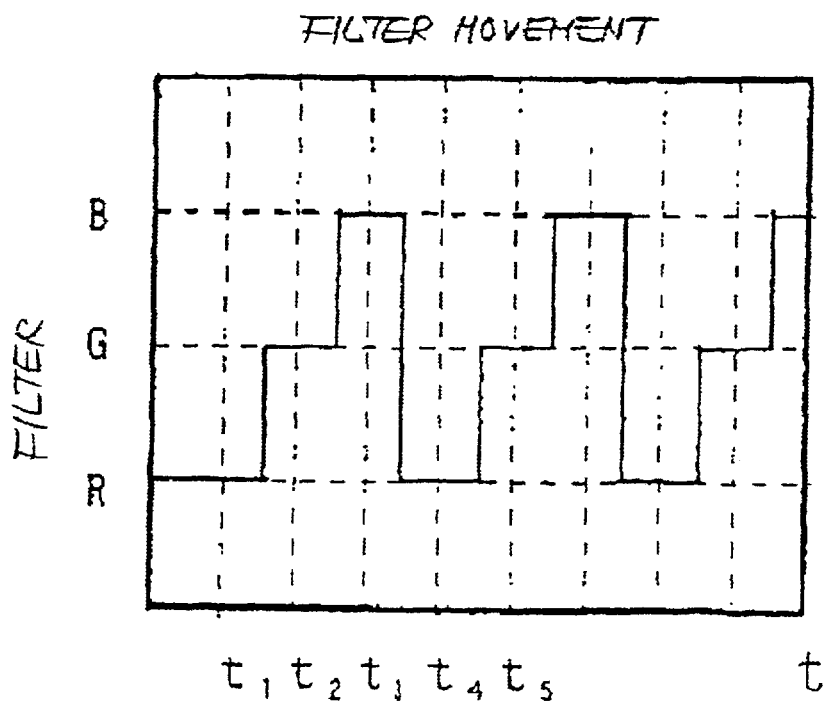
Figure 28C:
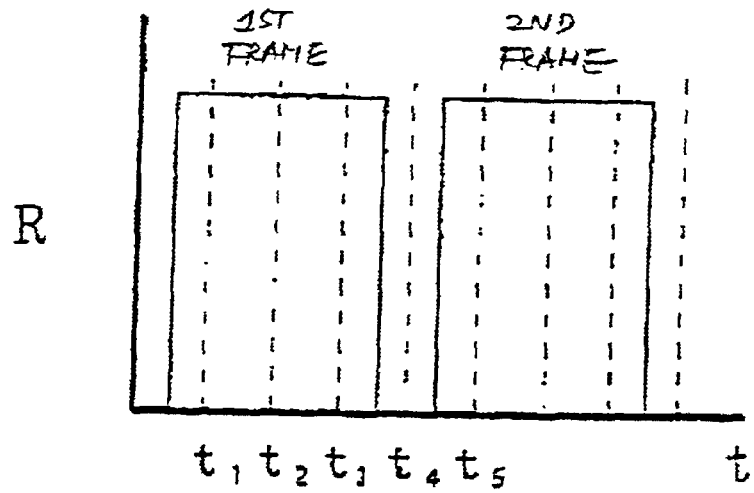
Figure 28D:
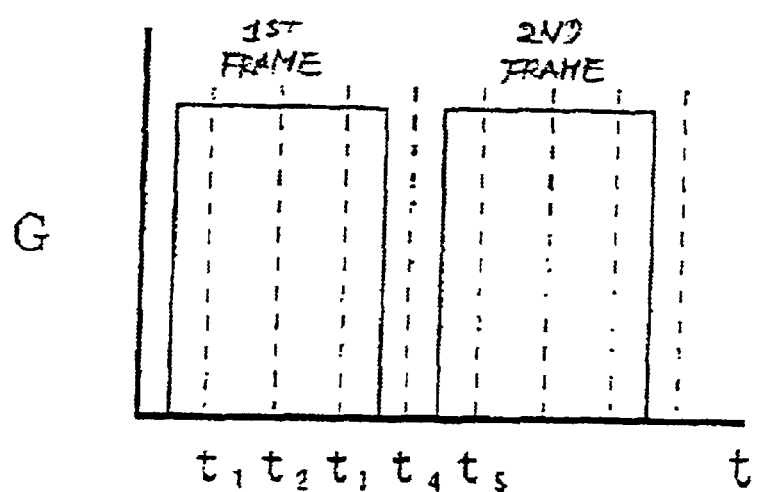
Figure 28E:
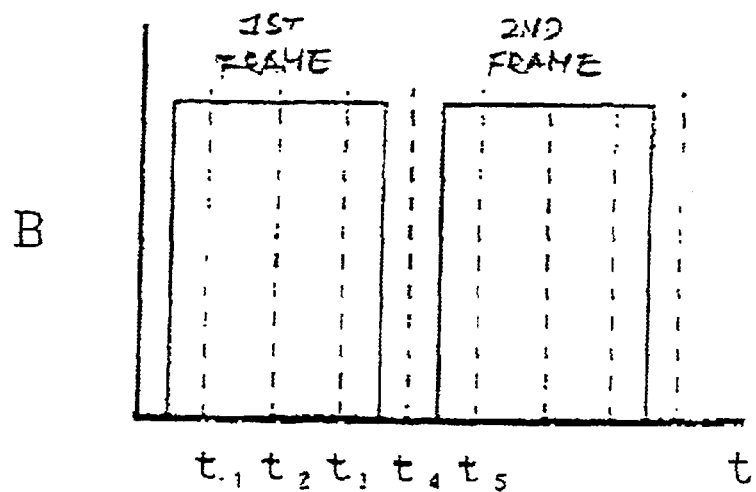

FIGS. 27A and 27B show a specific mechanism for moving the lattice pattern 3 back and forth in the direction of optical axis. As shown, the mechanism is implemented as a single axis, automatic stage 34 including a guide mechanism 33. In practice, the automatic stage 34 may include a rotary motor, a linear motor or a piezoelectric element by way of example. As also shown in FIGS. 27A and 27B, the R, G and B filters 32R through 32B may be implemented as a single rotary RGB filter 32 rotated by a rotary motor 35. The rotary motor 35 may be controlled in speed in accordance with the timings shown in FIGS. 25A through 25E.

As stated above, the illustrative embodiment produces three moiré image data at the same time (within a single frame) for each zone of the drum 4. This allows the measurement range to be more finely divided than in the sixth embodiment.

Eighth Embodiment

FIGS. 28A through 28E, 29 and 30A through 30C show an eighth embodiment of the present invention. This embodiment is identical with the seventh embodiment except that a color area sensor camera 36 shown in FIGS. 29 and 30A through 30C is substituted for color sensor camera 31. FIGS. 28A through 28E show a relation between the time-serial movement of the lattice pattern 3 and the pickup timing of the color area sensor camera 36 particular to the illustrative embodiment. For synchronization based on the timing control shown in FIGS. 28A through 28E, use may be made of personal computer or similar data processing unit as synchronizing means.

Figure 29:
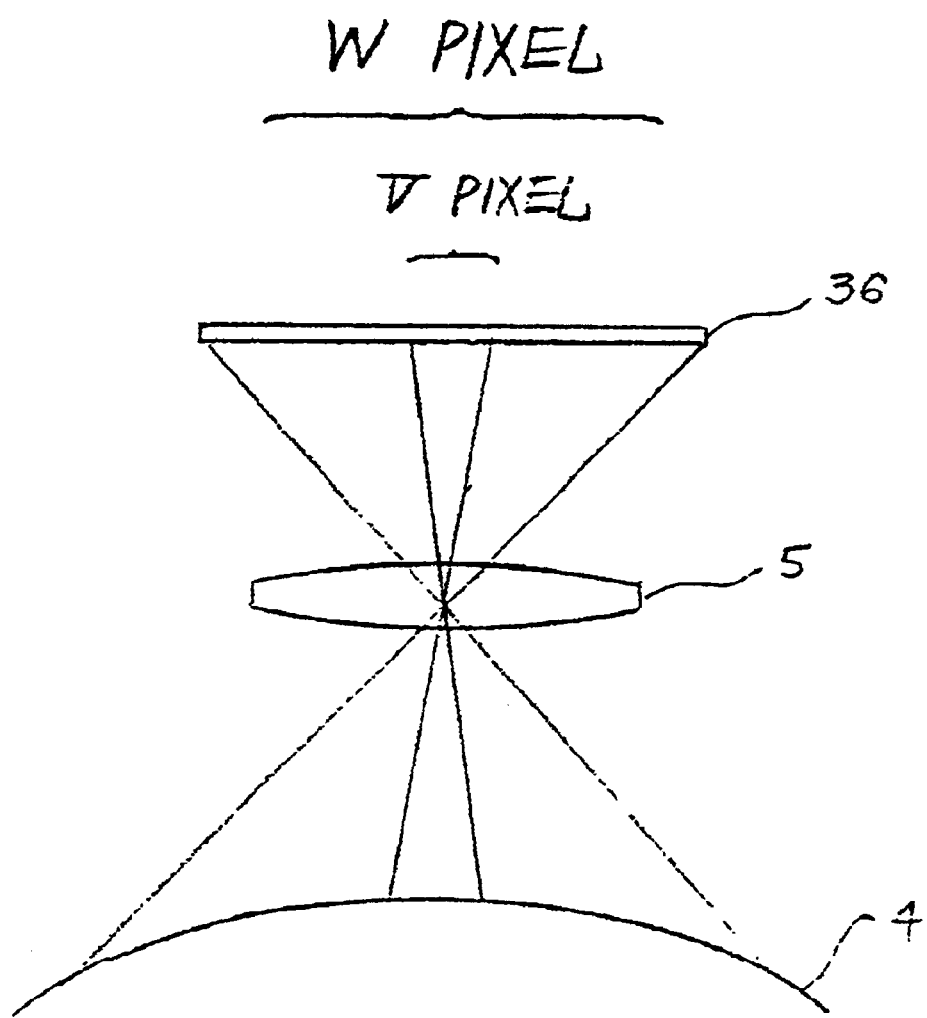
FIG. 29 shows a particular area of a color area sensor camera.

As shown in FIG. 29, not the entire pixel width w of the color area sensor camera 36 is used. More specifically, only data output from preselected v pixels corresponding to the limited range, in which the phase shift errors are negligible, are used.

Figure 30A:
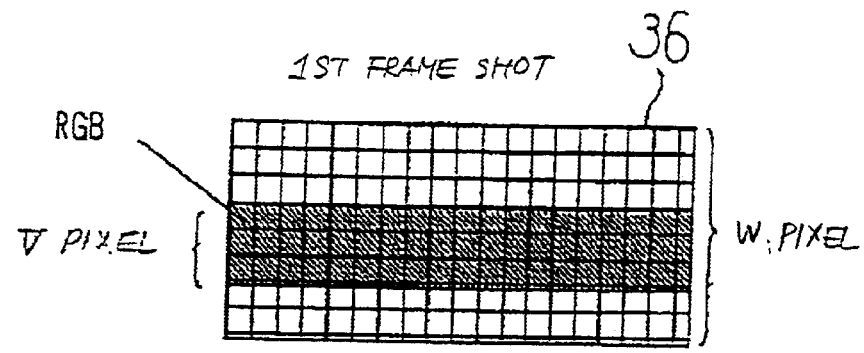
FIGS. 30A through 30C show image pickup time-serially.
Figure 30B:
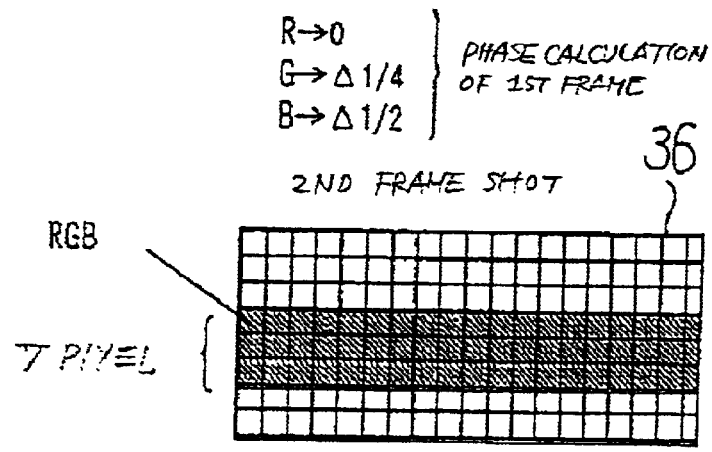
Figure 30C:
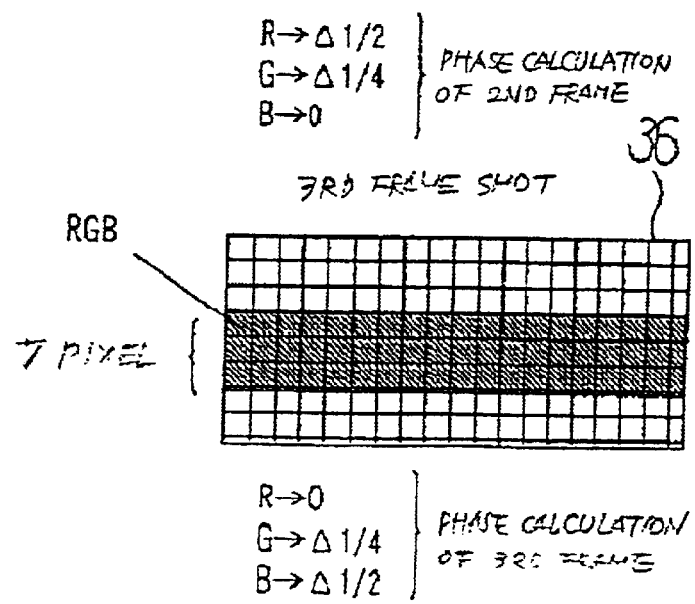
Figure 31A:
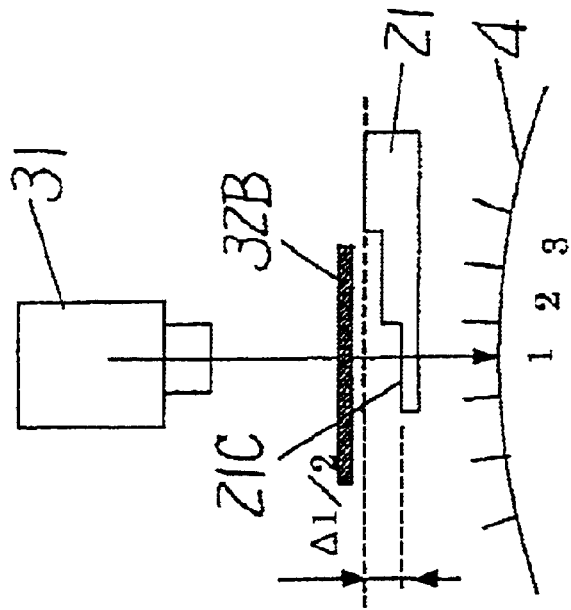
FIGS. 31A through 31C show the principle of measurement particular to a ninth embodiment of the present invention.
Figure 31B:
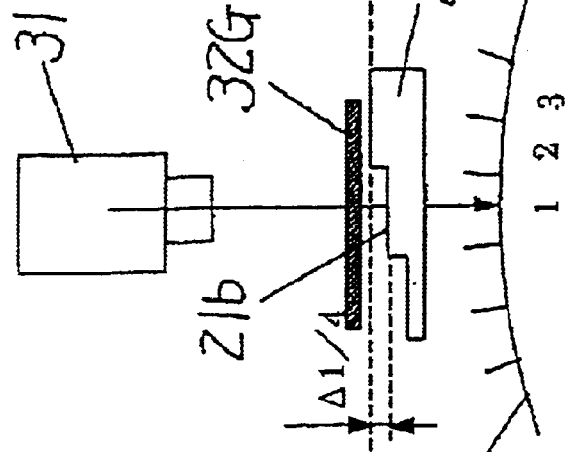
Figure 31C:
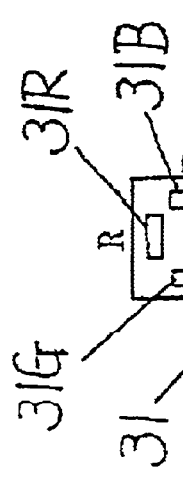
Figure 32A:
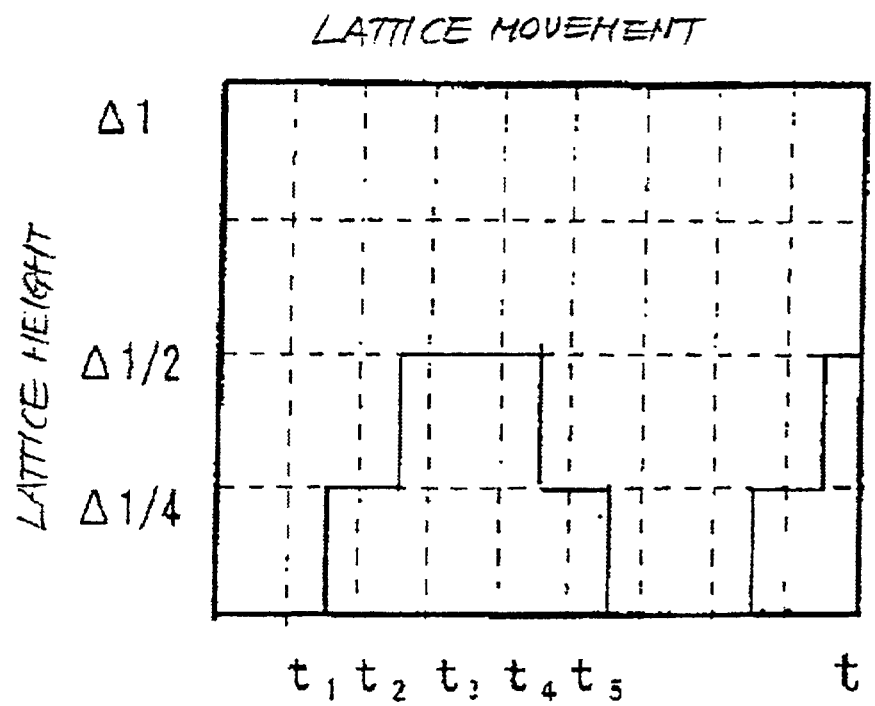
FIGS. 32A through 32E are timing charts representative of synchronization.
Figure 32B:
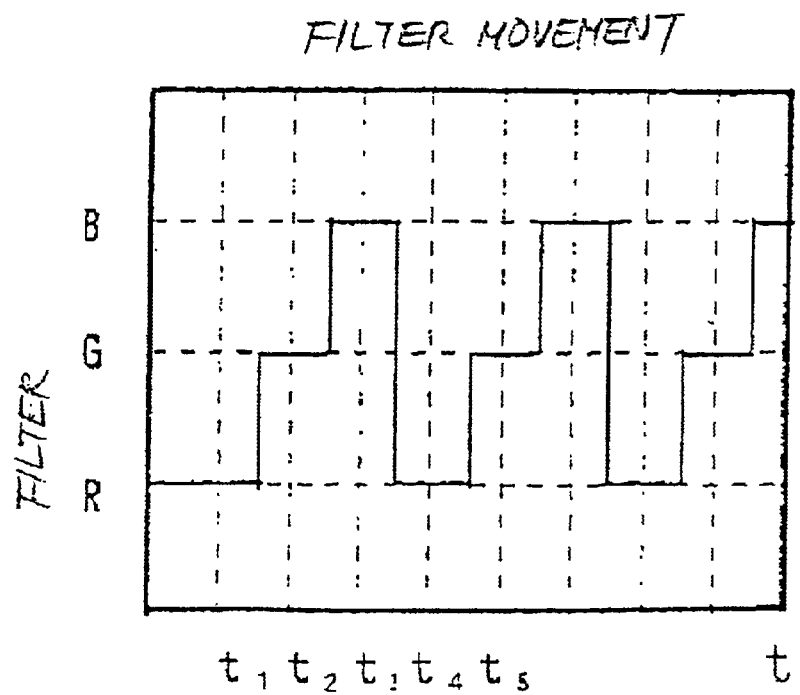
Figure 32C:
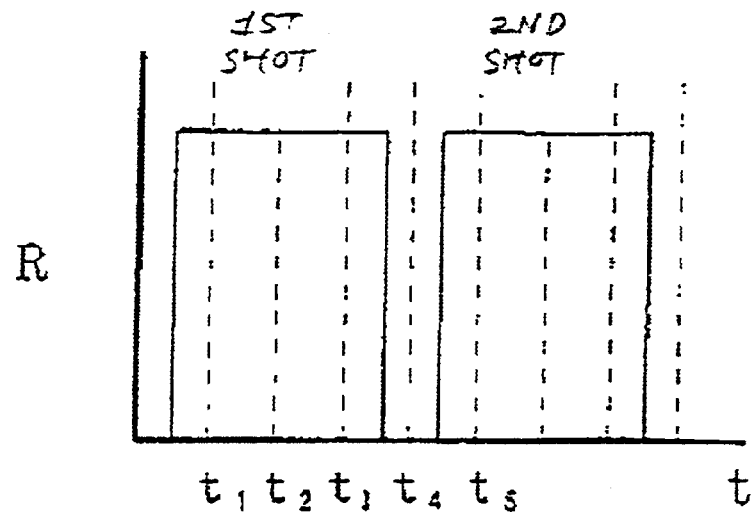
Figure 32D:
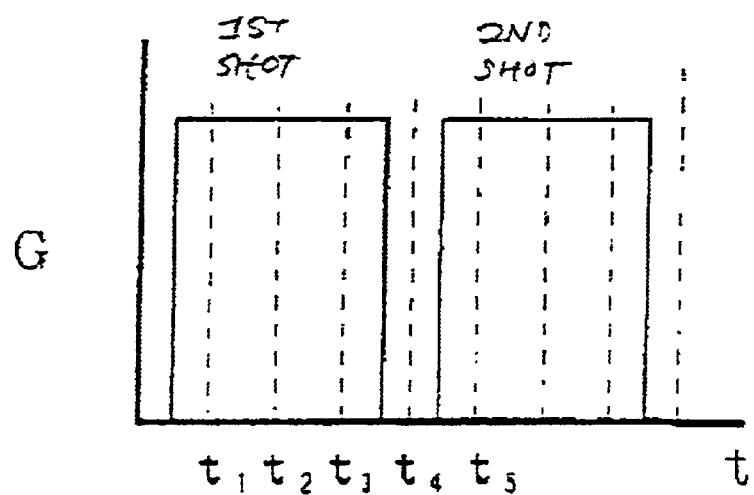
Figure 32E:
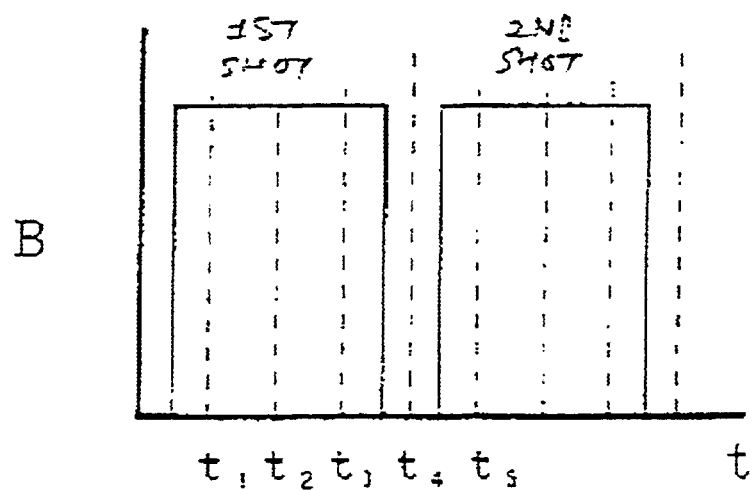

More specifically, as shown in FIGS. 30A through 30C, in the event of the pickup of the first frame, moiré image data at the initial height of the lattice pattern 3 are stored as R data included in the v pixels. At the same time, moiré image data at the height of $\Delta\frac{1}{4}$ of the lattice pattern are stored as B data while moiré image data at the height of $\Delta\frac{1}{2}$ are stored as B data. By using such three moiré image data shifted in phase, it is possible to calculate a surface configuration in the range covered by the v pixels. The above procedure is repeated with each of the following frames by rotating the drum 4 via the 165 rotary motor 8.

The illustrative embodiment can measure the drum 4 over several lines (three lines in the above procedure) at the same time. While an NTSC (National Television System Committee) color area sensor camera with a speed of one frame per $\frac{1}{30}$ second cannot noticeably speed up the above procedure, a high-speed camera can reduce the measuring time.

Ninth Embodiment

FIGS. 31A through 31C, 32A through 32E, 33A and 33B show a ninth embodiment of the present invention. As shown, the illustrative embodiment uses the color line sensor camera 31 and stepped lattice pattern 21 in combination. A measuring method unique to the illustrative embodiment will be described with reference to FIGS. 31A through 31C. First, as a time t1 shown in FIG. 31A and included in the one-line scanning time of the color line sensor camera 31, the highest lattice surface 21a of the lattice pattern 21 is selected while the color line sensor 31R picks up the zone 1 of the drum 4 via the R filter 32R. At a time t2 shown in FIG. 31B, the medium lattice surface 21b shifted from the lattice surface 21a by $\Delta\frac{1}{4}$ is selected while the color line sensor 31G picks up the zone 1 via the G filter 32G. At a time t3 shown in FIG. 31C, the lowest lattice surface 21c shifted by Δ½ from the lattice surface 21a is selected while the color line sensor 31B picks up the zone 1 via the B filter 32B.

FIGS. 32A through 32E show a relation between the time-serial movements of the stepped lattice pattern 21 and color filters 32R through 32B and the pickup timing of the color line sensor camera 31. For synchronization based on the timing control shown in FIGS. 32A through 32E, use may be made of personal computer or similar data processing unit as synchronizing means.

The procedure described above stores moiré image data picked up at the initial height of the lattice pattern 3 as R1 line data relating to the zone 1 in the same manner as described with reference to FIG. 26. Also, the procedure stores moiré image data picked up at the height Δ¼ of the lattice pattern 3 as G1 line data. Further, the procedure store moiré image data picked up at the height of Δ½ of the lattice pattern 3 as B1 line data. Such three image data and Eq. (4) are used to measure the surface configuration of the drum 4.

Figure 33B:
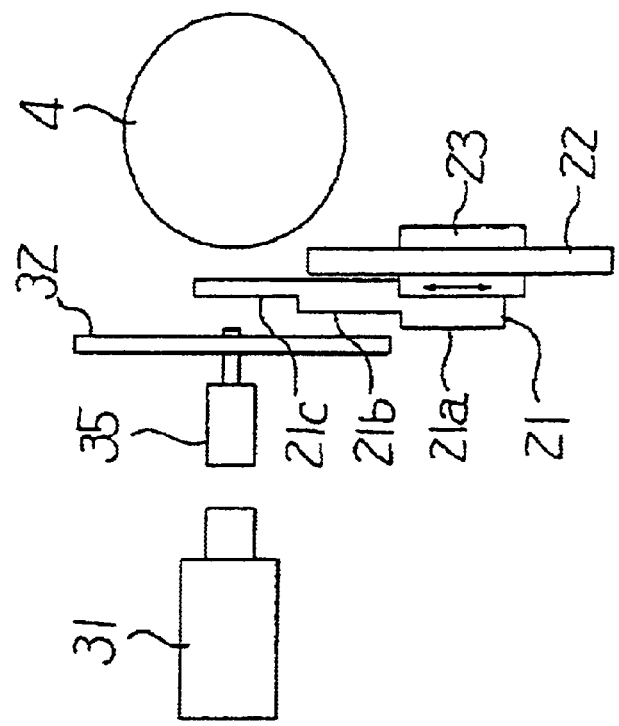
FIGS. 33A and 33B show a moving mechanism and a filter switching mechanism.
Figure 33A:
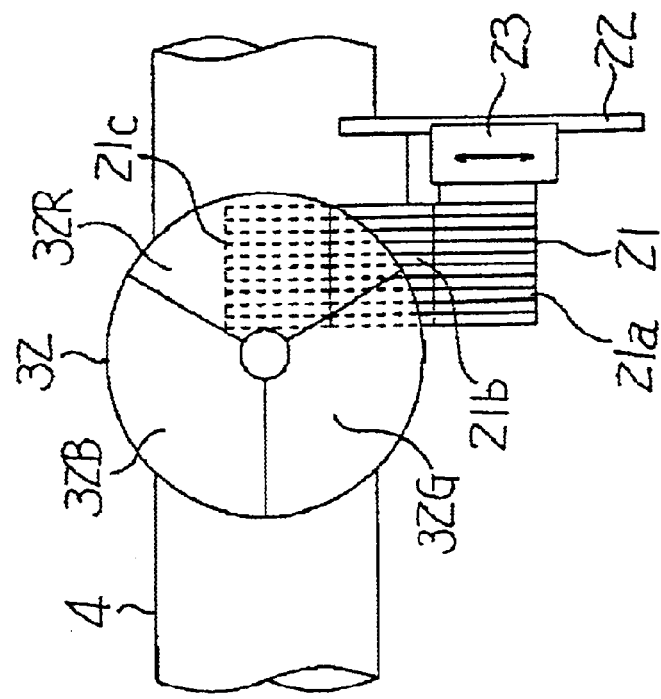

The automatic stage 23 shown in FIG. 23 or FIGS. 33A and 33B may also be used to move the stepped lattice pattern 21 back and forth. Also, the R, G and B filters 32R, 32G and 32B may be implemented as a rotary RGB filter 32 shown in FIGS. 27A and 27B and rotated by the rotary motor 35.

The illustrative embodiment also produces three different moiré image data at the same time for each zone of the drum 4 (within a single frame). This allows the measurement range to be more finely divided than in the sixth embodiment.

Tenth Embodiment

FIGS. 34A through 34E show a tenth embodiment of the present invention essentially similar to the ninth embodiment. In the tenth embodiment, the color area sensor camera 36 shown in FIGS. 29 and 30A through 30C is substituted for the color line sensor camera 31. FIGS. 34A through 34E show a relation between the time-serial movement of the lattice pattern 3 and filters 32R through 32B and the pickup timing of the color area sensor 36 particular to the illustrative embodiment. For synchronization based on the timing control shown in FIGS. 34A through 34E, use may be made of personal computer or similar data processing unit as synchronizing means.

In the illustrative embodiment, not the entire pixel width w of the color area sensor camera 36 is used, as stated with reference to FIG. 29. More specifically, only data output from preselected v pixels corresponding to the limited range, in which the phase shift error is negligible, are used.

More specifically, in the event of the pickup of the first frame, moiré image data at the initial height of the lattice pattern 3 are stored as R data included in the v pixels, as described with reference to FIGS. 30A through 30C. At the same time, moiré image data at the height of Δ¼ of the lattice pattern are stored as B data while moiré image data at the height of Δ½ are stored as B data. By using such three moiré image data shifted in phase, it is possible to calculate a surface configuration in the range covered by the v pixels. The above procedure is repeated with each of the following frames by rotating the drum 4 via the rotary motor 8.

The illustrative embodiment can also measure the drum 4 over several lines (three lines in the above procedure) at the same time. Again, while an NTSC color area sensor camera cannot noticeably speed up the above procedure, a high-speed camera can reduce the measuring time.

Eleventh Embodiment

Figure 35:
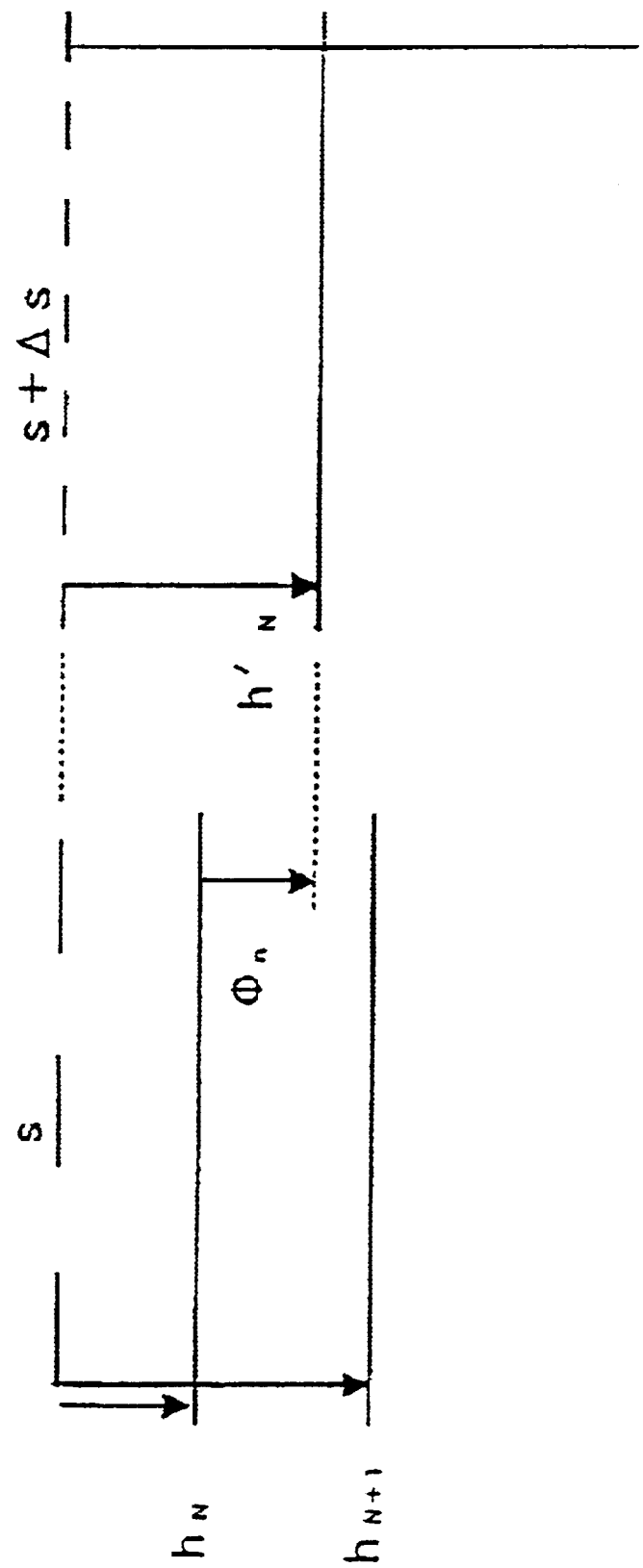
FIG. 35 shows the principle of the phase shifting method.

An eleventh embodiment of the present invention will be described hereinafter. As shown in FIG. 35, assume that the pitch of the lattice pattern is varied by Δs in order to shift the phase. The (N+1)-th order moiré contour lines before movement are produced from the Eq. (5):

$$hN+1 = \frac{(N+1)sl}{d-(N+1)s}$$

In FIG. 35, assume the light source S1 and the point of observation S2 are spaced from the lattice G by the same distance, that the distance between the light source S1 and the point of observation S2 is d, that the distance between the lattice G and the point of observation S2 and light source S1 is l, and that the lattice G has a pitch s.

Next, assume that the lattice G is moved to shift the moiré fringes. Then, the distance h'N to the n-th order moiré fringes is produced by:

$$h'N = \frac{N(s+\Delta s)l}{d-(N+1)s} \qquad \text{Eq. (13)}$$

Assume that the N-th moiré fringes after the movement of the lattice exist at the position of the phase Φn between the N-th order moiré fringes before the movement of the lattice and the (N+1)-th moiré fringes. Then, there holds:

$$h_N - (h_{N+1}-h_N)(\Phi n/2\pi) = h'N \qquad \text{Eq. (14)}$$

By substituting the Eqs. (5) and (13) for the Eq. (14), there is produced:

$$\Delta s = \frac{s\phi n(Ns-d)}{2\pi N\{(N+1)s-d\}-Ns\phi n} \qquad \text{Eq. (15)}$$

Figure 36:
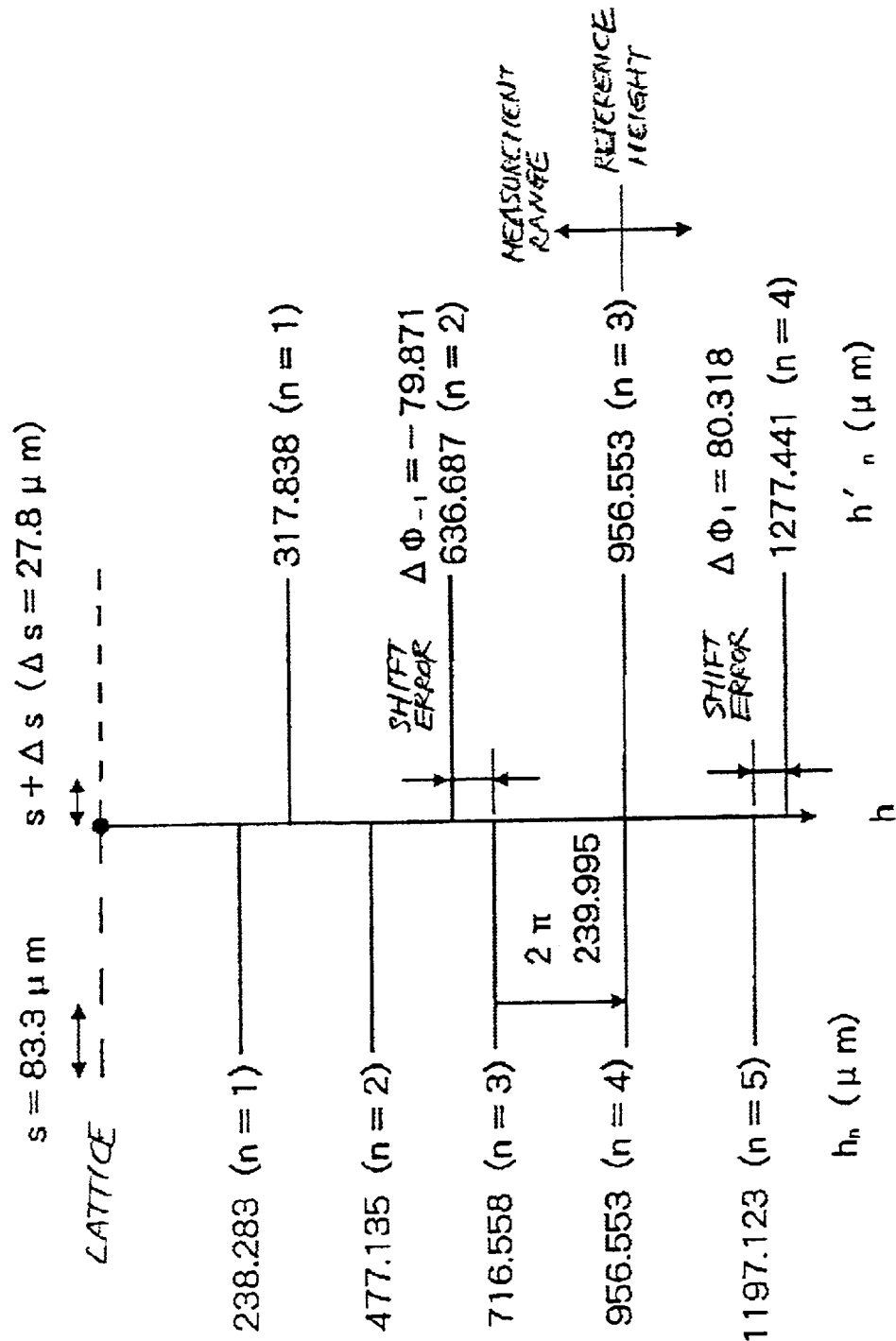
FIG. 36 shows moiré contour lines produced by the phase shifting method for describing an eleventh embodiment of the present invention.

The above Eq. (15) clearly shows a relation between the variation Δs of the pitch of the lattice pattern and the phase shift Φn. Assume that the lattice pitch s is 83.3 μm, that the distance l is 200 mm, that the distance d is 70 mm, and that fringes of the order N of 3 before lattice movement should be accurately shifted by 2π. That is, assume that n is 3 and Φ3 is 2. Then, when the above parameters are substituted for the Eq. (15), the pitch variation Δs is 27.8 μm. FIG. 36 shows a relation between the pitch variation Δs and the position of the moiré contour lines before and after lattice movement. As FIG. 36 indicates, a height corresponding to the phase 2π is h2π=239.995 μm. As FIG. 36 indicates, while the phase is accurately shifted by 2π at the height of the order n of 4 before movement, shift errors of ΔΦ±1 occur at the heights of the degrees n of 3 and 5 before movement. The measurement range is confined in the range in which such shift errors do not influence the accuracy of measurement.

Assume that the initial lattice pitch is s, and that, when Φn in the Eq. (15) is zero, π/2 and π, the variation Δs is Δs0 (=0), Δs1 and Δs2, respectively. Then, measurement begins with the pickup of the moiré fringes when the lattice pitch is s. Subsequently, a lattice pitch of s+Δs1 is set up to pick up the second moiré fringes. Further, a lattice pitch of s+Δs2 is set up to pick up the third moiré fringes. The resulting three images are processed on the basis of the Eq. (4) for thereby calculating the configuration of the drum 4. The quantitative configuration data are used to examine the waving, dints or similar defects of the drum 4 as well the flatness of the drum 4.

As stated above, the illustrative embodiments limits the measurement range to the fringes of certain orders and varies the lattice pitch for thereby shifting the phase of the moiré fringes. This realizes highly accurate configuration measurement by applying the phase shifting method to the stereoscopic lattice type of moiré method.

The illustrative embodiment is required to shoot the drum 4 three times by varying the lattice pitch, as stated above. In light of this, an alternative procedure that produces images shifted in phase by a single series of shots, as will be described with reference to FIGS. 37A through 27C, 38A and 38B hereinafter.

Figures 37A, 37B, 37C:
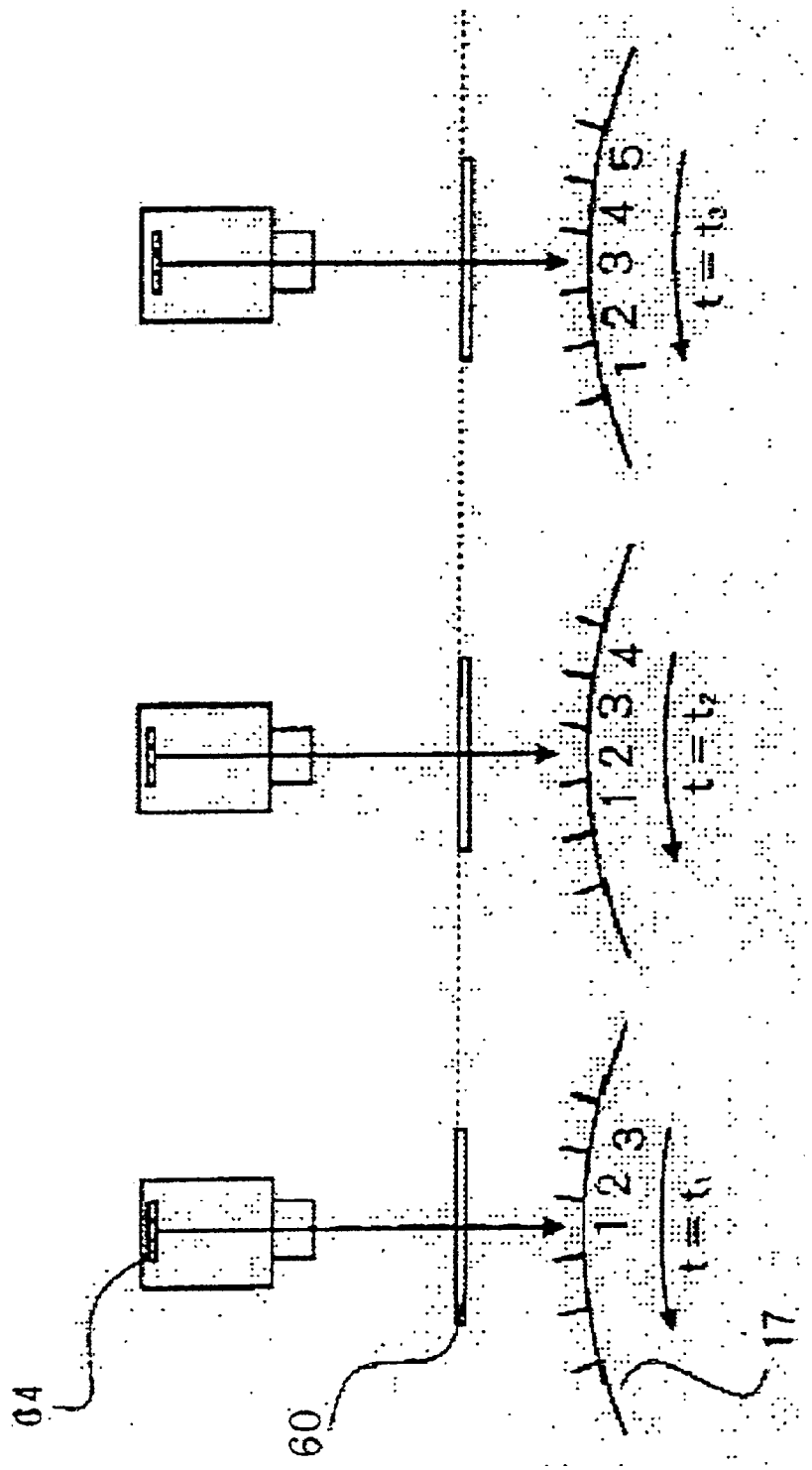
FIGS. 37A through 37C demonstrate a procedure unique to the principle of the eleventh embodiment.

As shown in FIGS. 37A through 37C, a lattice pattern 60 with a variable lattice pitch is substituted for the lattice pattern 3. Specifically, the lattice pitch of the lattice pattern 60 is variable from the initial pitch s to $\Delta s0$ (=0), $\Delta s1$ and $\Delta s2$ stepwise. First, at a time t1 shown in FIG. 37A, the lattice pitch s is initially set while the line sensor camera 6 picks up the zone 1 of the drum 4 via the lattice pattern. Subsequently, at a time t2 shown in FIG. 37B, the lattice pitch is varied to s+$\Delta s2$ while the line sensor camera 6 picks up the zone 2 via the lattice pattern. Further, at a time t3 shown in FIG. 37C, the lattice pitch is varied to s+$\Delta s3$ while the line sensor camera 6 picks up the zone 3 via the lattice pattern.

Figure 38A:
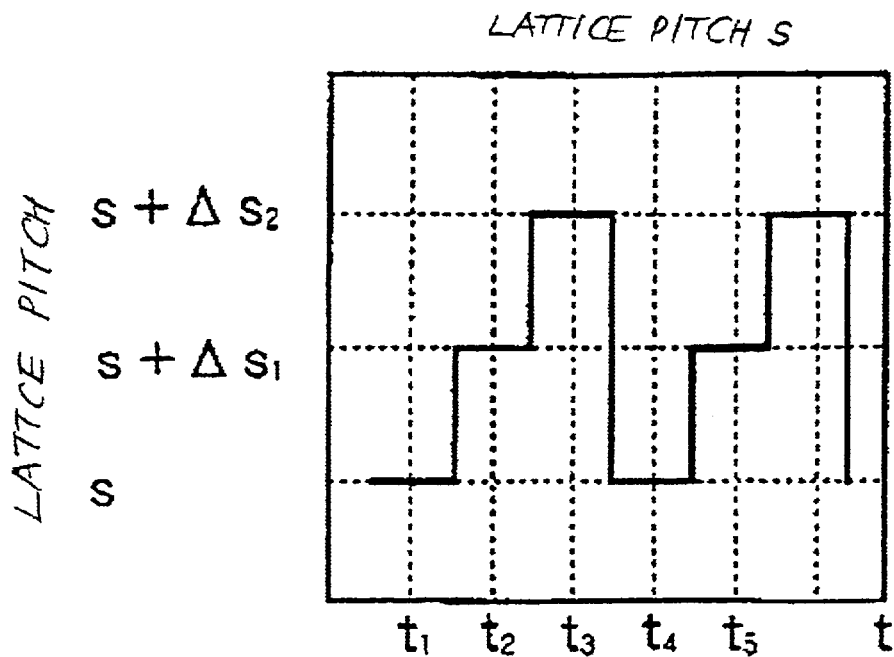
FIGS. 38A and 38B show a relation between zones and the variation of a lattice pitch and image pickup timing.
Figure 38B:
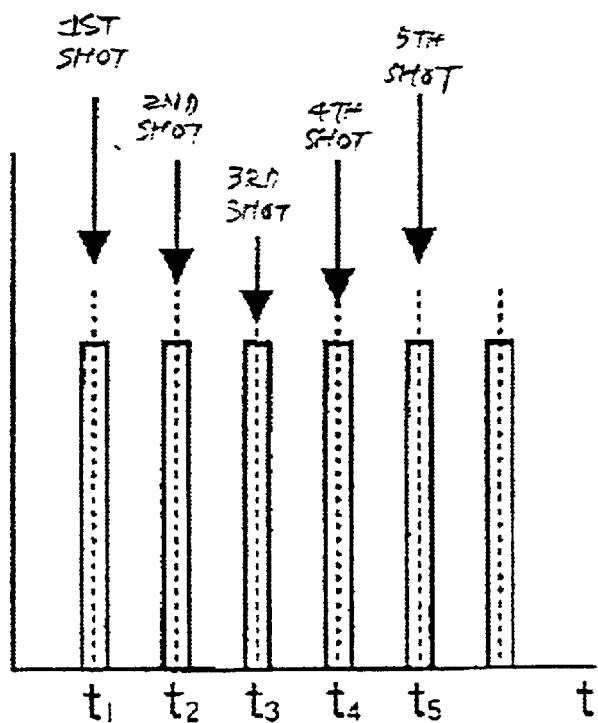

FIGS. 38A and 38B show a relation between the time-serial pitch variation of the lattice pattern 60 and the pickup timing of the line sensor camera 6. For such timing control, use may be made of a personal computer or similar data processing unit as synchronizing means.

The moiré pattern data produced by the above procedure are identical with the data shown in FIG. 18. Measurement is therefore executed in the same manner as in the fifth embodiment thereafter.

If desired, a head including optics for measurement may be caused to turn around the drum 4 held stationary.

Figure 39C:
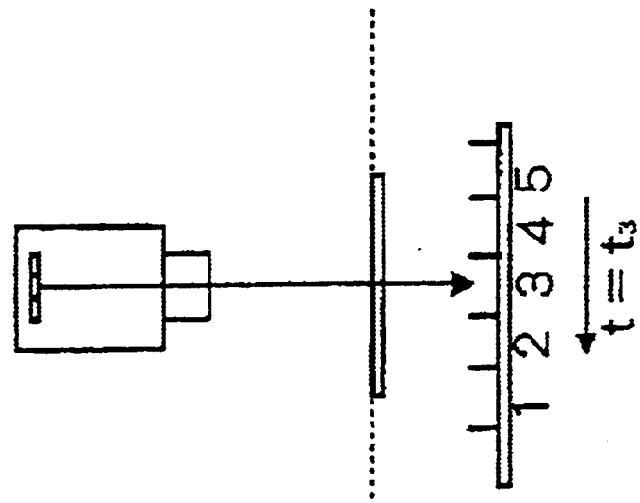
FIGS. 39A through 39C show a procedure particular to the principle of the eleventh embodiment.
Figure 39B:
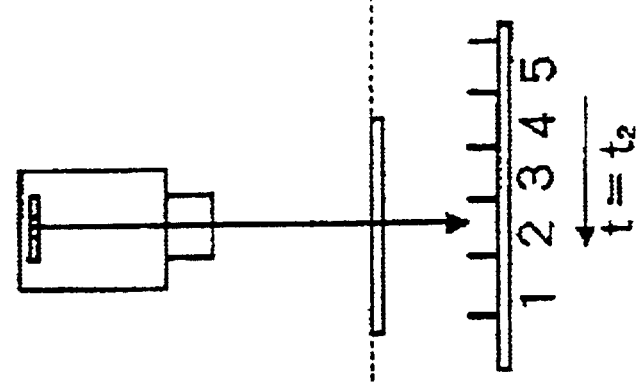
Figure 39A:
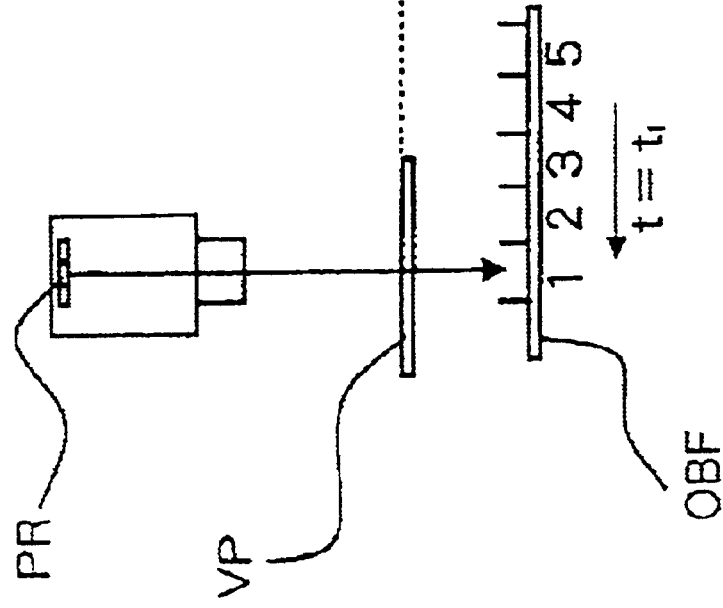
Figure 40:
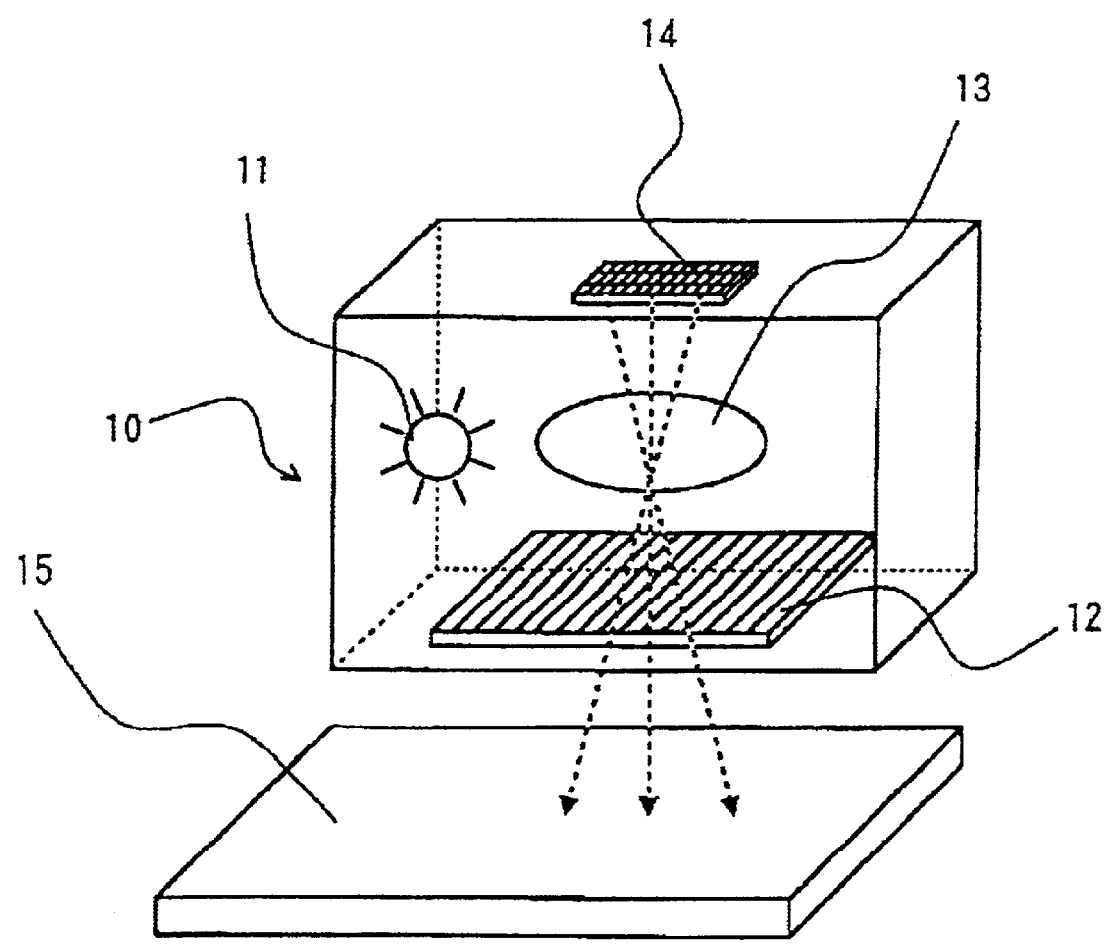
FIG. 40 is an isometric view showing a head included in the illustrative embodiment.
Figure 41:
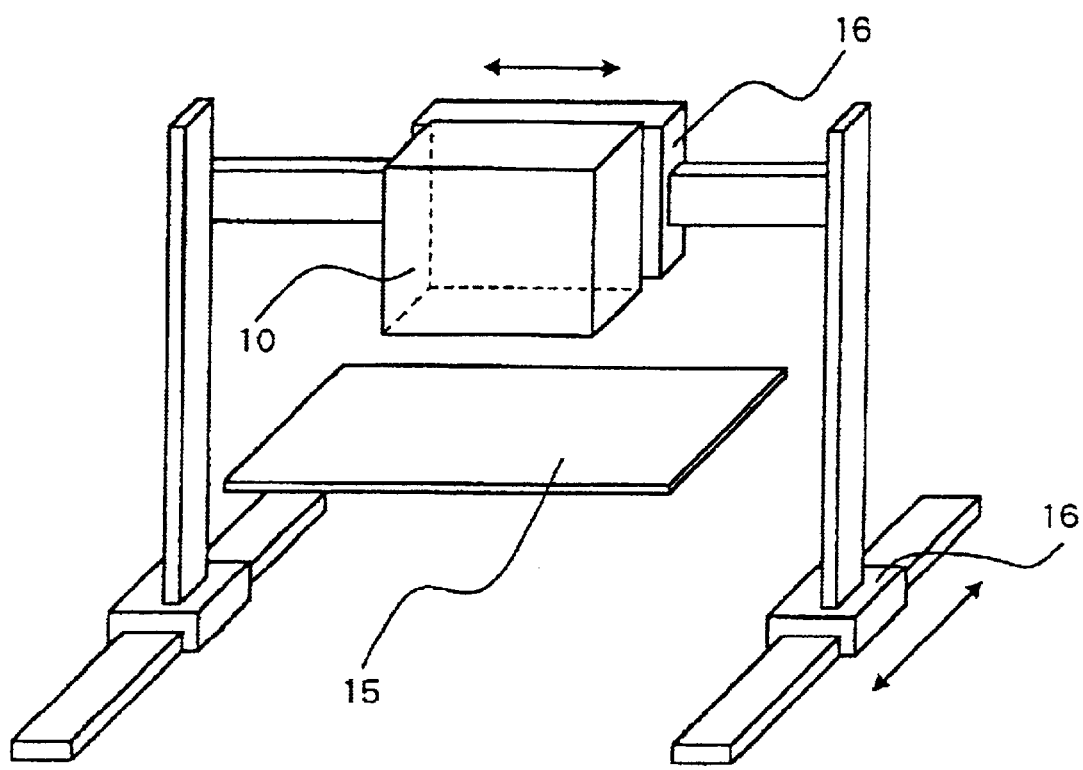
FIG. 41 is an isometric view showing a mechanism for moving the head of FIG. 40.
Figure 42:
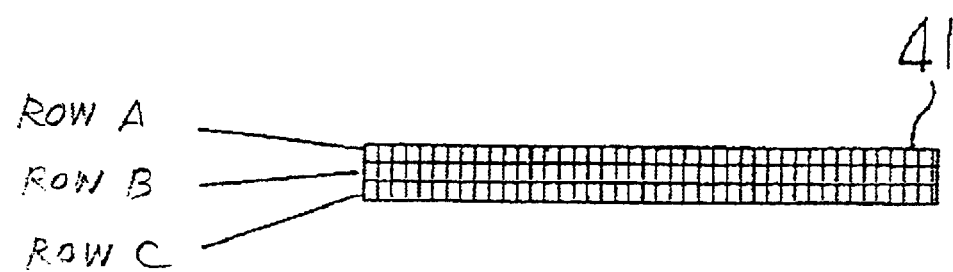
FIG. 42 shows a three-line sensor camera included in a twelfth embodiment of the present invention.

FIGS. 39A through 39C show how the illustrative embodiment measures the surface of a flat work by parallel movement. FIG. 40 shows a specific configuration of a head for measuring a flat work. As shown, the head, generally 10, for measuring a flat work 15 includes a light source 11, a lattice pattern 12, a lens 13, and a light-sensitive device 14. As shown in FIG. 41, a drive mechanism moves the head 10 relative to the work 15 not only in the direction shown in FIGS. 39A through 39C, but also in a different direction. As shown, the drive mechanism additionally includes an XY automatic stage 16 by way of example. After the head 10 has measured the work 15 at a certain position, the automatic stage 16 moves the head 10 to another position for measurement. This is repeated over the entire surface of the work 15. With this configuration, it is possible to measure the entire surface of the work 15 while maintaining the distance between the head 10 and the work 15 and limiting the measurement range.

The work 15 may, of course, be moved relative to the head 10 held stationary. The crux is that either one of the head 10 and work 15 be movable relative to the other. In any case, as for a flat work, the illustrative embodiment uses a mechanism for moving one of the optics and work relative to each other in the directions of two axes.

Twelfth Embodiment

FIGS. 42, 43A through 43C and 44 show a twelfth embodiment of the present invention. This embodiment uses a line sensor camera 41 in combination with the stepped lattice pattern 21 having a difference of $\Delta\frac{1}{4}$ between nearby steps. As shown in FIG. 39, the line sensor camera 41 has line sensors arranged on three lines A, B and C.

A measuring method unique to the illustrative embodiment will be described with reference to FIGS. 43A through 43C. First, at a time t1 shown in FIG. 43A, the line sensors on the row A pick up the zone 3 of the drum 4 via the highest lattice surface 21a. At the same time, the line sensors on the rows B and C pick up the zone 2 and 1 via the lattice surfaces 21b and 21c, respectively. Subsequently, at a time t2, the zone of the drum 4 is shifted by one. At this time, the line sensors on the row A pick up the zone 4 via the lattice surface 21a. At the same time, the line sensors on the rows B and C pick up the zones 3 and 2 via the $\Delta\frac{1}{4}$ lattice surface 21b and $\Delta\frac{1}{2}$ lattice surface 21c, respectively.

Figure 34A:
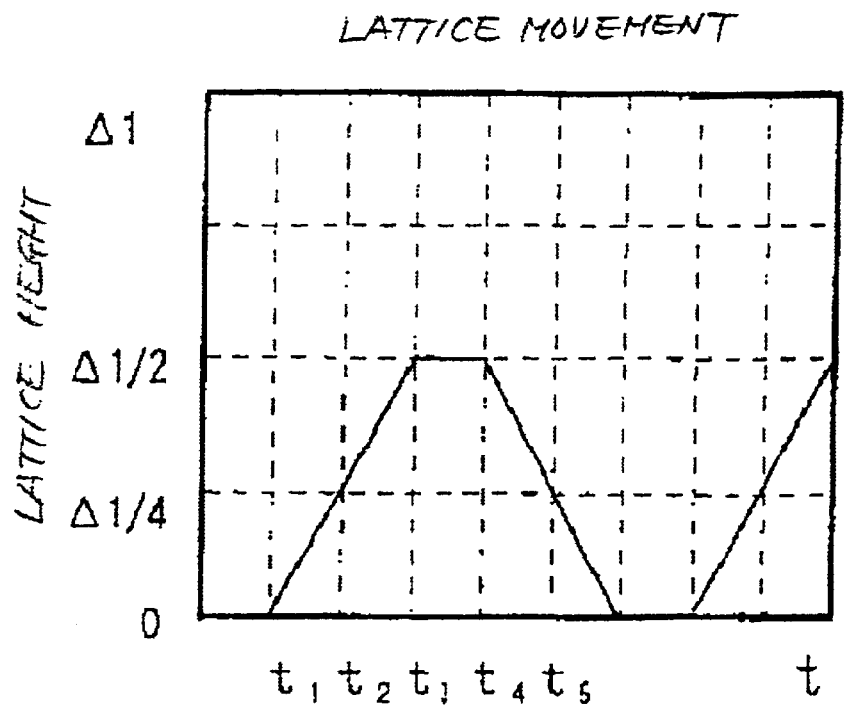
FIGS. 34A through 34E are timing charts representative of synchronization.
Figure 34B:
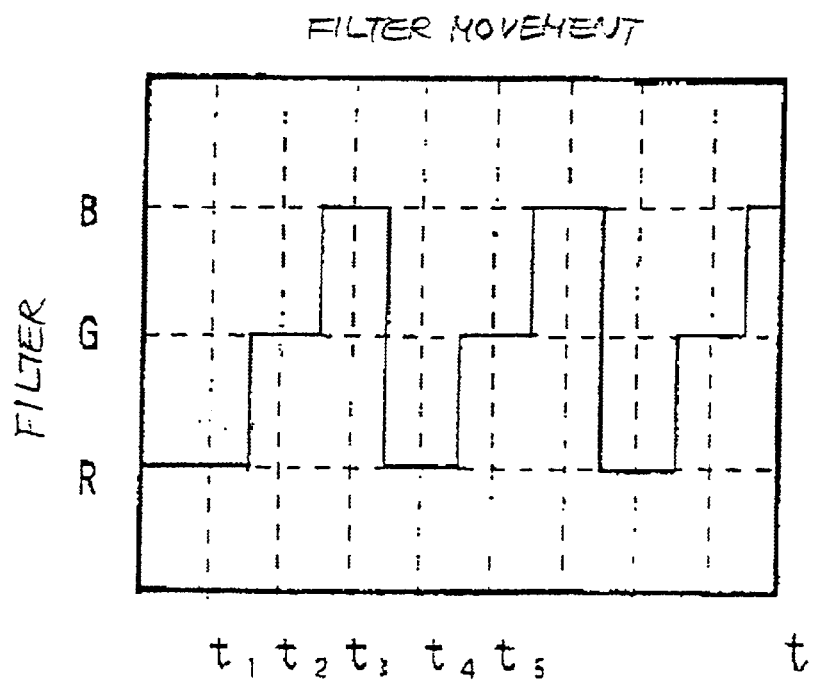
Figure 34C:
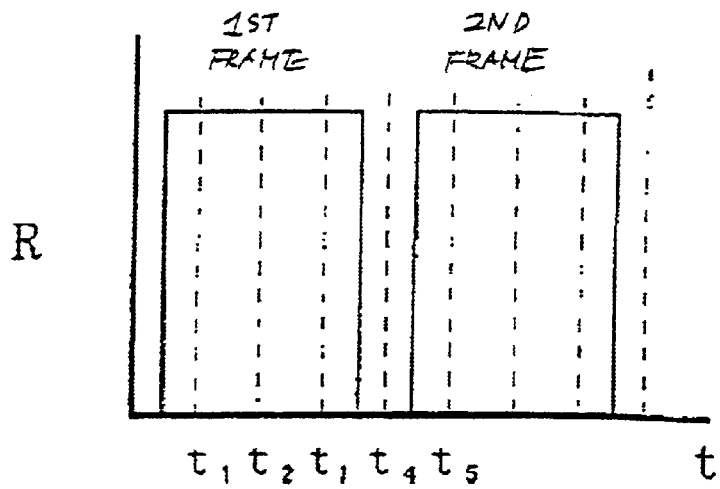
Figure 34D:
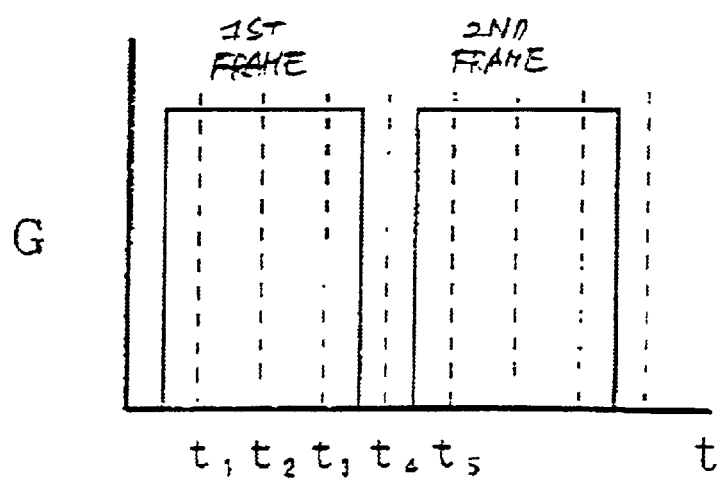
Figure 34E:
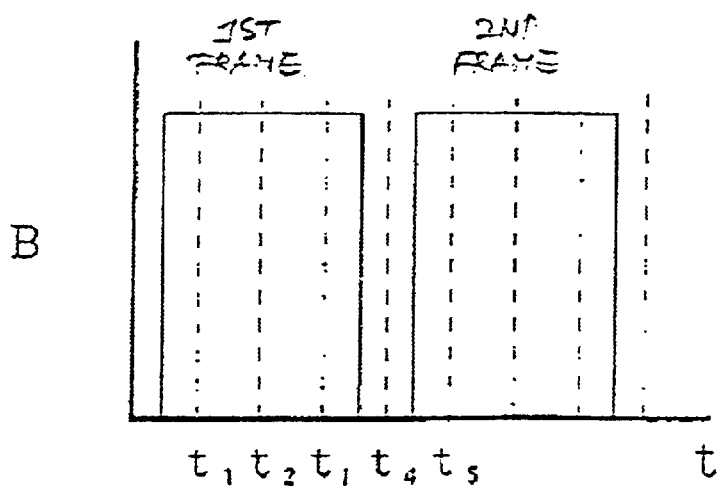

Further, at time shown in FIG. 34C, the line sensors on the row A pick up the zone 5 via the lattice surface 21a. At the same time, the line sensors on the rows B and C pick up the zones 4 and 3 via the $\Delta\frac{1}{4}$ lattice surface 21b and $\Delta\frac{1}{2}$ lattice surface 21c, respectively.

Figure 44:
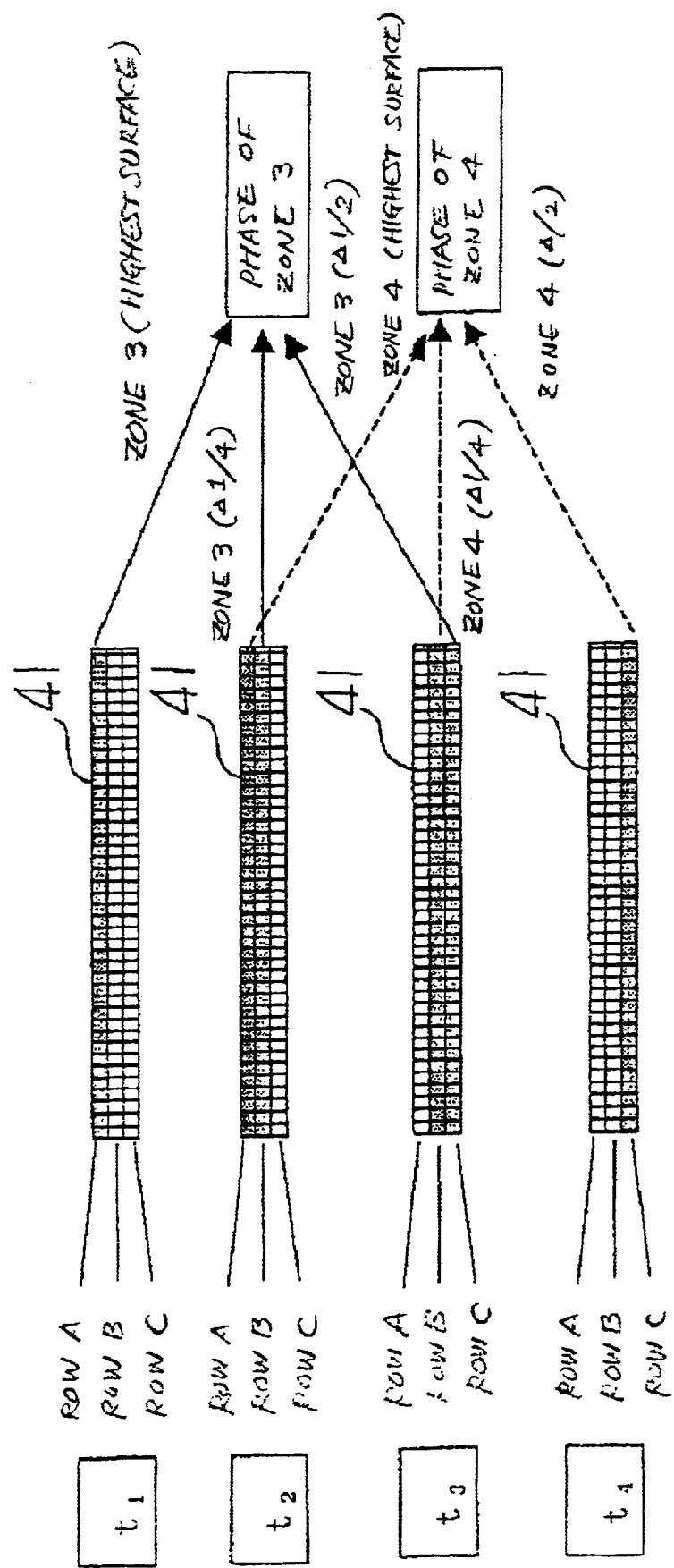
FIG. 44 shows image pickup and arithmetic operation time-serially.

FIG. 44 shows data written to an image memory, not shown, by the above procedure. As for the zone 3, for example, the data output from the A-row line sensors at the time t1, the data output from the B-row line sensors at the time t2 and the data output from the C-row line sensor at the time t3 and the Eq. (4) are used to calculate the configuration.

Figure 43:
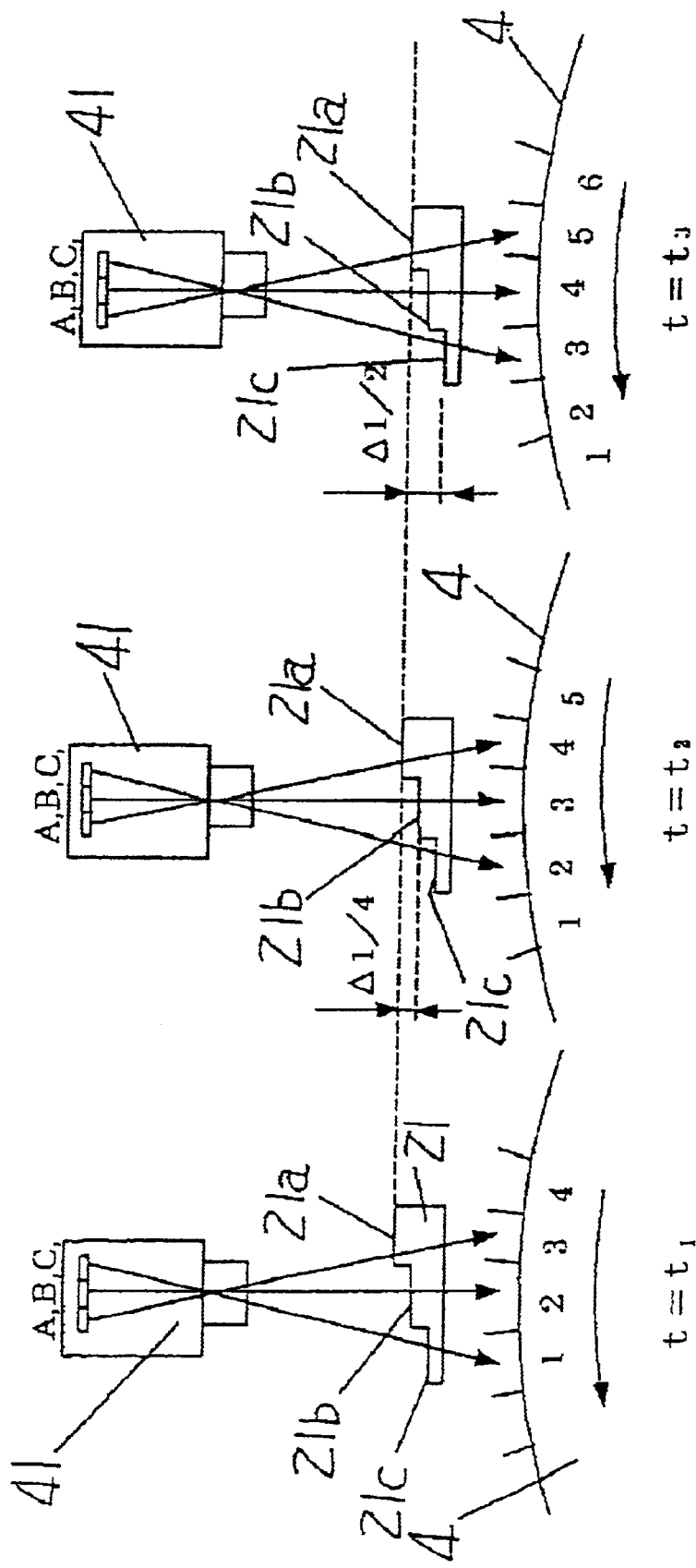
FIGS. 43A through 43C show the principle of measure particular to the twelfth embodiment.

As FIGS. 43A through 43C indicate, in the case of a cylindrical work, the height of the pixel rows A through C as measured from the drum 4 is not the same. More specifically, the variation of a work height should be taken into consideration in addition to the lattice distance 1, as in the fifth embodiment. To deal with the variation of the work height, the data distance maybe made small enough to render the variation of the work height negligible, or the steps of the stepped lattice pattern 21 may be adjusted in consideration of the above additional factor.

Thirteenth Embodiment

Figure 45:
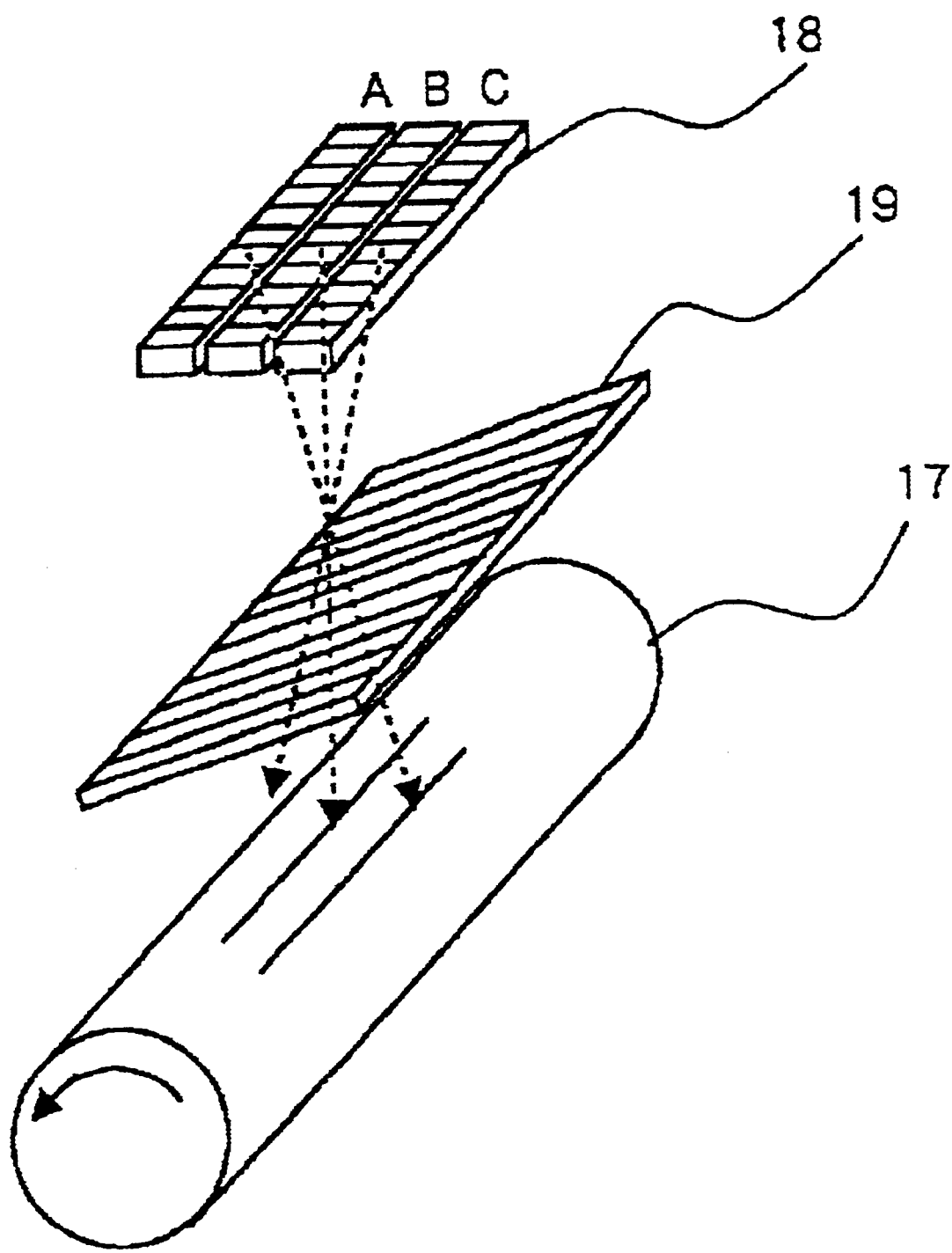
FIG. 45 shows moiré optics included in a thirteenth embodiment of the present invention.

A thirteenth embodiment of the present invention will be described with reference to FIG. 45. This embodiment differs from the twelfth embodiment in the following respect. As shown in FIG. 45, the illustrative embodiment includes a light-sensitive device 18 including pixel arrays and a lattice pattern 19. The illustrative embodiment additionally includes the light source 11 and lens 13 shown in FIG. 40. When the work to be measure is cylindrical, the head including the optics and work are moved relative to each other in rotary movement, as shown in FIG. 47.

Figure 47:
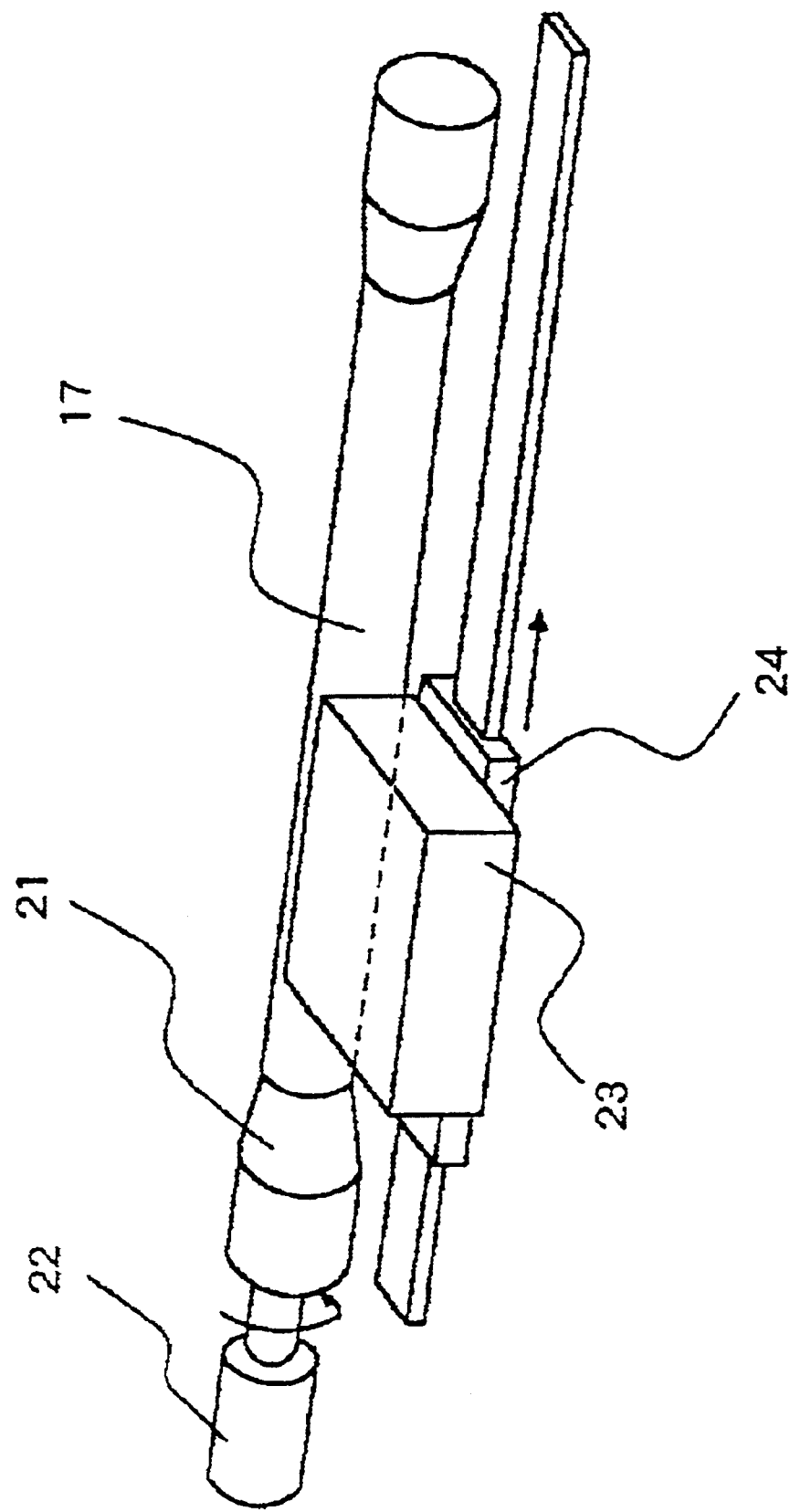
FIG. 47 is an isometric view showing a mechanism for moving a head included in the thirteenth embodiment.

Specifically, as shown in FIG. 47, a chuck 21 holds a cylindrical work 17 to be measured. A rotating mechanism 22 including a rotary motor, not shown, causes the chuck 21 to rotate such that the entire circumference of the work 17 is measured. In addition, an automatic stage 24 shown in FIG. 47 causes a head 23 including optics to move in the axial direction of the work 17, allowing the work 17 to be measured over the entire axial dimension thereof. As shown in FIGS. 45 and 48A through 48C, the light-sensitive device 18, lattice pattern 19 and work 17 are positioned relative to each other such that the lattice pattern 19 is inclined relative to the pixel arrays of the device 18. This varies, by using the cylindrical contour of the work 17, the heights of the lattice pattern surface corresponding to the visual fields of the pixel rows A through C.

Figure 49:
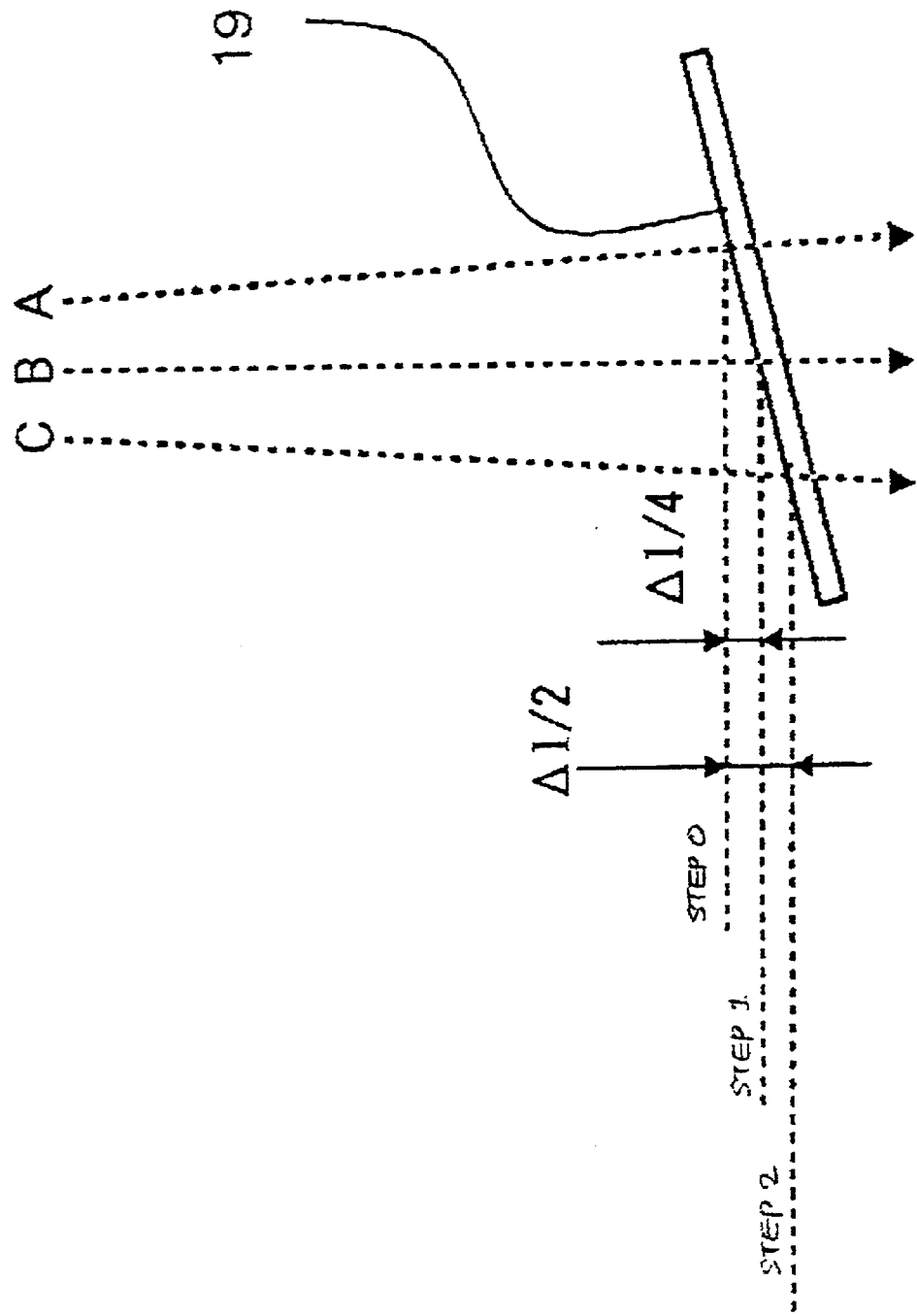
FIG. 49 shows the arrangement of a lattice pattern in detail.

As shown in FIG. 49, the angle of the lattice pattern 19, the rotation speed of the work 17 and the scanning period, magnification and pixel array distance of the light-sensitive device 18 are adjusted relative to the visual fields of the pixel arrays A through C such that the distance 1 sequentially varies by each $\Delta\frac{1}{4}$, as stated in relation to the fourth embodiment.

A measuring method particular to the illustrative embodiment will be described with reference to FIGS. 48A through 48C. First, at a time t1 shown in FIG. 48A, the pixel arrays A through C pick up the zones 3 through 1, respectively (steps 0 through 2). Subsequently, at a time t2 shown in FIG. 48B, the pixel arrays A through C pick up the zones 4 through 2, respectively (steps 0 through 2). Further, at a time t3 shown in FIG. 48C, the pixel arrays A through C pick up the zones 5 through 3, respectively (steps 0 through 2).

FIG. 44 shows data written to the image memory by the above procedure. For the measurement of, e.g., the zone 3, the data output from the A-row line sensors at the time t1, the data output from the B-row line sensors at the time t2 and the data output from the C-row line sensors at the time t3 are processed on the basis of the Eq. (4).

Figure 50:
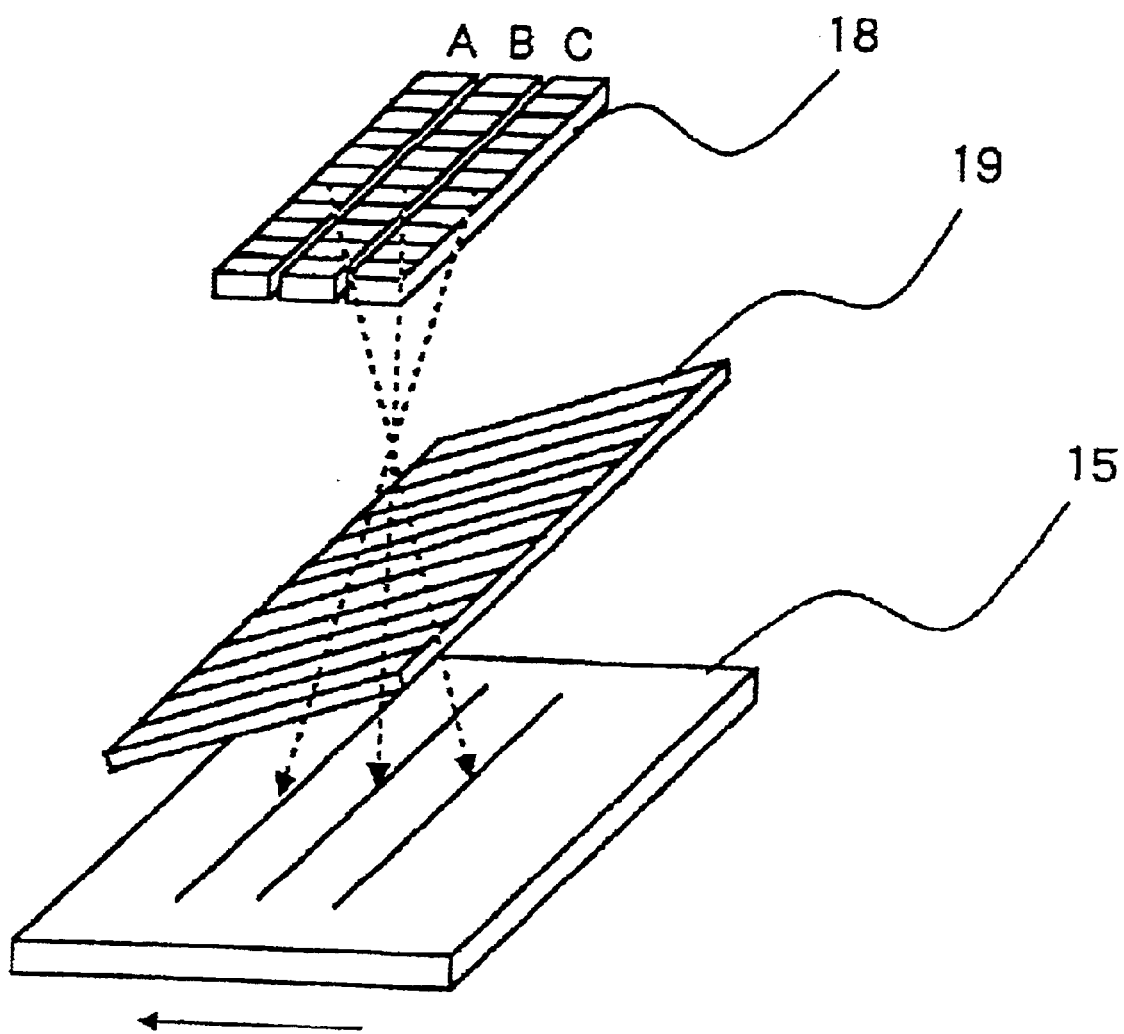
FIG. 50 shows the configuration of the moiré optics for measurement.

FIG. 50 shows how the illustrative embodiment measures the configuration of a flat work. A procedure for measurement is identical with the procedure described previously with reference to FIG. 41 and will not be described specifically in order to avoid redundancy.

Fourteenth Embodiment

Figure 51B:
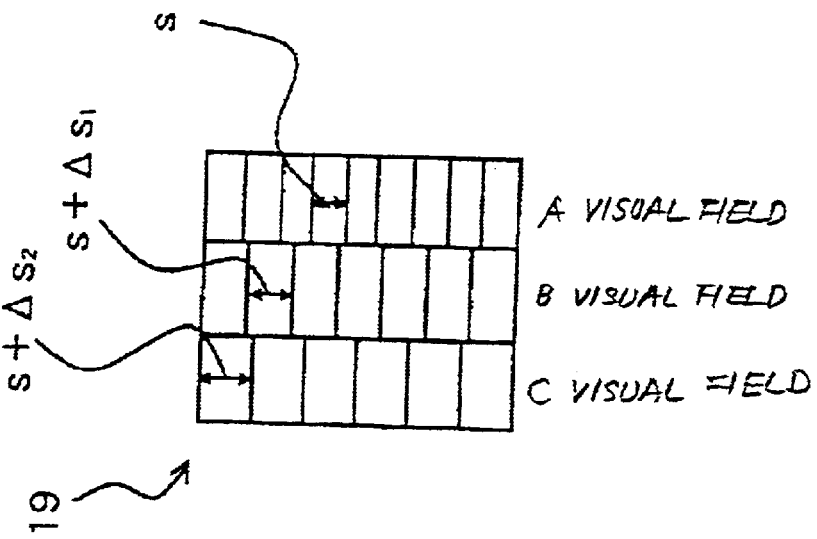
FIGS. 51A and 51B shows moiré optics included in a fourteenth embodiment of the present invention.

A fourteenth embodiment of the present invention will be described with reference to FIGS. 51A and 51B. This embodiment differs from the twelfth and thirteenth embodiments in the following respect. As shown, the illustrative embodiment also includes the light-sensitive device 18 and lattice pattern 19 as well as the light source 11 and lens 13 not shown. As shown in FIGS. 52A through 52C, a head including optics and a cylindrical work are moved relative to each other in rotary movement. More specifically, for a cylindrical work, use may be made of the arrangements described with reference to FIG. 47.

As shown in FIGS. 51A, 51B and 52A through 52C, the light-sensitive device 18, lattice pattern 19 and cylindrical work 17 are positioned relative to each other. The pitch of the lattice pattern 19 is varied in accordance with the fields of the pixel rows A through B. More specifically, the variation $\Delta s$ of the lattice pitch s is such that the phase $\Phi$ varies by each $\pi/2$, as in the thirteenth embodiment.

Figure 51A:
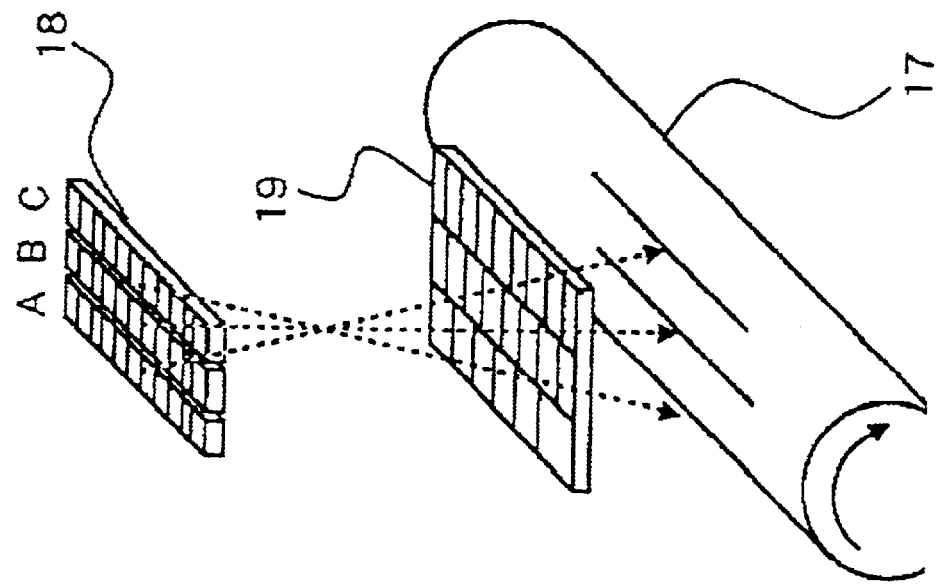

More specifically, as shown in FIG. 51A, the general plane of the light-sensitive device 18 and that of the lattice pattern 19 are parallel to the axis of the work (drum hereinafter) 17. The pixel rows A through B of the device 18 each have a visual field covering a particular position of the drum 17. Therefore, as shown in FIG. 51B, the lattice pattern 19 has different pitches each corresponding to the visual field of each pixel row. Assume that the initial lattice pitch is s, and that the variation $\Delta s$ is $\Delta s0$ (=0), $\Delta s1$ or $\Delta s2$ when $\Phi n$ in the Eq. (15) is zero, $\pi/2$ or $\pi$, respectively. Then, the lattice pitch is selected to be s for the pixel row A (step 9), s+$\Delta s1$ for the pixel row B, or s+$\Delta s2$ for the pixel row C (step 2).

Further, the feed speed of the drum 17 and the scanning period, magnification and pixel row distance of the light-sensitive device 18 are so adjusted as to provide each pixel row with the desired amount of shift.

Figure 54A:
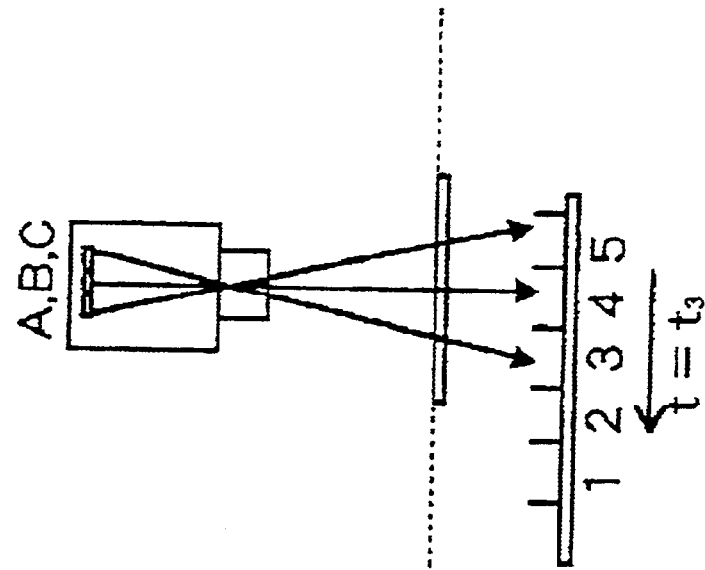
FIGS. 54A through 54C demonstrate a procedure particular to the fourteenth embodiment.
Figure 54B:
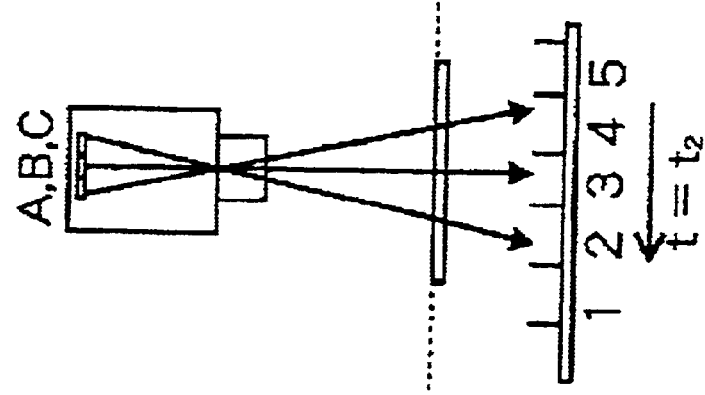
Figure 54C:
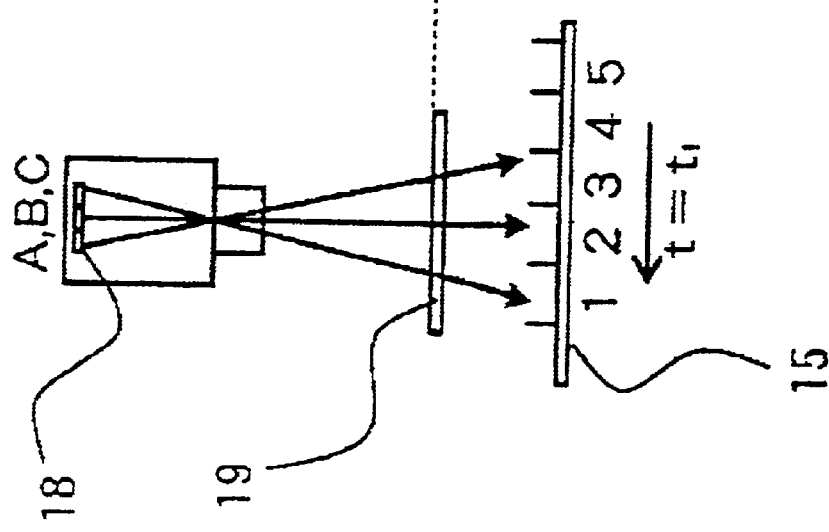

The illustrative executes measurement and calculation in the same manner as the thirteenth embodiment, as shown in FIGS. 54A through 54C. The procedure shown in FIGS. 54a through 54C will not be described specifically in order to avoid redundancy. The resulting data are also identical with the data shown in FIG. 44.

As FIGS. 52A through 52C indicate, in the case of a cylindrical work, the height of the pixel rows A through C as measured from the drum 17 is not the same. More specifically, the variation of a work height should be taken into consideration in addition to the lattice pitch. To deal with the variation of the work height, the data distance may be made small enough to render the variation of the work height negligible, or the inclination of the lattice pattern 19 may be adjusted in consideration of the above additional factor.

Figure 53B:
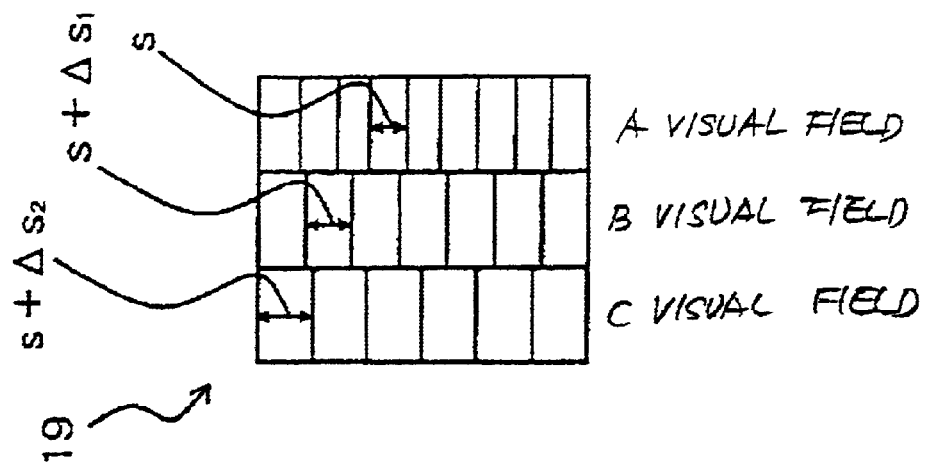
FIGS. 53A and 53B show the configuration of the moiré optics for measurement.
Figure 53A:
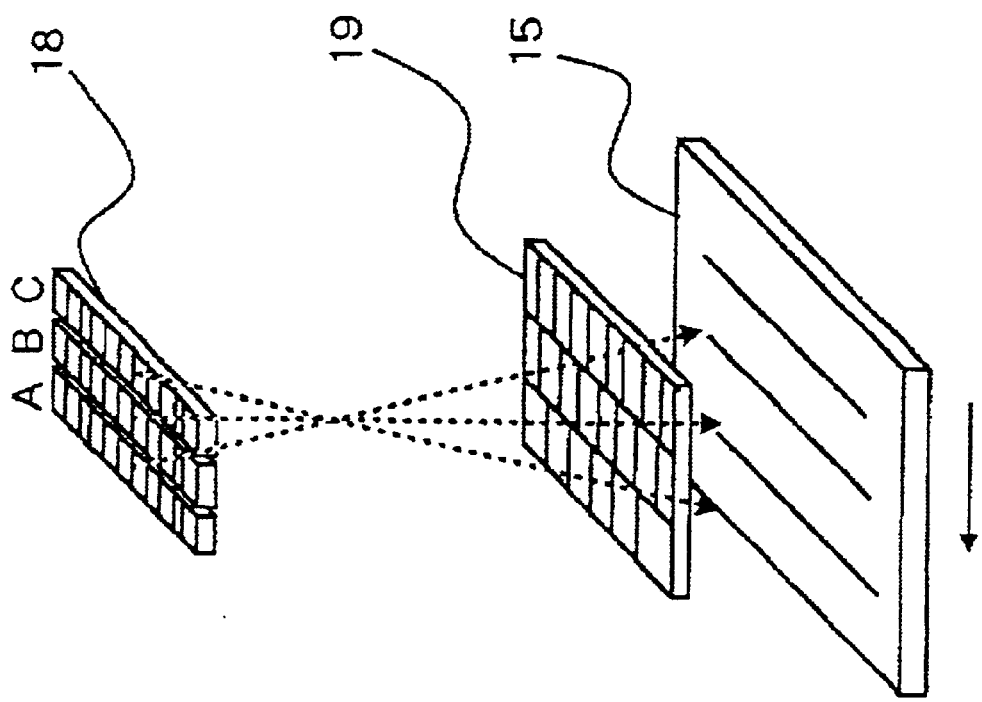

FIGS. 53A and 53B show how the illustrative embodiment measures the surface of a flat work with the light-sensitive device 18 and lattice pattern 19 as well as with the light source 11 and lens 13, FIG. 40. In this case, parallel movement shown in FIGS. 54A through 54C is substituted for the rotary movement shown in FIGS. 52A through 52C.

Further, the drive mechanism described with reference to FIG. 41 moves the head 10 relative to the work 15 not only in the direction shown in FIGS. 54A through 53C, but also in a different direction. The drive mechanism additionally includes the XY automatic stage 16, as stated earlier. With this configuration, it is possible to measure the entire surface of the work 15 while maintaining the distance between the head 10 and the work 15 and limiting the measurement range, as stated previously The work 15 may, of course, be moved relative to the head 10 held stationary. The crux is that either one of the head 10 and work 15 be movable relative to the other.

Fifteenth Embodiment

Figure 55:
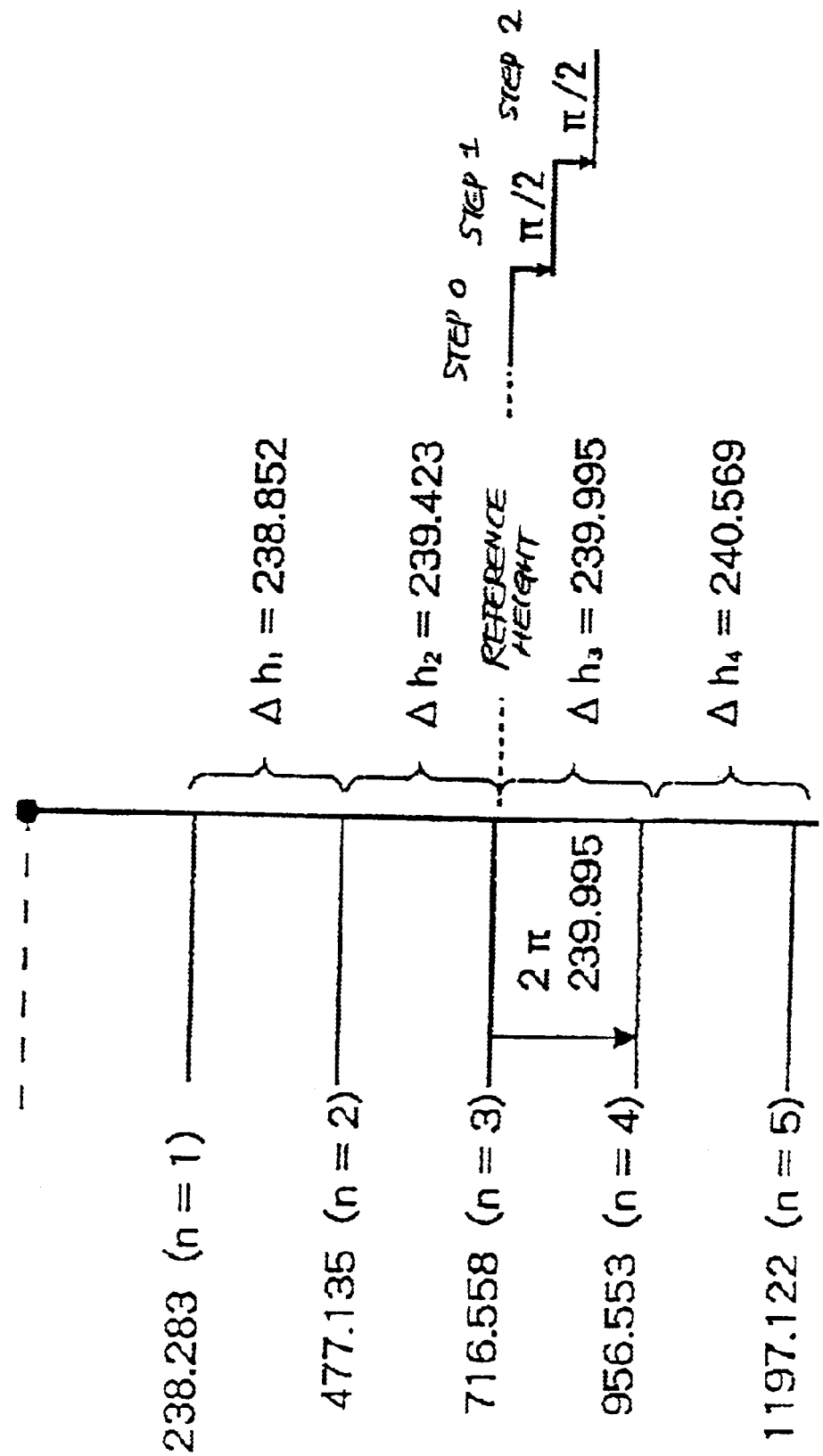
FIG. 55 shows moiré contour lines representative of a fifteenth embodiment of the present invention.

This embodiment differs from the twelfth, thirteenth and fourteenth embodiments in the following respect. In the Eq. (3) stated earlier, assume that l is 200 mm, that d is 70 mm, and s is 83.3 $\mu$m (12/mm). FIG. 55 shows moiré contour lines hN produced from the Eq. (3) under the above specific conditions. Assume that the reference height of the work to be measured is coincident with the fringe order n of 3, and that the measurement range is about 480 $\mu$m covering the fringe orders of 2 through 4. Then, a difference between $\Delta h2$=239.423 $\mu$m and $\Delta h3$ =239.995 $\mu$m is as small as 0.572. Such a small difference in height is negligible when it comes to waving or dints with a difference as great as several micrometers.

For measurement, the work is picked up at the reference height first. Subsequently, the work is moved to a height where the fringe phase is shifted by $\pi/2$, and is again picked up. Further, the work is moved to a height where the fringe phase is shifted by another $\pi/2$, and is then picked up. The resulting three images and Eq. (4) are used to calculate the configuration of the work. This procedure, however, needs three consecutive shots each being effected at a particular height of the work. An alternative procedure capable of producing images shifted in phase with a single series of shots will be described hereinafter.

Figure 56:
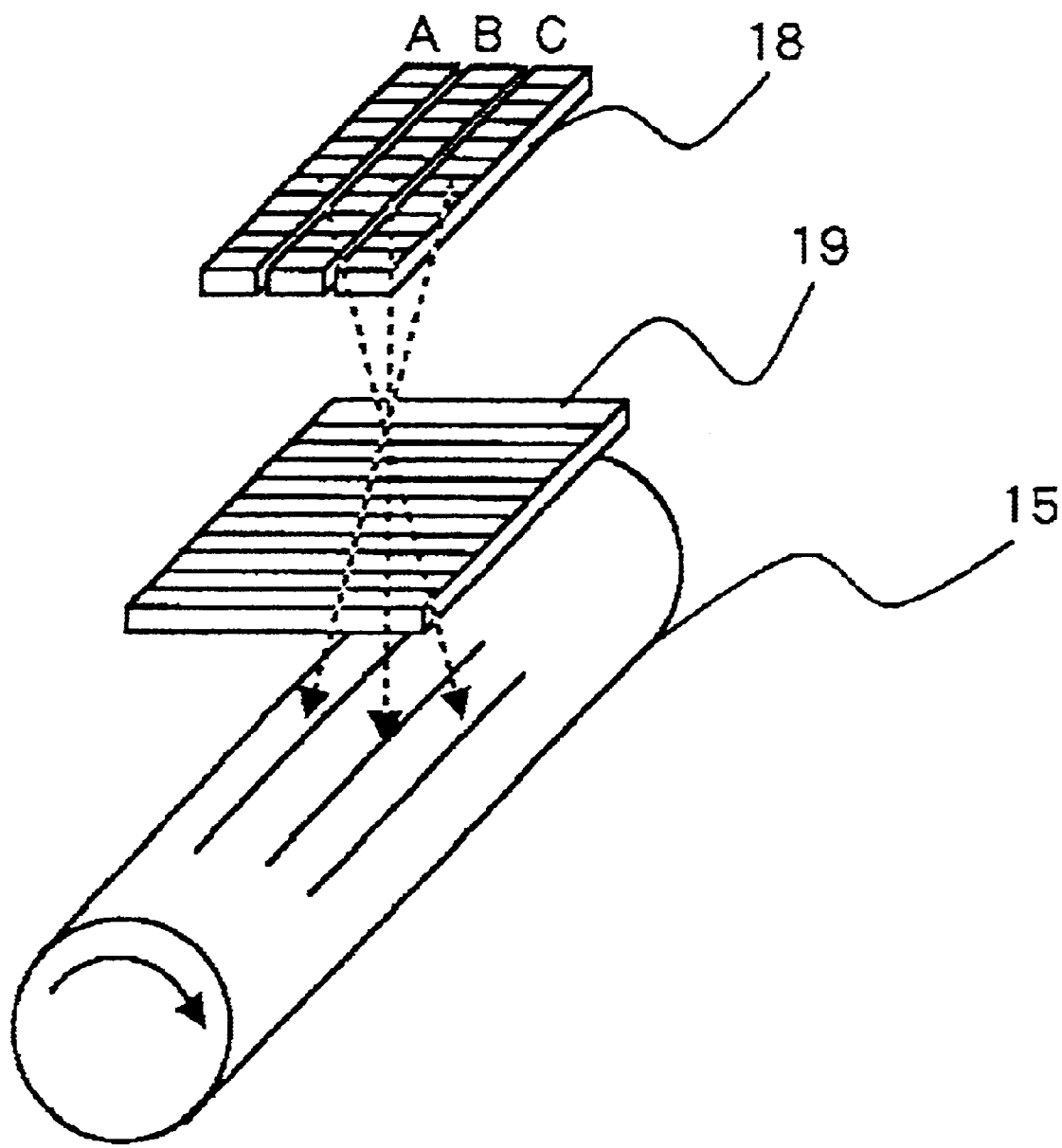
FIG. 56 shows moiré optics included in a fifteenth embodiment of the present invention.
Figure 57A:
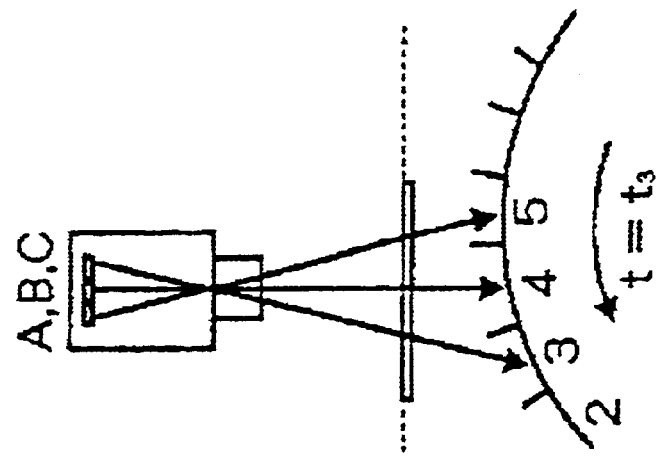
FIGS. 57A through 57C show a procedure particular to the fifteenth embodiment.
Figure 57B:
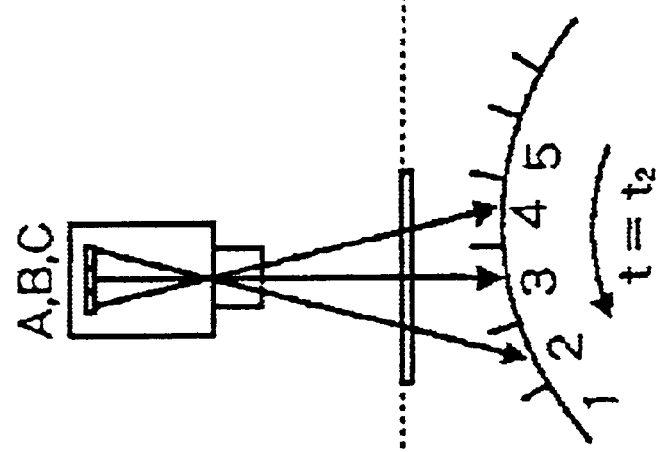
Figure 57C:
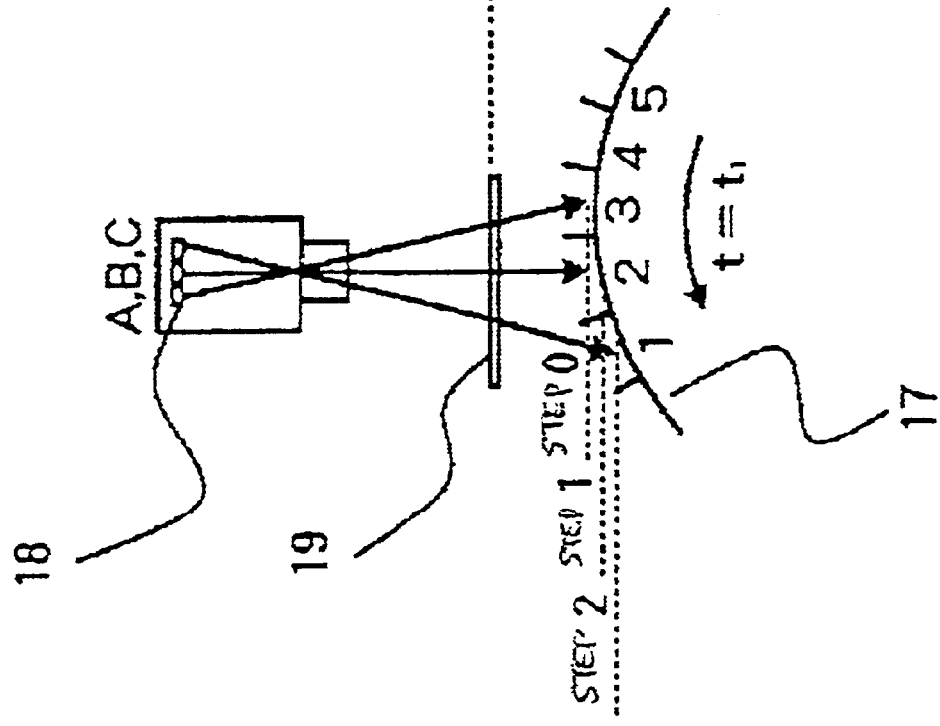

As shown in FIG. 56, a head for measurement also includes the light-sensitive device 18 and lattice pattern 19 as well as the light source 11 and lens 13 not shown. FIGS. 57A through 57C show a relation between the head, which includes optics, and the drum 15. As shown when the work to be measured is cylindrical, the head and work move relative to each other in rotary movement. More specifically, for a cylindrical work, use may be made of the arrangements described with reference to FIG. 47.

As shown in FIGS. 56 and 57A through 57C, the light-sensitive device 18, lattice pattern 19 and drum 17 are positioned relative to each other. By using the cylindrical configuration of the drum 17, the illustrative embodiment varies height in accordance with the visual fields of the pixel rows A through C. In this case, the rotation speed of the drum 17 and the scanning period, magnification and pixel row distance of the light-sensitive device 18 are adjusted such that the desired amounts of step shown in FIG. 56 are set up for the pixel rows A through C.

FIGS. 57A through 57C show a measuring method of the illustrative embodiment. As shown, the method is identical with the method described with reference to FIGS. 48A through 48B except that the lattice pattern 19 is not inclined in the illustrative embodiment. As a result, the data described with reference to FIG. 44 are output although they will not be described specifically in order to avoid redundancy.

Figure 58:
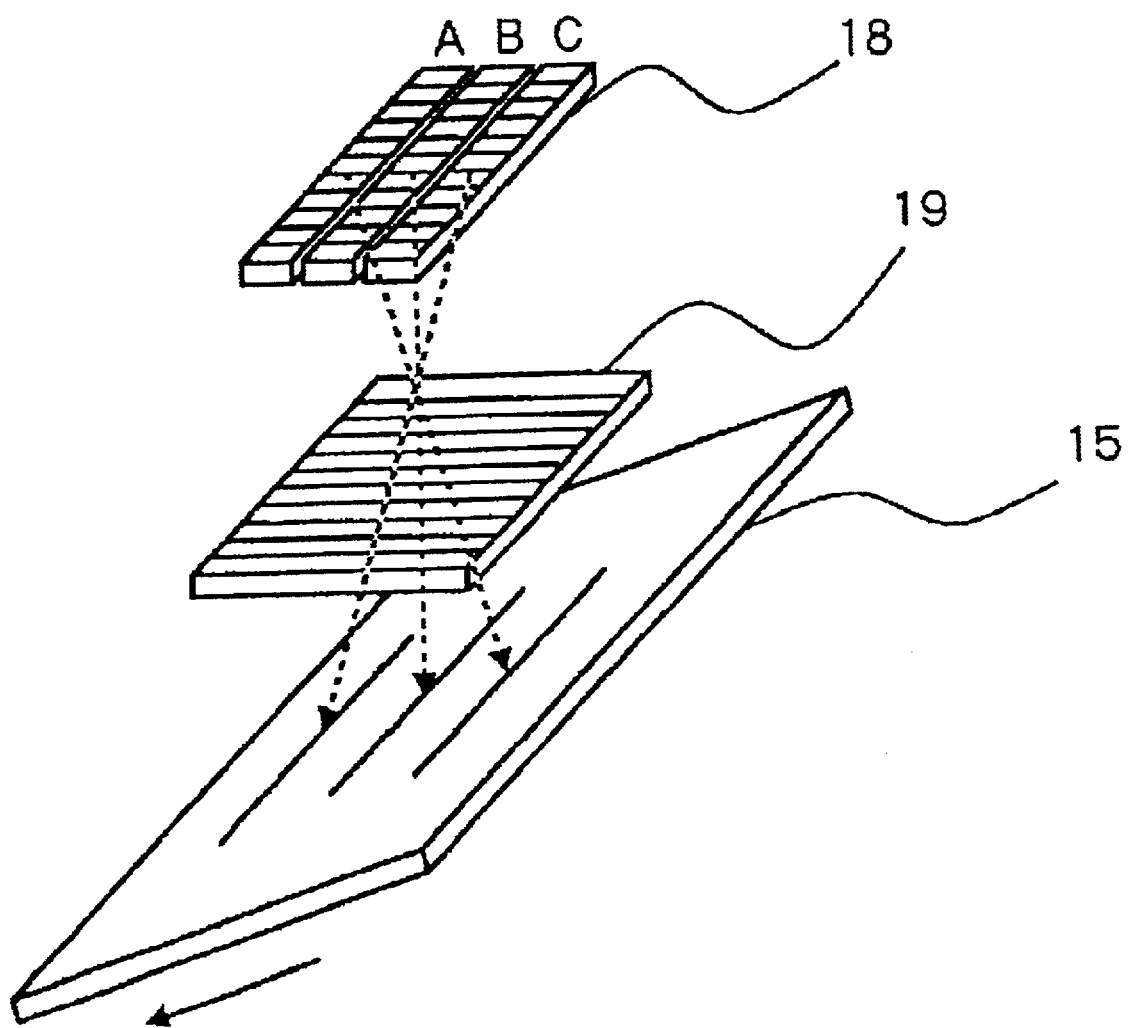
FIG. 58 shows the moiré optics included in the fifteenth embodiment.
Figure 59C:
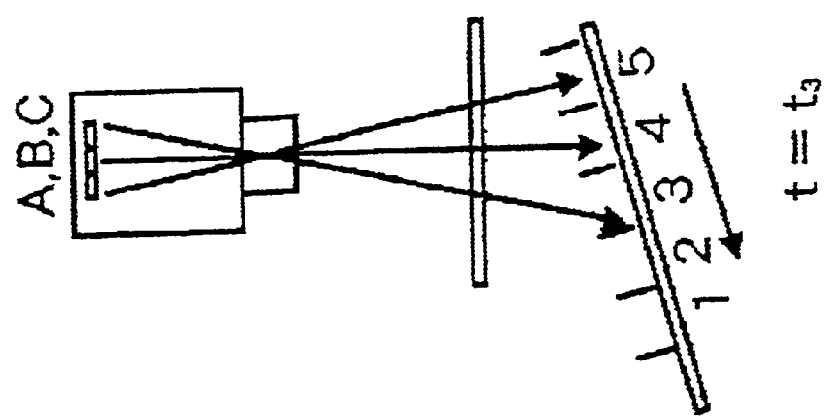
FIG. 59 shows a procedure particular to the fifteenth embodiment of the present invention.
Figure 59B:
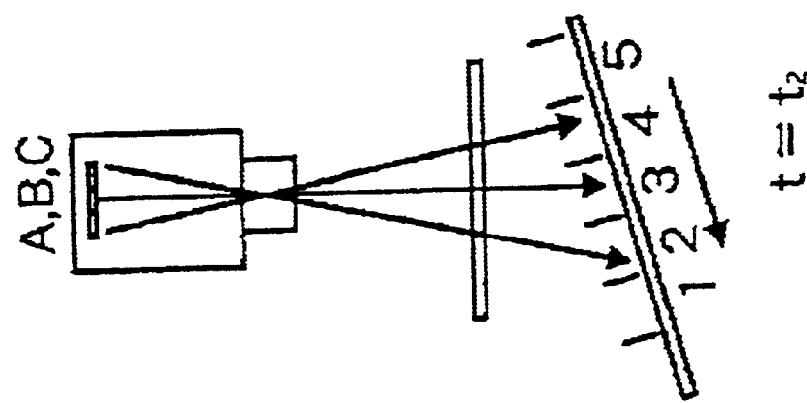
Figure 59A:
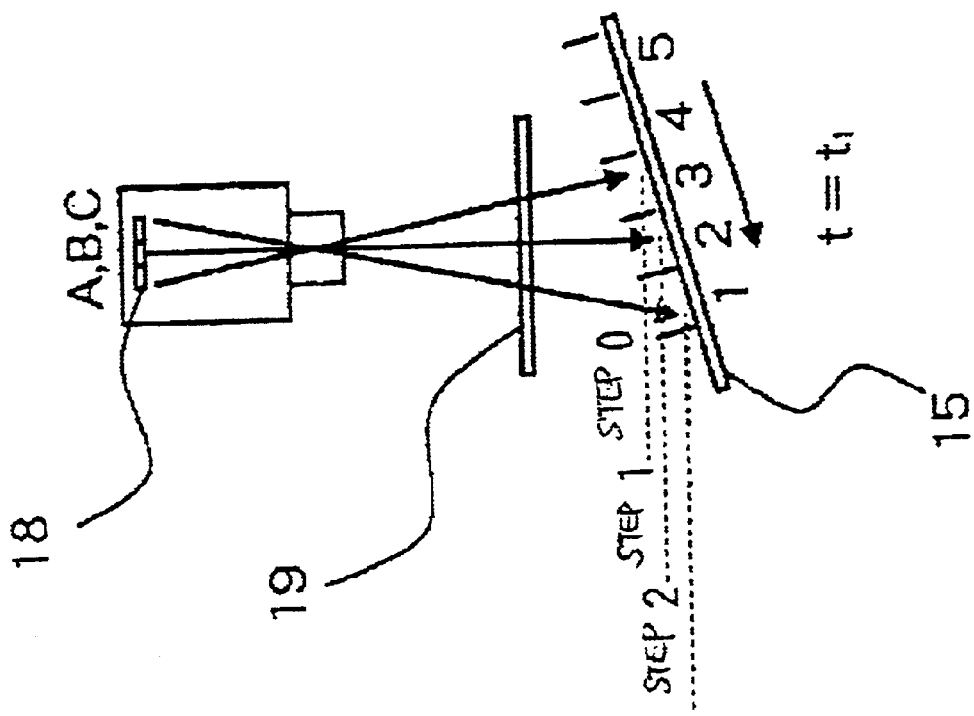

When the work to be measured is a flat plate 15, the light-sensitive element 18 and lattice pattern 19 are positioned as shown in FIG. 58. FIGS. 59A through 59C demonstrate the parallel movement of the head and work 15 substituted for the rotary movement shown in FIGS. 57A through 57C. A drive mechanism moves the head 10 relative to the work 15 not only in the direction shown in FIGS. 59A through 59C, but also in a different direction. The drive mechanism additionally includes the previously stated XY automatic stage 16 by way of example. Again, after the head 10 has measured the work 15 at a certain position, the automatic stage 16 moves the head 10 to another position for measurement. This is repeated over the entire surface of the work 15. With this configuration, it is possible to measure the entire surface of the work 15 while maintaining the distance between the head 10 and the work 15 constant and limiting the measurement range.

The work 15 may, of course, be moved relative to the head 10 held stationary. The crux is that either one of the head 10 and work 15 be movable relative to the other.

Sixteenth Embodiment

A sixteenth embodiment of the present invention will be described with reference to FIG. 60. The fifth to fifteenth embodiments described above mainly use a line sensor camera as a light-sensitive device. Particularly, the twelfth to fifteenth embodiments use a line sensor having sensors arranged in three rows. FIG. 60 shows a CCD (Charge Coupled Device) line sensor having pixels arranged in three rows assigned to red, green and blue, respectively. The pixel rows are spaced from each other by a preselected distance. A color filter segment is positioned in front of each pixel. When the color filter segments in front of the color filter segments are removed, the three pixel rows turn out monochromatic pixel rows. Alternatively, three line sensors may be simply arranged.

Seventeenth Embodiment

In any one of the foregoing embodiments, an area sensor camera may be substituted for a line sensor camera. Specifically, in the fifth to eleventh embodiments, any one row of an area sensor may be substituted for the line sensor camera. In the twelfth to fifteenth embodiments any three rows of an area sensor may be substituted for the three-line sensor camera. A progressive scan camera or similar high-speed camera reduces the measuring time more than the standard NTSC interlace system operable at a speed of thirty frames per second.

Eighteenth Embodiment

This embodiment provides a signal processing system advantageously applicable to any one of the twelfth to seventeenth embodiments. FIGS. 61 and 62A through 62C show the signal processing system in relation to three rows of light-sensitive devices by way of example. As shown, the system includes a group of line buffers 31, a phase calculating circuit 32, and a frame memory 33. The group line buffers 31 has line buffers A1 through A3, line buffers B1 and B2 and a line buffer C1 each for storing the data of a particular row of pixels. The phase calculating circuit 32 calculates a phase shifting method on the basis of the data stored in the group of line buffers 31. The frame memory 33 stores data representative of the contour of the entire surface of a work.

More specifically, as shown in FIG. 61, the three line buffers A1 through A3 are assigned to a pixel row A while two line buffers B1 and B2 are assigned to a pixel row B. A single line buffer C1 is assigned to a pixel row C.

Assume that the illustrative embodiment is applied to any one of the twelfth to fifteenth embodiments. Then, as shown in FIG. 62A, data of the step 0 relating to the zone 3 are written to the line buffer A1 at a time t1. At the same time, the data of the step 1 relating to the zone 2 are written to the line buffer B1 while the data of the step 2 relating to the zone 1 are written to the line buffer C1. Subsequently, as shown in FIG. 62B, the data of the line buffer A1 are transferred to the line buffer A2 at a time t2, and then the data of the step 0 relating to the zone 4 are written to the idle line buffer A1. At the same time, the data of the line buffer B1 are transferred to the line buffer B2, and then the data of the step relating to the zone 3 are written to the idle line buffer B1. The data of the step 2 relating to the zone 2 are written to the line buffer C1. Thereafter, as shown in FIG. 62C, the data of the line buffer A1 are transferred to the line buffer A2 at time t3, and then the data of the step 0 relating to the zone 5 are written to the idle line buffer A1.

Likewise, the data of the line buffer B1 are transferred to the line buffer B2, and then the data of the step 1 relating to the zone 4 are written to the idle line buffer B1. At the same time, the data of the step 2 relating to the zone 3 are written to the line buffer C1.

Referring again to FIG. 61, the data of the line buffers A3, B2 and C1 are transferred to the phase calculating circuit 32. The phase calculating circuit 32 calculates the phase of the zone 3 by using the Eq. (4) and writes the result of calculation in the frame memory 33. The procedure described above is repeated line byline for thereby measuring the entire surface of the work. Such a memory configuration makes it needless to assign a particular frame memory to each pixel row and therefore saves memory capacity.

Nineteenth Embodiment

This embodiment uses a liquid crystal (LC) device as a lattice pattern and is advantageously applicable to a method of the type shifting the phase by varying the pitch s of a lattice pattern. Specifically, an LC device allows an electric signal to suffice for the fourteenth embodiment that locally varies the pitch or the eleventh embodiment that varies it time-serially. Further, assume that in any one of the other embodiments the lattice pitch should be changed in accordance with the kind of a work for the purpose of enhancing accuracy. Then, the LC device allows the pitch to be electrically changed and makes it needless to replace a lattice pattern.

In summary, it will be seen that the present invention provides a method and apparatus for surface configuration measurement having various unprecedented advantages, as enumerated below.

(1) The phase of moiré fringes having a particular fringe order are accurately shifted to thereby limit a measurement range to the vicinity of the particular fringe order. A phase shifting method can therefore be easily applied to the stereoscopic lattice type of moiré method without giving any consideration to the accurate phase shift of the entire fringe orders, realizing highly accurate configuration measurement.

(2) Generally, when the magnification of testing optics is increased, a visual field decreases and narrows a range that can be tested at the same time. The present invention divides a range to be tested by testing optics into a plurality of zones and shifts a relative position between the optics and a work from one zone to another zone. The optics can therefore test the entire work surface.

(3) A distance between a light source and a light-sensitive device is varied to shift the phase of moiré fringes by a preselected phase. This is also successful to achieve the advantage (1). This is also true when the position of the work is varied in the direction of optical axis of a camera or when the position of a lattice pattern is moved back and forth in the above direction (4) Image data shifted in phase and output from the camera by a single shot of a single measurement range should only be processed. This reduces the measuring time.

(5) A moving mechanism moves the lattice pattern back and forth in the direction of optical axis. Three lines of moiré image data shifted in phase are produced by the one-line scanning line of a pixel array and the reciprocal movement of the lattice pattern synchronous to each other. This makes it needless to shoot a work a plurality of times for producing moiré images shifted in phase and thereby promotes rapid, accurate measurement of the work. This is also true when use is made of a stepped lattice pattern movable back and forth in the direction parallel to steps and/or when use is made of a color sensor camera. If desired, a lattice pattern with a variable pitch may be used.

(6) The relative position between the work and the testing optics is sequentially shifted in the direction in which the measurement range is divided in zones and the direction perpendicular thereto. This allows the entire work surface to be tridimensionally measured.

(7) The light-sensitive device has pixels arranged in three or more parallel lines. The lattice pattern is inclined relative to the general plane of the light-sensitive device and the surface of a work. Three or more lines of moiré image data are produced at consecutive times by the relative position between the work and the testing optics and the one-line scanning time of the light-sensitive device synchronous to each other. This is also successful to realize rapid, accurate, definition configuration measurement. This is also true when use is made of the lattice pattern with a variable pitch in combination with the above light-sensitive device or when the work is inclined relative to the lattice pattern and light-sensitive device.

(8) The present invention is capable of accurately, finely measuring the surface of, e.g., a photoconductive drum or that of an LC panel.

(9) The light-sensitive device may advantageously be implemented as a line sensor having three or more lines or an area sensor camera.

(10) The lattice pattern may advantageously be implemented by an LC device.

Various modifications will become possible for those skilled in the art after receiving the teachings of the present disclosure without departing from the scope thereof.

What is claimed is:

1. In a surface configuration measuring method using, as testing optics, stereoscopic lattice type of moiré optics including a light source and a lattice pattern for producing moiré fringes and a light-sensitive device including a lens and a camera for picking up said moiré fringes, moiré fringes of a particular fringe order are shifted by a preselected phase while a measurement range of said testing optics is limited to a vicinity of said particular fringe order, thereby generating at least three moiré image data shifted in phase, and the at least three moiré image data are arithmetically processed to thereby three-dimensionally measure a surface configuration of a work piece.

2. The method as claimed in claim 1, wherein a range of the work piece to be tested by said testing optics is divided into a plurality of zones, and a relative position between said testing optics and the work piece is sequentially shifted in a direction of division of said range to thereby measure the surface configuration zone by zone.

3. The method as claimed in claim 2, wherein a distance between said light source and said light-sensitive device is varied for thereby shifting the moiré fringes of the particular fringe order by the preselected phase.

4. The method as claimed in claim 2, wherein a position of the work piece is varied in a direction of an optical axis of said camera for thereby shifting the moiré fringes of the particular fringe order by the preselected phase.

5. The method as claimed in claim 2, wherein a position of said lattice pattern is varied on an optical axis of said camera for thereby shifting the moiré fringes of the particular fringe order by the preselected phase.

6. The method as claimed in claim 2, wherein said camera outputs the at least three moiré image data by picking up the work piece over a single measurement range only one time.

7. The method as claimed in claim 2, wherein said light-sensitive device comprises a single or three or more line sensors.

8. The method as claimed in claim 2, wherein said light-sensitive device comprises an area sensor camera, and an equation particular to a phase shifting method is applied to data output from a single or three or more rows of said area sensor camera to thereby measure the surface configuration.

9. The method as claimed in claim 2, wherein said lattice pattern comprises a liquid crystal device.

10. The method as claimed in claim 1, wherein a distance between said light source and said light-sensitive device is varied for thereby shifting the moiré fringes of the particular fringe order by the preselected phase.

11. The method as claimed in claim 1, wherein a position of the work piece is varied in a direction of an optical axis of said camera for thereby shifting the moiré fringes of the particular fringe order by the preselected phase.

12. The method as claimed in claim 1, wherein a position of said lattice pattern is varied on an optical axis of said camera for thereby shifting the moiré fringes of the particular fringe order by the preselected phase.

13. The method as claimed in claim 1, wherein said camera outputs the at least three moiré image data by picking up the work piece over a single measurement range only one time.

14. The method as claimed in claim 1, wherein said light-sensitive device comprises a single or three or more line sensors.

15. The method as claimed in claim 1, wherein said light-sensitive device comprises an area sensor camera, and an equation particular to a phase shifting method is applied to data output from a single or three or more rows of said area sensor camera to thereby measure the surface configuration.

16. The method as claimed in claim 1, wherein said lattice pattern comprises a liquid crystal device.

17. In a surface configuration measuring method using, as testing optics, stereoscopic lattice type of moiré optics including a light source and a lattice pattern for producing moiré fringes, a light-sensitive device including a lens and a pixel array for picking up said moiré fringes, and a moving mechanism for moving said lattice pattern back and forth in a direction of an optical axis of said light-sensitive device, said moving mechanism moves said lattice pattern back and forth for thereby shifting moiré fringes of a particular fringe order by a preselected phase, at least three lines of moiré image data shifted in phase are generated by a one-line scanning time of said light-sensitive device and a reciprocal movement of said lattice pattern synchronous to each other, and the at least three lines of moiré image data are arithmetically processed for thereby three-dimensionally measuring a surface configuration of a work piece.

18. The method as claimed in claim 17, wherein a range of the work piece to be tested by said testing optics is divided into a plurality of zones, and a relative position between said testing optics and the work piece is sequentially varied in a direction perpendicular to a direction of division of said range and in said direction of division of said range, thereby measuring the surface configuration of the work piece zone by zone.

19. The method as claimed in claim 18, wherein said light-sensitive device comprises a single or three or more line sensors.

20. The method as claimed in claim 18, wherein said light-sensitive device comprises an area sensor camera, and an equation particular to a phase shifting method is applied to data output from a single or three or more rows of said area sensor camera to thereby measure the surface configuration.

21. The method as claimed in claim 18, wherein said lattice pattern comprises a liquid crystal device.

22. The method as claimed in claim 17, wherein said light-sensitive device comprises a single or three or more line sensors.

23. The method as claimed in claim 17, wherein said light-sensitive device comprises an area sensor camera, and an equation particular to a phase shifting method is applied to data output from a single or three or more rows of said area sensor camera to thereby measure the surface configuration.

24. The method as claimed in claim 17, wherein said lattice pattern comprises a liquid crystal device.

25. In a surface configuration measuring method using, as testing optics, stereoscopic lattice type of moiré optics including a light source and a stepped lattice pattern for producing moiré fringes, said stepped lattice pattern having at least three lattice surfaces different in height in a direction of an optical axis, a light-sensitive device including a lens and a pixel array for picking up said moiré fringes, and a moving mechanism for moving said stepped lattice pattern back and forth in a direction perpendicular to a direction of said optical axis of said light-sensitive device, said moving mechanism moves said stepped lattice pattern back and forth to thereby position said lattice patterns of said lattice surfaces on the optical axis one by one, thereby shifting moiré fringes of a particular fringe order by a preselected phase, at least three lines of moiré image data shifted in phase are generated by a one-line scanning time of said light-sensitive device and a reciprocal movement of said stepped lattice pattern synchronous to each other, and the at least three lines of moiré image data are arithmetically processed for thereby three-dimensionally measuring a surface configuration of a work piece.

26. The method as claimed in claim 25, wherein a range of the work piece to be tested by said testing optics is divided into a plurality of zones, and a relative position between said testing optics and the work piece is sequentially varied in a direction perpendicular to a direction of division of said range and in said direction of division of said range, thereby measuring the surface configuration of the work piece zone by zone.

27. The method as claimed in claim 26, wherein said light-sensitive device comprises a single or three or more line sensors.

28. The method as claimed in claim 26, wherein said light-sensitive device comprises an area sensor camera, and an equation particular to a phase shifting method is applied to data output from a single or three or more rows of said area sensor camera to thereby measure the surface configuration.

29. The method as claimed in claim 26, wherein said lattice pattern comprises a liquid crystal device.

30. The method as claimed in claim 25, wherein said light-sensitive device comprises a single or three or more line sensors.

31. The method as claimed in claim 25, wherein said light-sensitive device comprises an area sensor camera, and an equation particular to a phase shifting method is applied to data output from a single or three or more rows of said area sensor camera to thereby measure the surface configuration.

32. The method as claimed in claim 25, wherein said lattice pattern comprises a liquid crystal device.

33. In a surface configuration measuring method using, as testing optics, stereoscopic lattice type of moiré optics including a light source and a lattice pattern for producing moiré fringes, a light-sensitive device including a lens and a color sensor camera for picking up said moiré fringes, a moving mechanism for moving said lattice pattern back and forth in a direction of an optical axis of said line sensor camera, color filters of different colors positioned between a work piece and said color sensor camera, and a switching mechanism for positioning one of said color filters on said optical axis, said moving mechanism moves said lattice pattern back and forth to thereby shift fringe patterns of a particular fringe order by a preselected phase, three moiré image data of different colors shifted in phase are generated by a one-line or one-frame scanning time of said color sensor camera and an operation of said switching mechanism synchronous to each other, and the three moiré image data of different colors are arithmetically processed for thereby three-dimensionally measuring a surface configuration of a work piece.

34. The method as claimed in claim 33, wherein a range of the work piece to be tested by said testing optics is divided into a plurality of zones, and a relative position between said testing optics and the work piece is sequentially varied in a direction perpendicular to a direction of division of said range and in said direction of division of said range, thereby measuring the surface configuration of the work piece zone by zone.

35. The method as claimed in claim 34, wherein said light-sensitive device comprises a single or three or more line sensors.

36. The method as claimed in claim 34, wherein said light-sensitive device comprises an area sensor camera, and
an equation particular to a phase shifting method is applied to data output from a single or three or more rows of said area sensor camera to thereby measure the surface configuration.

37. The method as claimed in claim 34, wherein said lattice pattern comprises a liquid crystal device.

38. The method as claimed in claim 33, wherein said light-sensitive device comprises a single or three or more line sensors.

39. The method as claimed in claim 33, wherein said light-sensitive device comprises an area sensor camera, and
an equation particular to a phase shifting method is applied to data output from a single or three or more rows of said area sensor camera to thereby measure the surface configuration.

40. The method as claimed in claim 33, wherein said lattice pattern comprises a liquid crystal device.

41. In a surface configuration measuring method using, as testing optics, stereoscopic lattice type of moiré optics including a light source and a stepped lattice pattern for producing moiré fringes, said stepped lattice pattern having three stepped lattice surfaces different in height in a direction of an optical axis, a light-sensitive device including a lens and a color sensor camera for picking up said moiré fringes, a moving mechanism for moving said stepped lattice pattern back and forth in a direction perpendicular to a direction of said optical axis of said line sensor camera, color filters of different colors positioned between a work piece and said color sensor camera, and a switching mechanism for positioning one of said color filters on said optical axis,
said moving mechanism moves said lattice pattern back and forth to thereby sequentially position lattice patterns of said lattice surfaces on the optical axis one by one, thereby shifting fringe patterns of a particular fringe order by a preselected phase,
three moiré image data of different colors shifted in phase are generated by a one-line or one-frame scanning time of said color sensor camera and an operation of said switching mechanism synchronous to each other, and
the three moiré image data of different colors are arithmetically processed for thereby three-dimensionally measuring a surface configuration of a work piece.

42. The method as claimed in claim 41, wherein a range of the work piece to be tested by said testing optics is divided into a plurality of zones, and
a relative position between said testing optics and the work piece is sequentially varied in a direction perpendicular to a direction of division of said range and in said direction of division of said range, thereby measuring the surface configuration of the work piece zone by zone.

43. The method as claimed in claim 42, wherein said light-sensitive device comprises a single or three or more line sensors.

44. The method as claimed in claim 42, wherein said light-sensitive device comprises an area sensor camera, and
an equation particular to a phase shifting method is applied to data output from a single or three or more rows of said area sensor camera to thereby measure the surface configuration.

45. The method as claimed in claim 42, wherein said lattice pattern comprises a liquid crystal device.

46. The method as claimed in claim 41, wherein said light-sensitive device comprises a single or three or more line sensors.

47. The method as claimed in claim 41, wherein said light-sensitive device comprises an area sensor camera, and
an equation particular to a phase shifting method is applied to data output from a single or three or more rows of said area sensor camera to thereby measure the surface configuration.

48. The method as claimed in claim 41, wherein said lattice pattern comprises a liquid crystal device.

49. In a surface configuration measuring method using, as testing optics, stereoscopic lattice type of moiré optics including a light source and a lattice pattern with a variable lattice pitch for producing moiré fringes, and a light-sensitive device including a lens and a pixel array for picking up said moiré fringes,
a lattice pitch of said lattice pattern is varied to thereby shift moiré fringes of a particular fringe order by a preselected phase,
at least three lines of moiré image data shifted in phase are generated by a one-line scanning time of said light-sensitive device and variation of the lattice pitch of said lattice pattern synchronous to each other, and
the at least three lines of moiré image data are arithmetically processed for thereby three-dimensionally measuring a surface configuration of a work piece.

50. The method as claimed in claim 49, wherein a range of the work piece to be tested by said testing optics is divided into a plurality of zones, and
a relative position between said testing optics and the work piece is sequentially varied in a direction perpendicular to a direction of division of said range and in said direction of division of said range, thereby measuring the surface configuration of the work piece zone by zone.

51. The method as claimed in claim 50, wherein said light-sensitive device comprises a single or three or more line sensors.

52. The method as claimed in claim 50, wherein said light-sensitive device comprises an area sensor camera, and
an equation particular to a phase shifting method is applied to data output from a single or three or more rows of said area sensor camera to thereby measure the surface configuration.

53. The method as claimed in claim 50, wherein said lattice pattern comprises a liquid crystal device.

54. The method as claimed in claim 49, wherein said light-sensitive device comprises a single or three or more line sensors.

55. The method as claimed in claim 49, wherein said light-sensitive device comprises an area sensor camera, and
an equation particular to a phase shifting method is applied to data output from a single or three or more rows of said area sensor camera to thereby measure the surface configuration.

56. The method as claimed in claim 49, wherein said lattice pattern comprises a liquid crystal device.

57. In a surface configuration measuring method using, as testing optics, stereoscopic lattice type of moiré optics including a light source and a stepped lattice pattern for producing moiré fringes, said stepped lattice pattern having at least three lattice surfaces different in height in a direction of an optical axis, and a light-sensitive device including a lens and pixels arranged at least in three lines for picking up said moiré fringes, said pixels on each line pick up a moiré image via a particular one of said lattice surfaces for thereby shifting fringe patterns of a particular fringe order by a preselected phase, at least three lines of moiré image data shifted in phase are generated by scanning times of said pixels on said lines synchronous to each other, and the at least three lines of moiré image data are arithmetically processed for thereby three-dimensionally measuring a surface configuration of a work piece.

58. The method as claimed in claim 57, wherein a range of the work piece to be tested by said testing optics is divided into a plurality of zones, and a relative position between said testing optics and the work piece is sequentially varied in a direction perpendicular to a direction of division of said range and in said direction of division of said range, thereby measuring the surface configuration of the work piece zone by zone.

59. The method as claimed in claim 58, wherein said light-sensitive device comprises a single or three or more line sensors.

60. The method as claimed in claim 58, wherein said light-sensitive device comprises an area sensor camera, and an equation particular to a phase shifting method is applied to data output from a single or three or more rows of said area sensor camera to thereby measure the surface configuration.

61. The method as claimed in claim 55, wherein said lattice pattern comprises a liquid crystal device.

62. The method as claimed in claim 57, wherein said light-sensitive device comprises a single or three or more line sensors.

63. The method as claimed in claim 57, wherein said light-sensitive device comprises an area sensor camera, and an equation particular to a phase shifting method is applied to data output from a single or three or more rows of said area sensor camera to thereby measure the surface configuration.

64. The method as claimed in claim 57, wherein said lattice pattern comprises a liquid crystal device.

65. A surface configuration measuring apparatus using, as testing optics, stereoscopic lattice type of moiré optics including a light source and a lattice pattern for producing moiré fringes and a light-sensitive device including a lens and a camera for picking up said moiré fringes, said surface configuration measuring apparatus comprising:

a phase shifting mechanism for shifting moiré fringes of a particular fringe order by a preselected phase, said camera having a measurement range limited to a vicinity of said particular fringe order; and data processing means for executing an arithmetic operation with at least three moiré image data shifted in phase by said phase shifting mechanism and output from said camera to thereby three-dimensionally measure a surface configuration of a work piece.

66. The apparatus as claimed in claim 65, wherein a range of the work piece to be tested by said testing optics is divided into a plurality of zones, said apparatus further comprising a division-direction moving mechanism for sequentially moving a relative position between said testing optics and the work piece in a direction of division of said range.

67. The apparatus as claimed in claim 66, further comprising a distance varying mechanism for varying a distance between said light source and said light-sensitive device.

68. The apparatus as claimed in claim 66, wherein said phase shifting mechanism varies a position of the work in a direction of an optical axis of said camera.

69. The apparatus as claimed in claim 66, wherein said phase shifting mechanism comprises a lattice pattern shifting mechanism for shifting a position of said lattice pattern on an optical axis of said camera.

70. The apparatus as claimed in claim 66, wherein the work piece is cylindrical.

71. The apparatus as claimed in claim 66, wherein the work piece is flat.

72. The apparatus as claimed in claim 66, wherein said light-sensitive device comprises a single or three or more line sensors.

73. The apparatus as claimed in claim 66, wherein said camera comprises an area sensor camera, and calculation particular to a phase shifting method is applied to data output from a single or three or more rows of said area sensor camera for thereby measuring the surface configuration.

74. The apparatus as claimed in claim 66, wherein said lattice pattern comprises a liquid crystal device.

75. The apparatus as claimed in claim 65, further comprising a distance varying mechanism for varying a distance between said light source and said light-sensitive device.

76. The apparatus as claimed in claim 65, wherein said phase shifting mechanism varies a position of the work piece in a direction of an optical axis of said camera.

77. The apparatus as claimed in claim 65, wherein said phase shifting mechanism comprises a lattice pattern shifting mechanism for shifting a position of said lattice pattern on an optical axis of said camera.

78. The apparatus as claimed in claim 65, wherein the work piece is cylindrical.

79. The apparatus as claimed in claim 65, wherein the work piece is flat.

80. The apparatus as claimed in claim 65, wherein said light-sensitive device comprises a single or three or more line sensors.

81. The apparatus as claimed in claim 65, wherein said camera comprises an area sensor camera, and calculation particular to a phase shifting method is applied to data output from a single or three or more rows of said area sensor camera for thereby measuring the surface configuration.

82. The apparatus as claimed in claim 65, wherein said lattice pattern comprises a liquid crystal device.

83. A surface configuration measuring apparatus using, as testing optics, stereoscopic lattice type of moiré optics including a light source and a lattice pattern for producing moiré fringes and a light-sensitive device including a lens and a camera for picking up said moiré fringes, said camera comprising a pixel array, said surface configuration measuring apparatus comprising:

a moving mechanism for moving said lattice pattern back and forth in a direction of an optical axis of said light-sensitive device for thereby shifting moiré fringes of a particular order by a preselected phase;

synchronizing means for synchronizing a one-line scanning time of said light-sensitive device and a reciprocal movement of said lattice pattern; and data processing means for executing an arithmetic operation with at least three lines of moiré image data shifted in phase, which are produced by the one-line scanning time of said light-sensitive device and a reciprocal movement of said lattice pattern synchronous to each other, for thereby three-dimensionally measuring a surface configuration of a work piece.

84. The apparatus as claimed in claim 83, wherein a range of the work piece to be tested by said testing optics is divided into a plurality of zones, said apparatus further comprising:
an in-zone moving mechanism for sequentially moving a relative position between said testing optics and the work piece in a direction perpendicular to a direction of division of said range; and
a division-direction moving mechanism for sequentially moving the relative position in the direction of division of said range.

85. The apparatus as claimed in claim 84, wherein the work piece is cylindrical.

86. The apparatus as claimed in claim 84, wherein the work piece is flat.

87. The apparatus as claimed in claim 84, wherein said light-sensitive device comprises a single or three or more line sensors.

88. The apparatus as claimed in claim 84, wherein said camera comprises an area sensor camera, and
calculation particular to a phase shifting method is applied to data output from a single or three or more rows of said area sensor camera for thereby measuring the surface configuration.

89. The apparatus as claimed in claim 84, wherein said lattice pattern comprises a liquid crystal device.

90. The apparatus as claimed in claim 83, wherein the work piece is cylindrical.

91. The apparatus as claimed in claim 83, wherein the work piece is flat.

92. The apparatus as claimed in claim 83, wherein said light-sensitive device comprises a single or three or more line sensors.

93. The apparatus as claimed in claim 83, wherein said camera comprises an area sensor camera, and
calculation particular to a phase shifting method is applied to data output from a single or three or more rows of said area sensor camera for thereby measuring the surface configuration.

94. The apparatus as claimed in claim 83, wherein said lattice pattern comprises a liquid crystal device.

95. A surface configuration measuring apparatus using, as testing optics, stereoscopic lattice type of moiré optics including a light source and a lattice pattern for producing moiré fringes and a light-sensitive device including a lens and a camera for picking up said moiré fringes, said camera comprising a pixel array, said lattice pattern comprising a stepped lattice pattern having at least three lattice surfaces, which are different in height in a direction of an optical axis, for shifting moiré fringes of a particular fringe order by a preselected phase, said surface configuration measuring apparatus comprising:
a moving mechanism for moving said stepped lattice pattern back and forth in a direction perpendicular to a direction of the optical axis of said light-sensitive device for thereby sequentially positioning said lattice surfaces on said optical axis;
synchronizing means for synchronizing a one-line scanning time of said light-sensitive device and a reciprocal movement of said stepped lattice pattern; and
data processing means for executing an arithmetic operation with at least three lines of moiré image data shifted in phase, which are produced by the one-line scanning time of said light-sensitive device and a reciprocal movement of said stepped lattice pattern synchronous to each other, for thereby three-dimensionally measuring a surface configuration of a work piece.

96. The apparatus as claimed in claim 95, wherein a range of the work piece to be tested by said testing optics is divided into a plurality of zones, said apparatus further comprising:
an in-zone moving mechanism for sequentially moving a relative position between said testing optics and the work piece in a direction perpendicular to a direction of division of said range; and
a division-direction moving mechanism for sequentially moving the relative position in the direction of division of said range.

97. The apparatus as claimed in claim 96, wherein the work piece is cylindrical.

98. The apparatus as claimed in claim 96, wherein the work piece is flat.

99. The apparatus as claimed in claim 96, wherein said light-sensitive device comprises a single or three or more line sensors.

100. The apparatus as claimed in claim 96, wherein said camera comprises an area sensor camera, and
calculation particular to a phase shifting method is applied to data output from a single or three or more rows of said area sensor camera for thereby measuring the surface configuration.

101. The apparatus as claimed in claim 96, wherein said lattice pattern comprises a liquid crystal device.

102. The apparatus as claimed in claim 95, wherein the work piece is cylindrical.

103. The apparatus as claimed in claim 95, wherein the work piece is flat.

104. The apparatus as claimed in claim 95, wherein said light-sensitive device comprises a single or three or more line sensors.

105. The apparatus as claimed in claim 95, wherein said camera comprises an area sensor camera, and
calculation particular to a phase shifting method is applied to data output from a single or three or more rows of said area sensor camera for thereby measuring the surface configuration.

106. The apparatus as claimed in claim 95, wherein said lattice pattern comprises a liquid crystal device.

107. A surface configuration measuring apparatus using, as testing optics, stereoscopic lattice type of moiré optics including a light source and a lattice pattern for producing moiré fringes and a light-sensitive device including a lens and a camera for picking up said moiré fringes, said camera comprising a color sensor camera, said surface configuration measuring apparatus comprising:
a moving mechanism for moving said lattice pattern back and forth in a direction of an optical axis of said color sensor camera for thereby shifting moiré fringes of a particular fringe order by a preselected phase;
filters of different colors positioned between a work piece and said color sensor camera;
a switching mechanism for selectively positioning said color filters on the optical axis of said color sensor camera;
synchronizing means for synchronizing a one-line or one-frame scanning time of said color sensor camera, a reciprocal movement of said lattice pattern and an operation of said switching mechanism; and
data processing means for executing an arithmetic operation with at three colors of moiré image data shifted in phase, which are generated by the one-line or one-frame scanning time of said color sensor camera, the reciprocal movement of said lattice pattern and the operation of said switching mechanism, for thereby three-dimensionally measuring a surface configuration of the work piece.

108. The apparatus as claimed in claim 107, wherein a range of the work piece to be tested by said testing optics is divided into a plurality of zones, said apparatus further comprising:
an in-zone moving mechanism for sequentially moving a relative position between said testing optics and the work piece in a direction perpendicular to a direction of division of said range; and
a division-direction moving mechanism for sequentially moving the relative position in the direction of division of said range.

109. The apparatus as claimed in claim 108, wherein the work piece is cylindrical.

110. The apparatus as claimed in claim 108, wherein the work piece is flat.

111. The apparatus as claimed in claim 108, wherein said light-sensitive device comprises a single or three or more line sensors.

112. The apparatus as claimed in claim 108, wherein said camera comprises an area sensor camera, and
calculation particular to a phase shifting method is applied to data output from a single or three or more rows of said area sensor camera for thereby measuring the surface configuration.

113. The apparatus as claimed in claim 108, wherein said lattice pattern comprises a liquid crystal device.

114. The apparatus as claimed in claim 107, wherein the work piece is cylindrical.

115. The apparatus as claimed in claim 107, wherein the work piece is flat.

116. The apparatus as claimed in claim 107, wherein said light-sensitive device comprises a single or three or more line sensors.

117. The apparatus as claimed in claim 107, wherein said camera comprises an area sensor camera, and
calculation particular to a phase shifting method is applied to data output from a single or three or more rows of said area sensor camera for thereby measuring the surface configuration.

118. The apparatus as claimed in claim 107, wherein said lattice pattern comprises a liquid crystal device.

119. A surface configuration measuring apparatus using, as testing optics, stereoscopic lattice type of moiré optics including a light source and a lattice pattern for producing moiré fringes and a light-sensitive device including a lens and a camera for picking up said moiré fringes, said camera comprising a color sensor camera, said lattice pattern comprising a stepped lattice pattern having at least three lattice surfaces, which are different in height in a direction of an optical axis, for shifting moiré fringes of a particular fringe order by a preselected phase, said surface configuration measuring apparatus comprising:
a moving mechanism for moving said stepped lattice pattern back and forth in a direction of the optical axis of said color sensor camera for thereby sequentially positioning lattice patterns of said lattice surfaces on said optical axis;
color filters of different colors positioned between a work piece and said color sensor camera;
a switching mechanism for selectively positioning said color filters on the optical axis of said color sensor camera;
synchronizing means for synchronizing a one-line or one-frame scanning time of said color sensor camera, a reciprocal movement of said stepped lattice pattern and an operation of said switching mechanism; and
data processing means for executing an arithmetic operation with three colors of moiré image data shifted in phase, which are produced by the one-line or one-frame scanning time of said color sensor camera, the reciprocal movement of said stepped pattern and the operation of said switching mechanism synchronous to each other, for thereby three-dimensionally measuring a surface configuration of the work piece.

120. The apparatus as claimed in claim 119, wherein a range of the work piece to be tested by said testing optics is divided into a plurality of zones, said apparatus further comprising:
an in-zone moving mechanism for sequentially moving a relative position between said testing optics and the work piece in a direction perpendicular to a direction of division of said range; and
a division-direction moving mechanism for sequentially moving the relative position in the direction of division of said range.

121. The apparatus as claimed in claim 120, wherein the work piece is cylindrical.

122. The apparatus as claimed in claim 120, wherein the work piece is flat.

123. The apparatus as claimed in claim 120, wherein said light-sensitive device comprises a single or three or more line sensors.

124. The apparatus as claimed in claim 120, wherein said camera comprises an area sensor camera, and
calculation particular to a phase shifting method is applied to data output from a single or three or more rows of said area sensor camera for thereby measuring the surface configuration.

125. The apparatus as claimed in claim 120, wherein said lattice pattern comprises a liquid crystal device.

126. The apparatus as claimed in claim 119, wherein the work piece is cylindrical.

127. The apparatus as claimed in claim 119, wherein the work piece is flat.

128. The apparatus as claimed in claim 119, wherein said light-sensitive device comprises a single or three or more line sensors.

129. The apparatus as claimed in claim 119, wherein said camera comprises an area sensor camera, and
calculation particular to a phase shifting method is applied to data output from a single or three or more rows of said area sensor camera for thereby measuring the surface configuration.

130. The apparatus as claimed in claim 119, wherein said lattice pattern comprises a liquid crystal device.

131. A surface configuration measuring apparatus using, as testing optics, stereoscopic lattice type of moiré optics including a light source and a lattice pattern with a variable lattice pitch for producing moiré fringes, and a light-sensitive device including a lens and a camera for picking up said moiré fringes, said camera comprising a pixel array, said surface configuration measuring apparatus comprising:
synchronizing means for synchronizing a one-line scanning time of said light-sensitive device and a lattice pitch varying operation of said lattice pattern; and
data processing means for executing an arithmetic operation with at least three lines of moiré image data shifted in phase, which are generated by the one-line scanning time of said light-sensitive device and the lattice pitch varying operation synchronous to each other, for thereby measuring a surface configuration of a work piece.

132. The apparatus as claimed in claim 131, wherein a range of the work piece to be tested by said testing optics is divided into a plurality of zones, said apparatus further comprising:

an in-zone moving mechanism for sequentially moving a relative position between said testing optics and the work piece in a direction perpendicular to a direction of division of said range; and a division-direction moving mechanism for sequentially moving the relative position in the direction of division of said range.

133. The apparatus as claimed in claim 132, wherein the work piece is cylindrical.

134. The apparatus as claimed in claim 132, wherein the work piece is flat.

135. The apparatus as claimed in claim 132, wherein said light-sensitive device comprises a single or three or more line sensors.

136. The apparatus as claimed in claim 132, wherein said camera comprises an area sensor camera, and calculation particular to a phase shifting method is applied to data output from a single or three or more rows of said area sensor camera for thereby measuring the surface configuration.

137. The apparatus as claimed in claim 132, wherein said lattice pattern comprises a liquid crystal device.

138. The apparatus as claimed in claim 131, wherein the work piece is cylindrical.

139. The apparatus as claimed in claim 131, wherein the work piece is flat.

140. The apparatus as claimed in claim 131, wherein said light-sensitive device comprises a single or three or more line sensors.

141. The apparatus as claimed in claim 131, wherein said camera comprises an area sensor camera, and calculation particular to a phase shifting method is applied to data output from a single or three or more rows of said area sensor camera for thereby measuring the surface configuration.

142. The apparatus as claimed in claim 131, wherein said lattice pattern comprises a liquid crystal device.

143. A surface configuration measuring apparatus using, as testing optics, stereoscopic lattice type of moiré optics including a light source and a lattice pattern for producing moiré fringes, said stepped lattice pattern having at least three lattice surfaces different in height in a direction of an optical axis for shifting fringes of a particular fringe order by a preselected phase, and a light-sensitive device including a lens and a camera for picking up said moiré fringes, said camera comprising three or more parallel lines of pixels each for picking up a work piece via a particular one of said lattice surfaces to thereby output a moiré image shifted in phase from said fringes of said particular fringe order by said preselected phase, said surface configuration measuring apparatus comprising:

a mechanism for shifting a relative position between said moiré optics and a surface of the work piece;

synchronizing means for synchronizing scanning times of said three lines of pixels of said camera; and data processing means for executing an arithmetic operation with at least three lines of moiré image data shifted in phase, which are generated by an operation of said mechanism and the scanning times of said three lines of pixels synchronous to each other, for thereby three-dimensionally measure a configuration of the work piece.

144. The apparatus as claimed in claim 143, wherein a range of the work piece to be tested by said testing optics is divided into a plurality of zones, said apparatus further comprising:

an in-zone moving mechanism for sequentially moving a relative position between said testing optics and the work piece in a direction perpendicular to a direction of division of said range; and a division-direction moving mechanism for sequentially moving the relative position in the direction of division of said range.

145. The apparatus as claimed in claim 144, wherein the work piece is cylindrical.

146. The apparatus as claimed in claim 144, wherein the work piece is flat.

147. The apparatus as claimed in claim 144, wherein said light-sensitive device comprises a single or three or more line sensors.

148. The apparatus as claimed in claim 144, wherein said camera comprises an area sensor camera, and calculation particular to a phase shifting method is applied to data output from a single or three or more rows of said area sensor camera for thereby measuring the surface configuration.

149. The apparatus as claimed in claim 144, wherein said lattice pattern comprises a liquid crystal device.

150. The apparatus as claimed in claim 143, wherein the work piece is cylindrical.

151. The apparatus as claimed in claim 143, wherein the work piece is flat.

152. The apparatus as claimed in claim 143, wherein said light-sensitive device comprises a single or three or more line sensors.

153. The apparatus as claimed in claim 143, wherein said camera comprises an area sensor camera, and calculation particular to a phase shifting method is applied to data output from a single or three or more rows of said area sensor camera for thereby measuring the surface configuration.

154. The apparatus as claimed in claim 143, wherein said lattice pattern comprises a liquid crystal device.

155. A surface configuration measuring apparatus using, as testing optics, stereoscopic lattice type of moiré optics including a light source and a lattice pattern for producing moiré fringes, and a light-sensitive device including a lens and a camera for picking up said moiré fringes, said camera comprising at least three parallel lines of pixels, a surface of a work piece being parallel to and spaced by a same distance from said at least three parallel lines of pixels at a side opposite to said camera, said lattice pattern being not inclined in a direction in which said pixels are arranged, but being inclined in a direction in which said lines are arranged, such that each line of pixels is spaced by a particular distance from said lattice pattern to thereby pick up said surface of said work piece in a form of a particular moiré image shifted by a preselected phase, said surface configuration measuring apparatus comprising:

a mechanism for moving a relative position between said moiré optics and the surface of the work piece in a direction in which said lattice pattern is inclined;

synchronizing means for synchronizing scanning times of said at least three lines of pixels; and data processing means for executing an arithmetic operation with at least three lines of moiré image data shifted in phase, which are generated by an operation of said mechanism and the scanning times of said three lines of pixels synchronous to each other, for thereby three-dimensionally measure a configuration of the work piece.

156. The apparatus as claimed in claim 155, wherein a range of the work piece to be tested by said testing optics is divided into a plurality of zones, said apparatus further comprising:

an in-zone moving mechanism for sequentially moving a relative position between said testing optics and the work piece in a direction perpendicular to direction of division of said range; and a division-direction moving mechanism for sequentially moving the relative position in the direction of division of said range.

157. The apparatus as claimed in claim 156, wherein the work piece is cylindrical.

158. The apparatus as claimed in claim 156, wherein the work piece is flat.

159. The apparatus as claimed in claim 156, wherein said light-sensitive device comprises a single or three or more line sensors.

160. The apparatus as claimed in claim 156, wherein said camera comprises an area sensor camera, and calculation particular to a phase shifting method is applied to data output from a single or three or more rows of said area sensor camera for thereby measuring the surface configuration.

161. The apparatus as claimed in claim 156, wherein said lattice pattern comprises a liquid crystal device.

162. The apparatus as claimed in claim 155, wherein the work piece is cylindrical.

163. The apparatus as claimed in claim 155, wherein the work piece is flat.

164. The apparatus as claimed in claim 155, wherein said light-sensitive device comprises a single or three or more line sensors.

165. The apparatus as claimed in claim 155, wherein said camera comprises an area sensor camera, and calculation particular to a phase shifting method is applied to data output from a single or three or more rows of said area sensor camera for thereby measuring the surface configuration.

166. The apparatus as claimed in claim 155, wherein said lattice pattern comprises a liquid crystal device.

167. A surface configuration measuring apparatus using, as testing optics, stereoscopic lattice type of moiré optics including a light source and a lattice pattern for producing moiré fringes, and a light-sensitive device including a lens and a camera for picking up said moiré fringes, said camera comprising at least three parallel lines of pixels that are parallel to said lattice pattern, a surface of a work piece, which faces said camera with the intermediary of said lattice pattern, being parallel to and spaced by a same distance from said lattice pattern, said at least three lines of pixels each picking up a particular portion of said surface of said work piece as a visual field, said lattice pattern having different pitches each being assigned to a particular visual field such that each line of pixels output a moiré image shifted by a preselected phase, said surface configuration measuring apparatus comprising:

a mechanism for moving a relative position between said moiré optics and the surface of the work piece in a direction in which said at least three lines of said camera are arranged;

synchronizing means for synchronizing scanning times of said at least three lines of pixels; and data processing means for executing an arithmetic operation with at least three lines of moiré image data shifted in phase, which are generated by an operation of said mechanism and the scanning times of said three lines of pixels synchronous to each other, for thereby three-dimensionally measure a configuration of the work piece.

168. The apparatus as claimed in claim 167, wherein a range of the work piece to be tested by said testing optics is divided into a plurality of zones, said apparatus further comprising:

an in-zone moving mechanism for sequentially moving a relative position between said testing optics and the work piece in a direction perpendicular to a direction in a direction of division of said range; and a division-direction moving mechanism for sequentially moving the relative position in the direction of division of said range.

169. The apparatus as claimed in claim 168, wherein the work piece is cylindrical.

170. The apparatus as claimed in claim 168, wherein the work piece is flat.

171. The apparatus as claimed in claim 168, wherein said light-sensitive device comprises a single or three or more line sensors.

172. The apparatus as claimed in claim 168, wherein said camera comprises an area sensor camera, and calculation particular to a phase shifting method is applied to data output from a single or three or more rows of said area sensor camera for thereby measuring the surface configuration.

173. The apparatus as claimed in claim 168, wherein said lattice pattern comprises a liquid crystal device.

174. The apparatus as claimed in claim 167, wherein the work piece is cylindrical.

175. The apparatus as claimed in claim 167, wherein the work piece is flat.

176. The apparatus as claimed in claim 167, wherein said light-sensitive device comprises a single or three or more line sensors.

177. The apparatus as claimed in claim 167, wherein said camera comprises an area sensor camera, and calculation particular to a phase shifting method is applied to data output from a single or three or more rows of said area sensor camera for thereby measuring the surface configuration.

178. The apparatus as claimed in claim 167, wherein said lattice pattern comprises a liquid crystal device.

179. A surface configuration measuring apparatus using, as testing optics, stereoscopic lattice type of moiré optics including a light source and a lattice pattern for producing moiré fringes, and a light-sensitive device including a lens and a camera for picking up said moiré fringes, said camera comprising at least three parallel lines of pixels that are parallel to said lattice pattern, a surface of a work piece being not inclined in a direction in which said pixels are arranged, but being inclined in a direction in which said lines are arranged, such that each line of pixels picks up a particular portion of said surface of said work piece spaced by a particular distance from said lattice pattern as a visual field to thereby pick up said portion in a form of a particular moiré image shifted by a preselected phase, said surface configuration measuring apparatus comprising:

a mechanism for moving a relative position between said moiré optics and the surface of the work piece in a direction in which said surface is inclined;

synchronizing means for synchronizing scanning times of said at least three lines of pixels; and data processing means for executing an arithmetic operation with at least three lines of moiré image data shifted in phase, which are generated by an operation of said mechanism and the scanning times of said three lines of pixels synchronous to each other, for thereby three-dimensionally measure a configuration of the work piece.

180. The apparatus as claimed in claim 179, wherein a range of the work piece to be tested by said testing optics is divided into a plurality of zones, said apparatus further comprising:

an in-zone moving mechanism for sequentially moving a relative position between said testing optics and the work piece in a direction perpendicular to a direction of division of said range; and a division-direction moving mechanism for sequentially moving the relative position in the direction of division of said range.

181. The apparatus as claimed in claim 180, wherein the work piece is cylindrical.

182. The apparatus as claimed in claim 180, wherein the work piece is flat.

183. The apparatus as claimed in claim 180, wherein said light-sensitive device comprises a single or three or more line sensors.

184. The apparatus as claimed in claim 180, wherein said camera comprises an area sensor camera, and calculation particular to a phase shifting method is applied to data output from a single or three or more rows of said area sensor camera for thereby measuring the surface configuration.

185. The apparatus as claimed in claim 180, wherein said lattice pattern comprises a liquid crystal device.

186. The apparatus as claimed in claim 179, wherein the work piece is cylindrical.

187. The apparatus as claimed in claim 179, wherein the work piece is flat.

188. The apparatus as claimed in claim 179, wherein said light-sensitive device comprises a single or three or more line sensors.

189. The apparatus as claimed in claim 179, wherein said camera comprises an area sensor camera, and calculation particular to a phase shifting method is applied to data output from a single or three or more rows of said area sensor camera for thereby measuring the surface configuration.

190. The apparatus as claimed in claim 179, wherein said lattice pattern comprises a liquid crystal device.

* * * * *